(12) United States Patent
McCarthy

(10) Patent No.: US 10,961,018 B2
(45) Date of Patent: Mar. 30, 2021

(54) DEVICES AND METHODS FOR CONSUMING A PLURALITY OF LIQUIDS AND MOLD APPARATUSES FOR FORMING SUCH DEVICES

(71) Applicant: Dillon Patrick McCarthy, Houston, TX (US)

(72) Inventor: Dillon Patrick McCarthy, Houston, TX (US)

( * ) Notice: Subject to any disclaimer, the term of this patent is extended or adjusted under 35 U.S.C. 154(b) by 113 days.

(21) Appl. No.: 16/158,667

(22) Filed: Oct. 12, 2018

(65) Prior Publication Data

US 2019/0039783 A1 Feb. 7, 2019

Related U.S. Application Data

(63) Continuation of application No. 15/175,825, filed on Jun. 7, 2016, now Pat. No. 10,138,022.

(51) Int. Cl.
| | |
|---|---|
| *B65D 25/04* | (2006.01) |
| *A47G 19/22* | (2006.01) |
| *B65D 41/04* | (2006.01) |
| *B65D 81/32* | (2006.01) |
| *B65D 51/28* | (2006.01) |

(52) U.S. Cl.
CPC ......... *B65D 25/04* (2013.01); *A47G 19/2205* (2013.01); *B65D 41/04* (2013.01); *B65D 51/28* (2013.01); *B65D 81/3216* (2013.01); *H05K 999/99* (2013.01)

(58) Field of Classification Search
CPC ............ B65D 21/0238; B65D 81/3211; B65D 81/3205; B65D 24/09; B65D 25/04; B65D 51/28; B65D 2231/022; B65D 51/08; B65D 41/04; A47G 19/2205

USPC .......................................................... 220/505
See application file for complete search history.

(56) References Cited

U.S. PATENT DOCUMENTS

| | | | |
|---|---|---|---|
| 3,288,344 A * | 11/1966 | Woollen .............. | A47G 19/065 229/103.1 |
| 3,924,741 A | 12/1975 | Kachur et al. | |
| 4,273,247 A | 6/1981 | Earls | |
| 4,410,085 A | 10/1983 | Beneziat et al. | |
| 4,416,381 A | 11/1983 | Swartwout | |
| 4,478,346 A | 10/1984 | Spong | |
| 4,693,410 A | 9/1987 | Selz | |
| 4,717,037 A | 1/1988 | van der Meulen | |
| 5,180,079 A | 1/1993 | Jeng | |
| 5,227,303 A | 7/1993 | Erdman et al. | |
| 5,638,968 A | 6/1997 | Baron et al. | |
| 6,007,853 A | 12/1999 | Lesser | |

(Continued)

FOREIGN PATENT DOCUMENTS

| | | |
|---|---|---|
| DE | 102009042245 A1 | 4/2011 |
| WO | 2006041761 A1 | 4/2006 |
| WO | 2007103920 A2 | 9/2007 |

OTHER PUBLICATIONS

U.S. Appl. No. 15/175,825, filed Jun. 7, 2016.

*Primary Examiner* — Shawn M Braden
(74) *Attorney, Agent, or Firm* — Faegre Drinker Biddle & Reath LLP

(57) ABSTRACT

Devices, methods, and mold apparatuses for forming devices facilitate consumption of a plurality of liquids by a user, such as a first liquid followed by a second liquid. In some cases, the first liquid is a relatively harsh liquid and the second liquid is a relatively mild liquid.

19 Claims, 48 Drawing Sheets

(56) References Cited

U.S. PATENT DOCUMENTS

| | | |
|---|---|---|
| 6,135,275 A | 10/2000 | Kelders et al. |
| 6,244,433 B1 | 6/2001 | Vieu |
| 6,814,229 B2 | 11/2004 | Seckler |
| 7,111,748 B2 | 9/2006 | Cha |
| D533,404 S | 12/2006 | Mansfield |
| 7,165,697 B1 | 1/2007 | Checkalski |
| 7,175,042 B2 | 2/2007 | Durdon |
| 7,211,958 B2 | 5/2007 | Maurer et al. |
| 7,246,715 B2 | 7/2007 | Smith et al. |
| D613,624 S | 4/2010 | Bodum |
| 7,802,446 B2 | 9/2010 | Overgaard |
| 7,942,260 B1 | 5/2011 | Rodriguez |
| 7,946,126 B2 | 5/2011 | Blankman et al. |
| 8,172,079 B2 | 5/2012 | Greenberg et al. |
| 8,226,126 B2 | 7/2012 | Johns et al. |
| 8,272,529 B2 | 9/2012 | Mansfield et al. |
| D675,875 S | 2/2013 | Miller |
| 8,381,935 B1 | 2/2013 | Buck |
| 8,418,865 B2 | 4/2013 | Cho |
| 8,584,890 B2 | 11/2013 | Roberts |
| 8,695,845 B2 | 4/2014 | Buck |
| 8,701,906 B1 | 4/2014 | Anderson |
| 8,733,578 B2 | 5/2014 | Michaels |
| 8,800,801 B2 | 8/2014 | Freeman |
| 8,807,372 B2 | 8/2014 | Kao |
| 8,919,592 B2 | 12/2014 | Buck |
| 8,939,311 B2 | 1/2015 | Christopoulos et al. |
| 8,939,312 B1 | 1/2015 | Buck |
| 2003/0178337 A1 | 9/2003 | Friedman |
| 2004/0237573 A1 | 12/2004 | Jagger et al. |
| 2005/0178677 A1 | 8/2005 | Morrow |
| 2008/0011710 A1 | 1/2008 | Cohn |
| 2008/0116164 A1 | 5/2008 | Dellinger et al. |
| 2010/0206881 A1 | 8/2010 | O'Connor et al. |
| 2011/0198355 A1 | 8/2011 | Mullen |
| 2012/0103841 A1 | 5/2012 | Winkler |
| 2012/0168440 A1 | 7/2012 | Nerswick et al. |
| 2012/0224451 A1 | 9/2012 | Sabadicci et al. |
| 2012/0292283 A1 | 11/2012 | Kornbrust |
| 2013/0025738 A1 | 1/2013 | Norris |
| 2013/0056464 A1 | 3/2013 | Buck |
| 2013/0134169 A1 | 5/2013 | Michaels |
| 2013/0213960 A1 | 8/2013 | Cook |
| 2013/0228486 A1 | 9/2013 | Buck |
| 2014/0048505 A1 | 2/2014 | Altus et al. |
| 2014/0103037 A1 | 4/2014 | Strominger |
| 2014/0147559 A1 | 5/2014 | Aidan |
| 2014/0346169 A1 | 11/2014 | Strominger |

\* cited by examiner

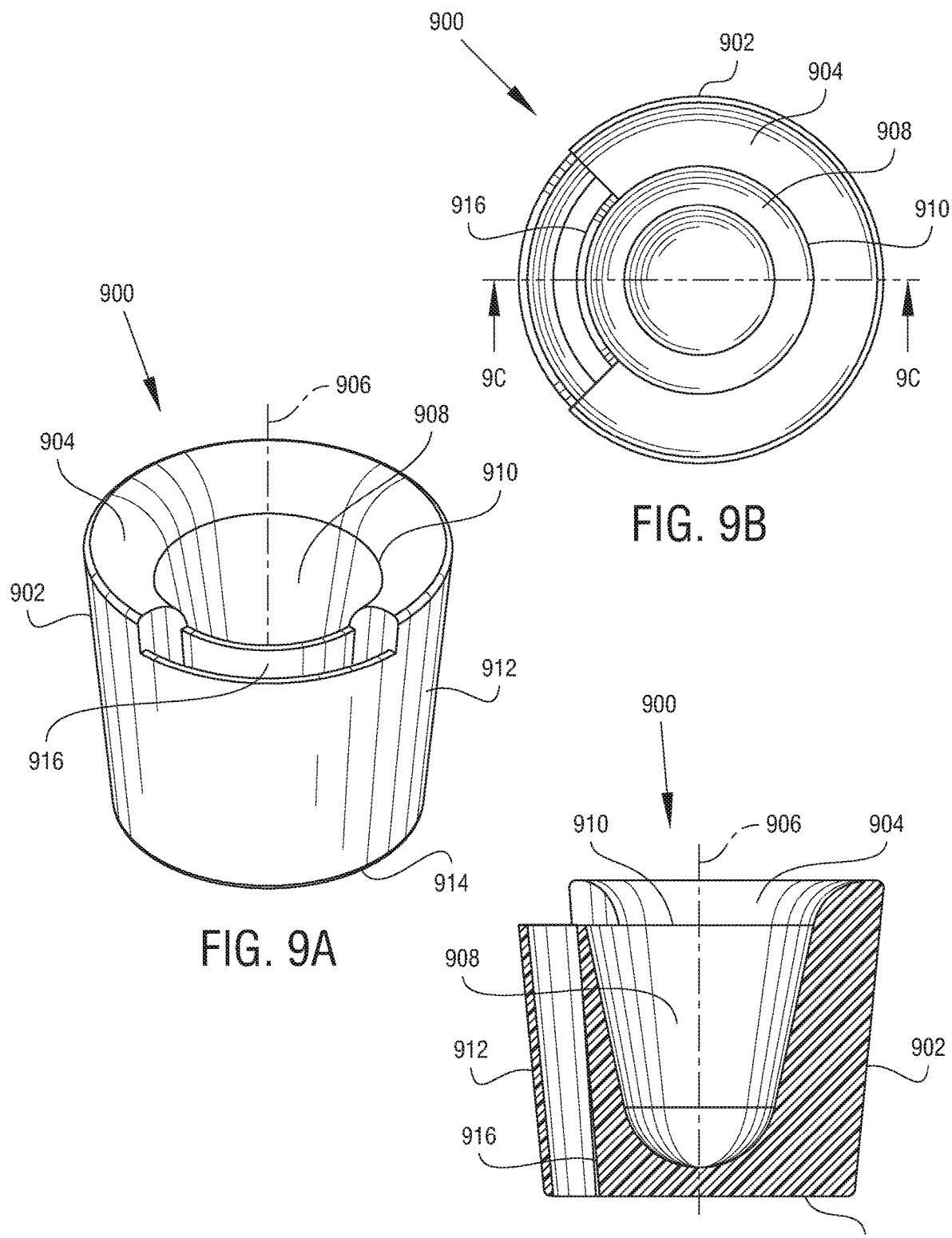

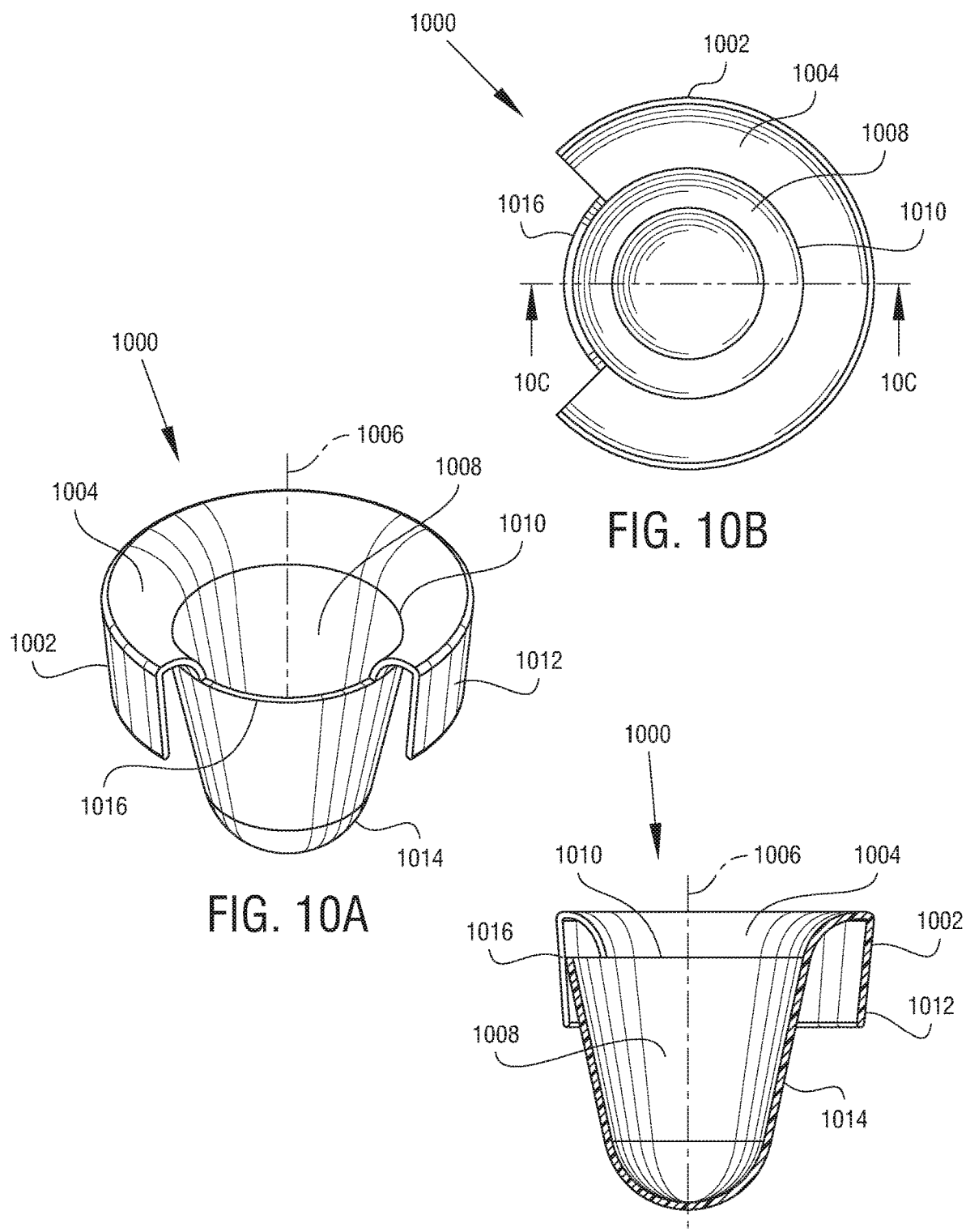

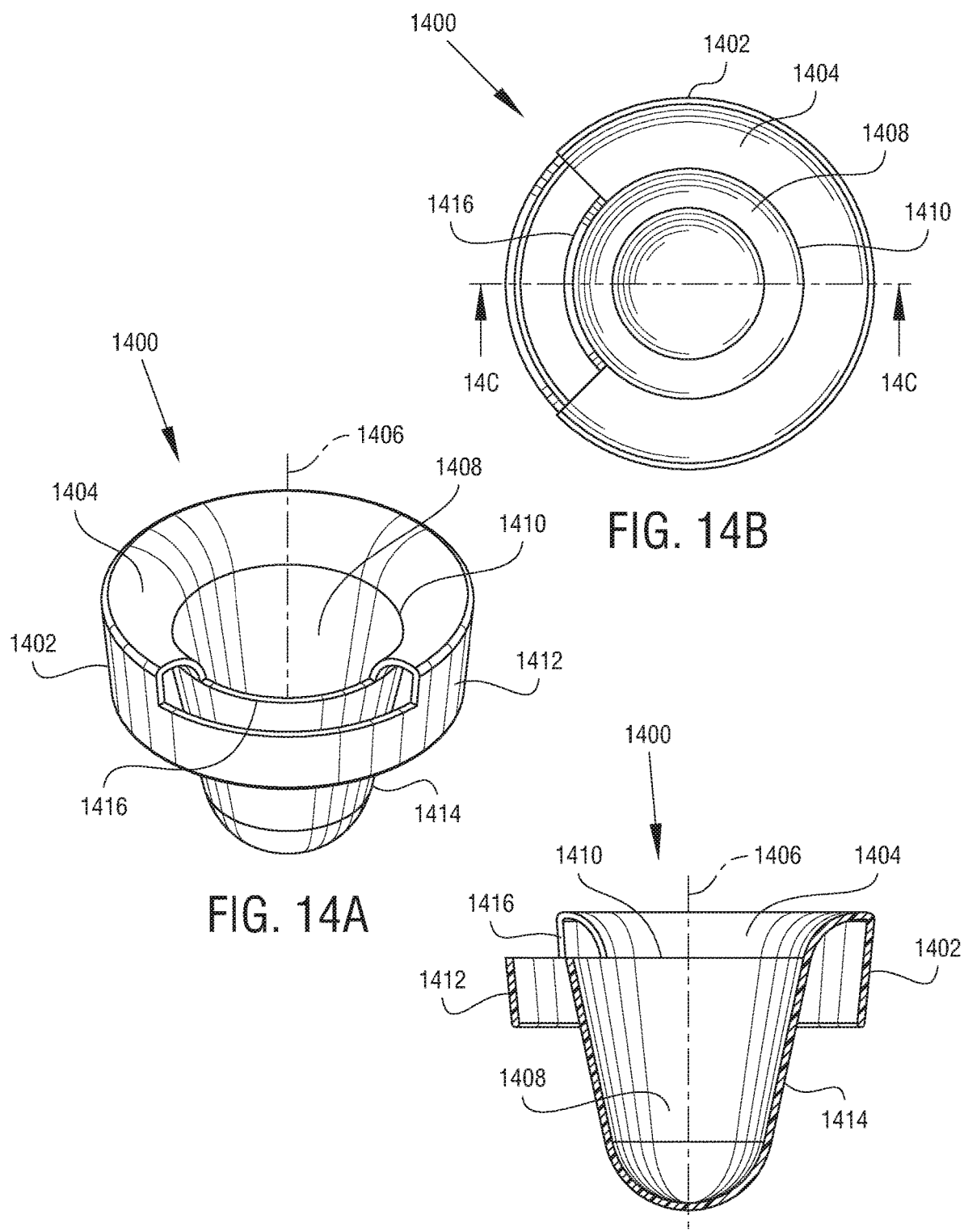

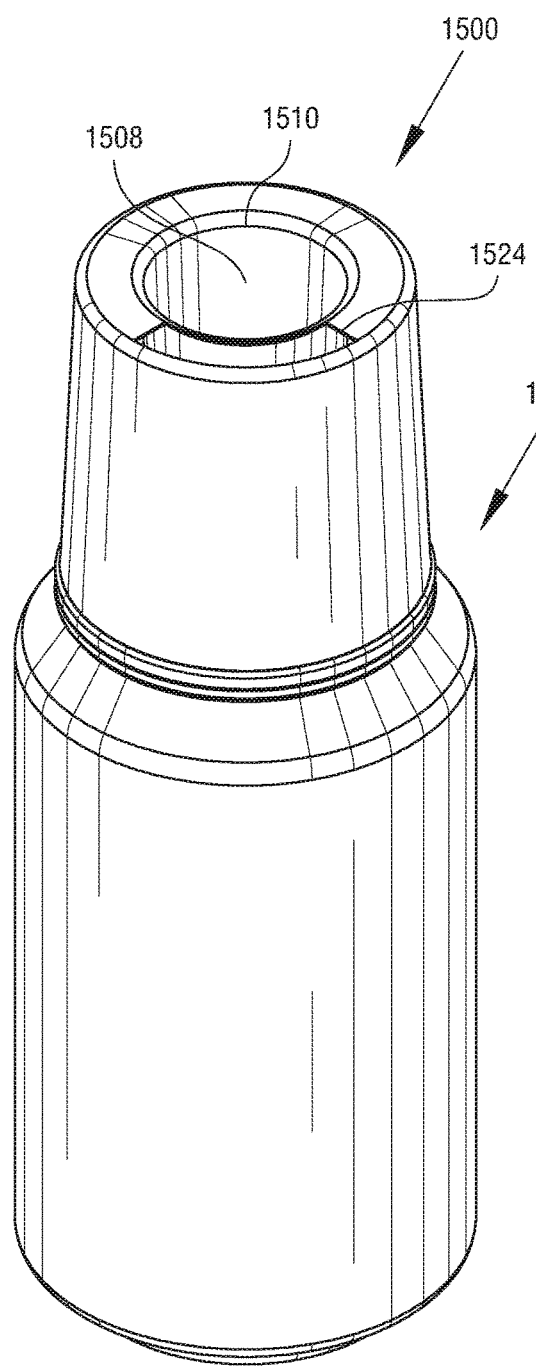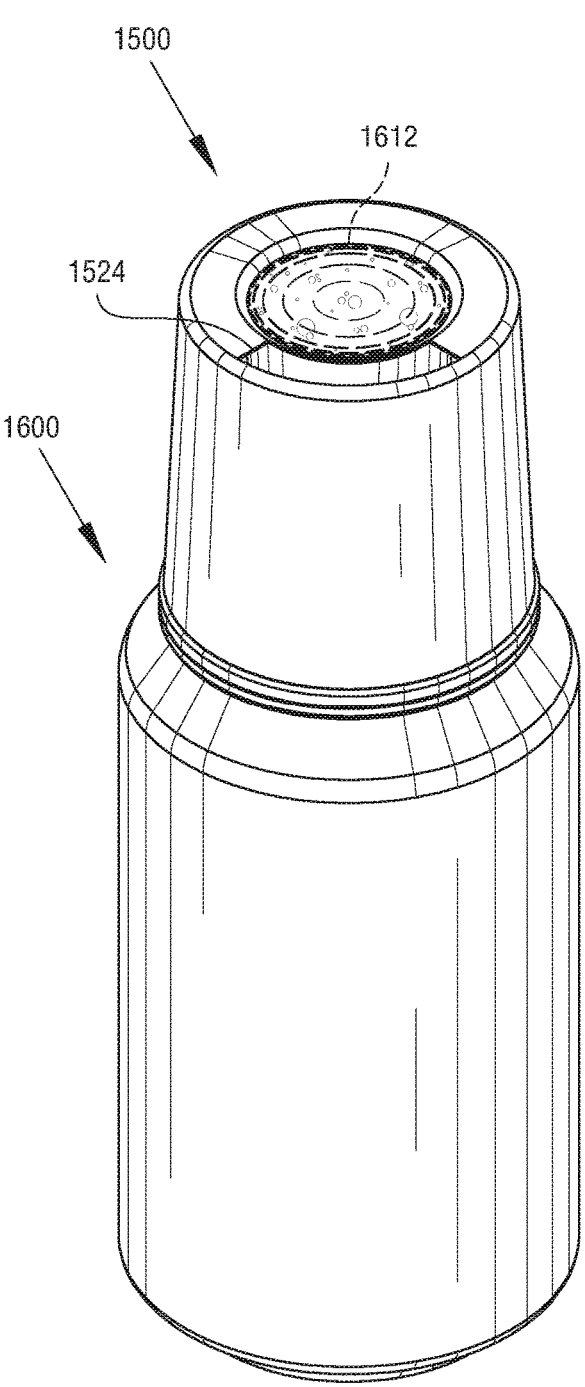
FIG. 16B
FIG. 16C

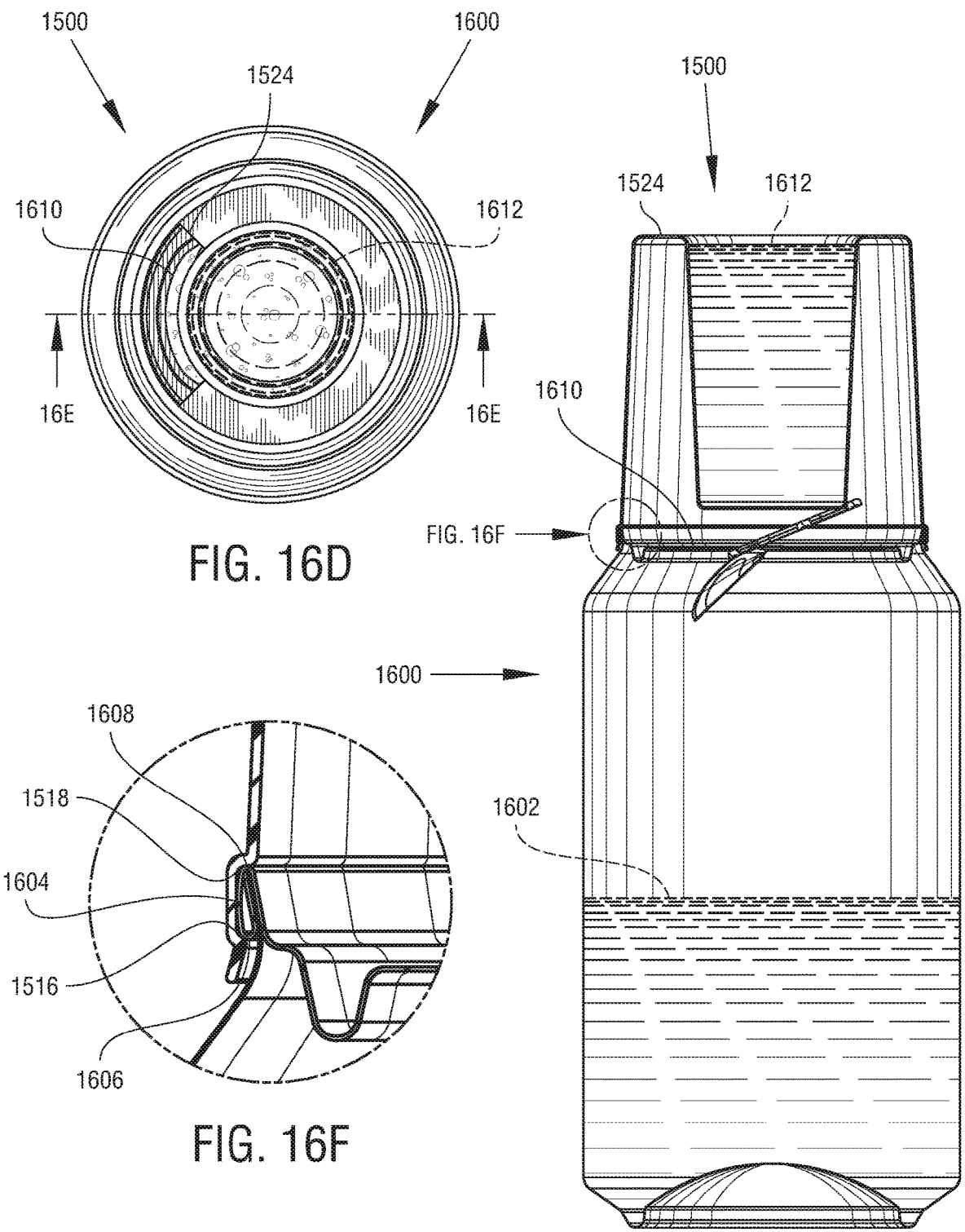

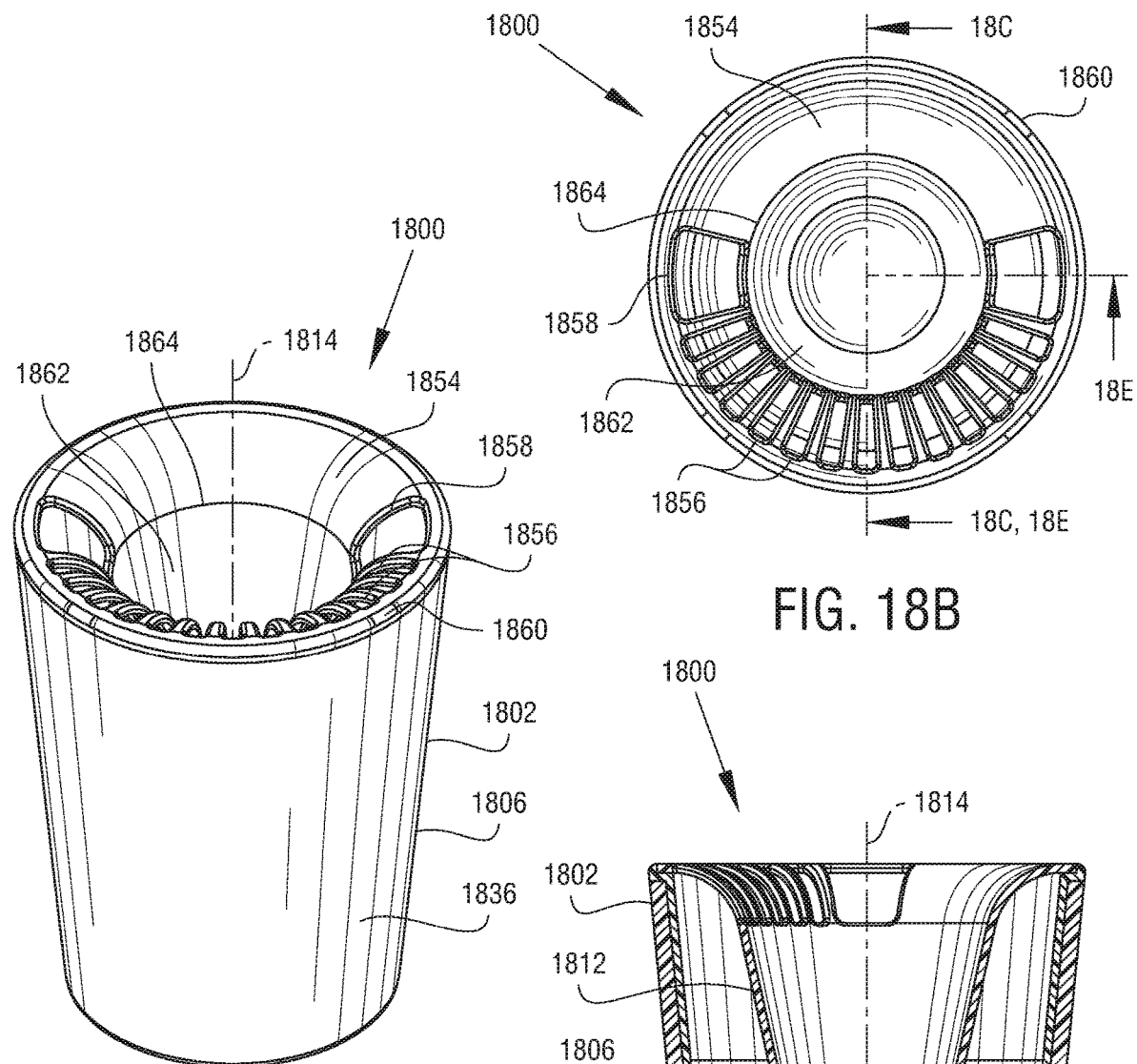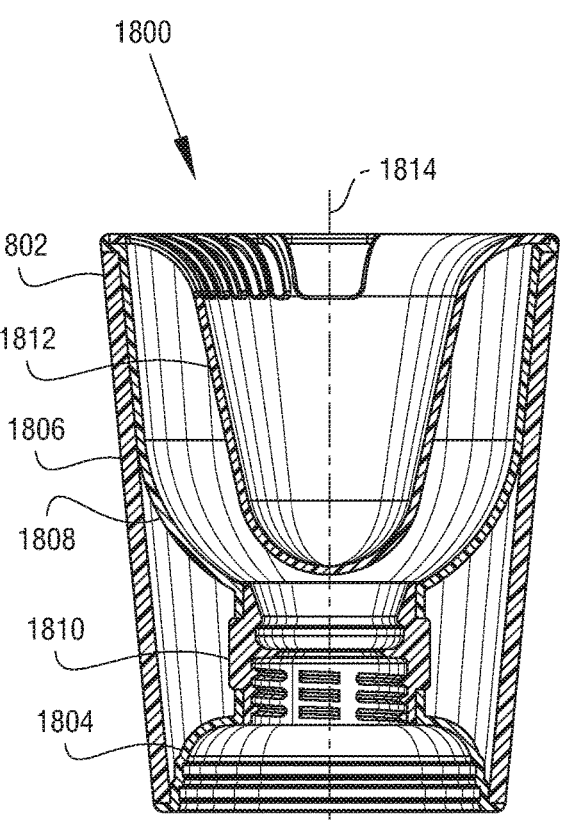

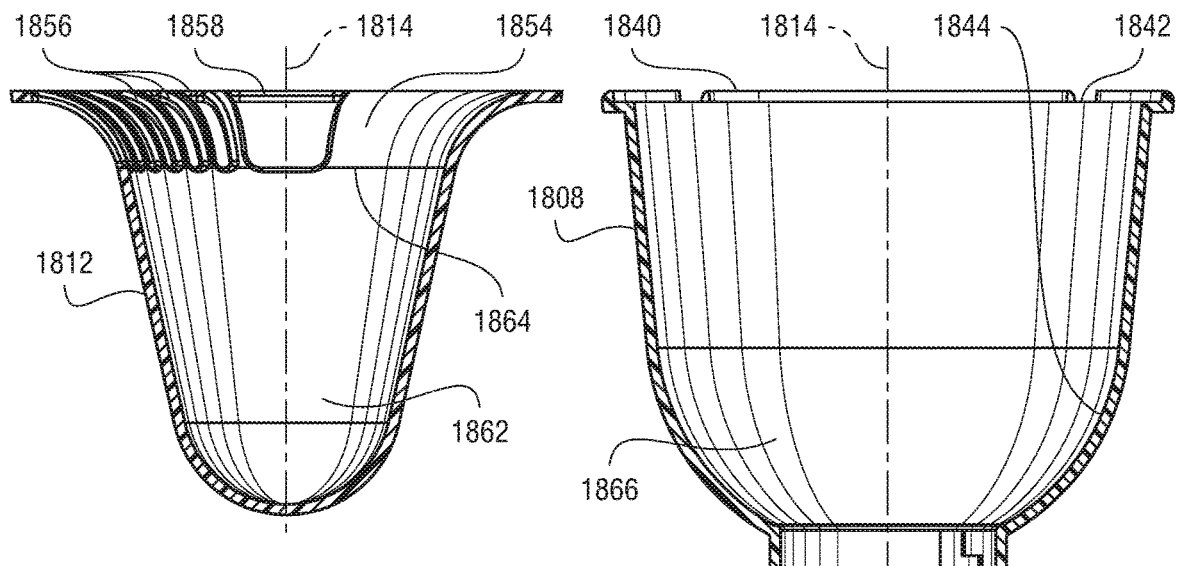
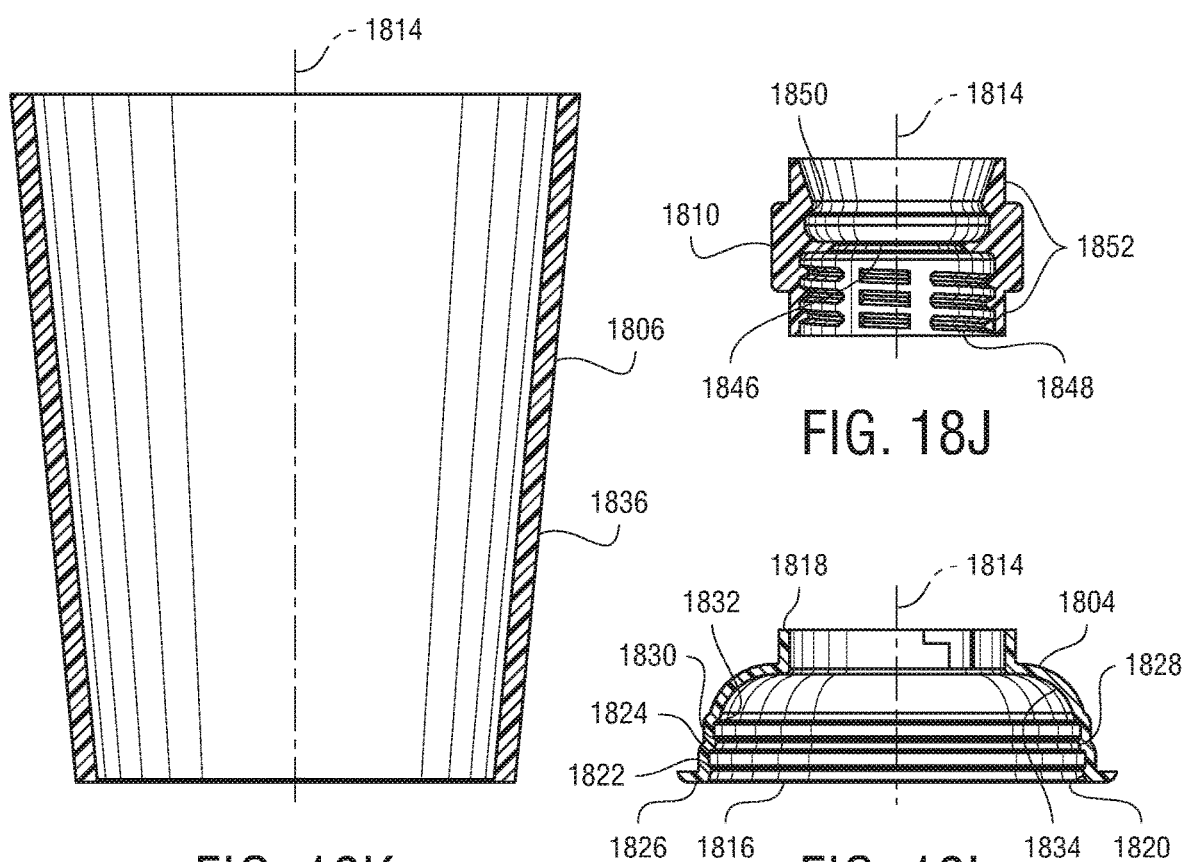

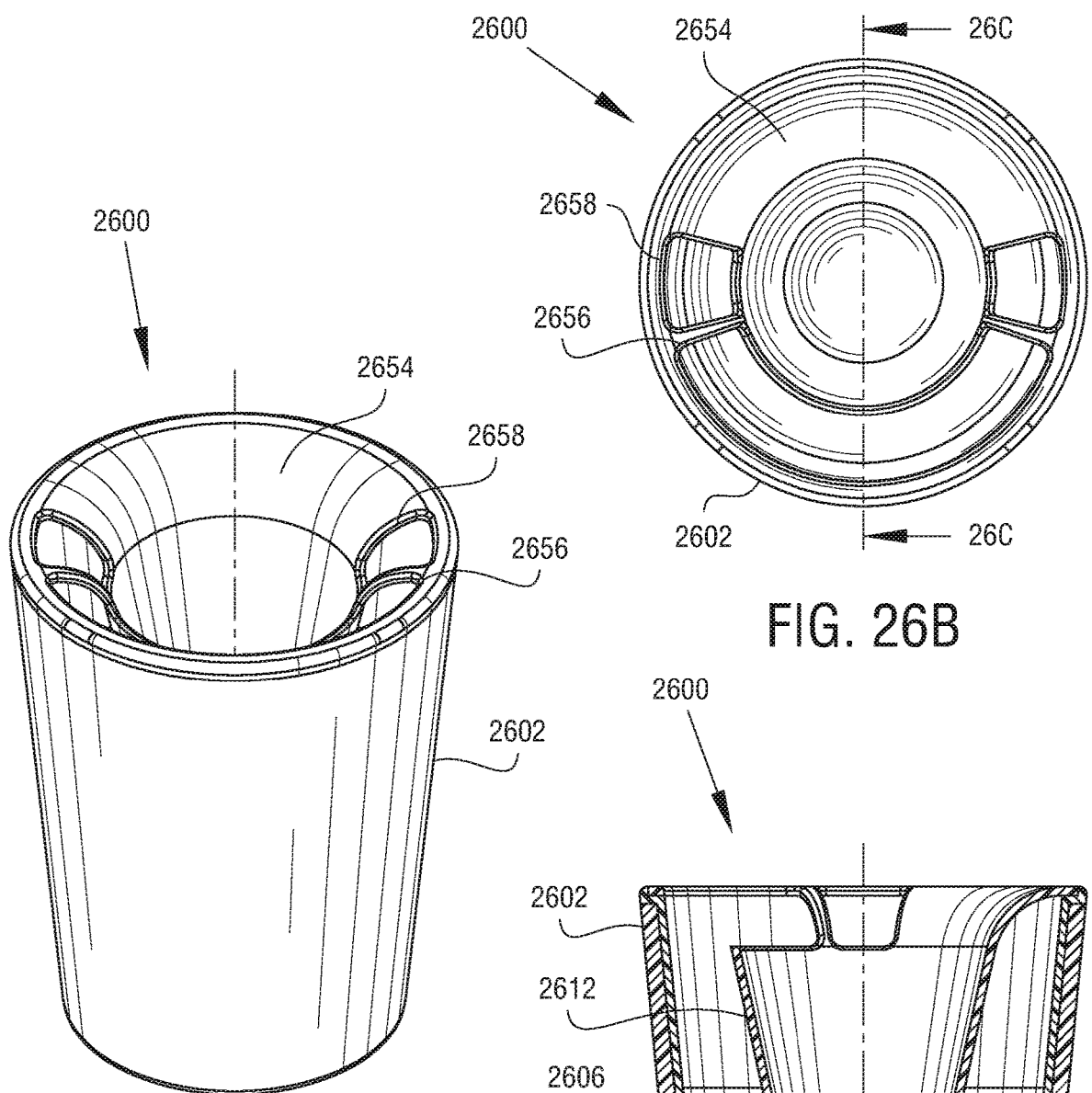

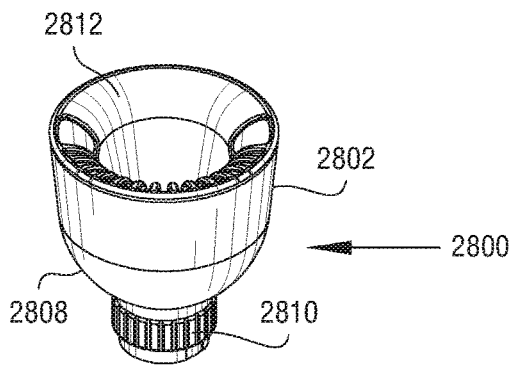
FIG. 28A
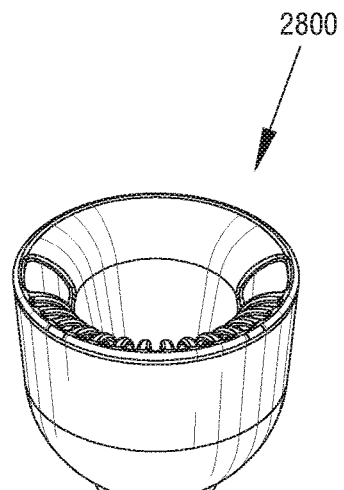
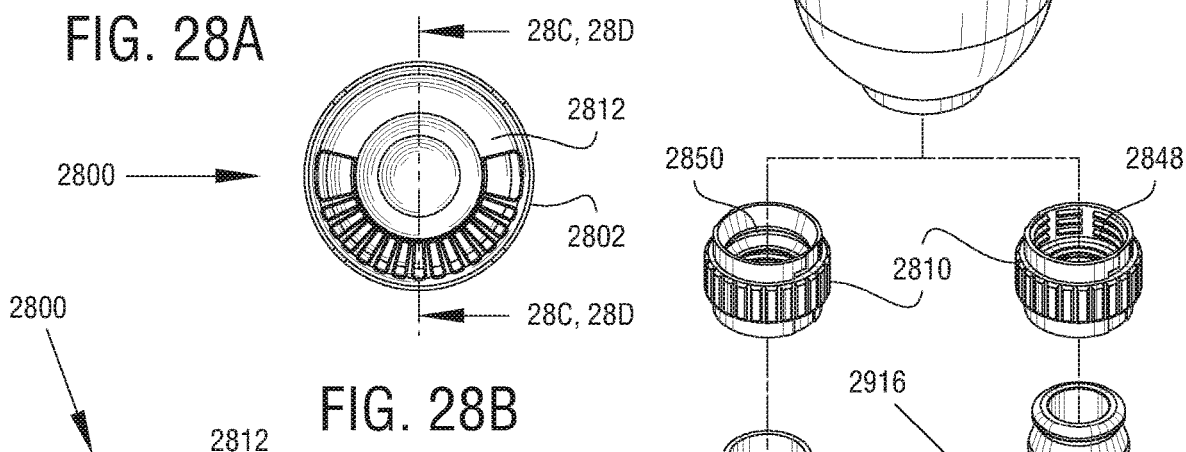
FIG. 28B
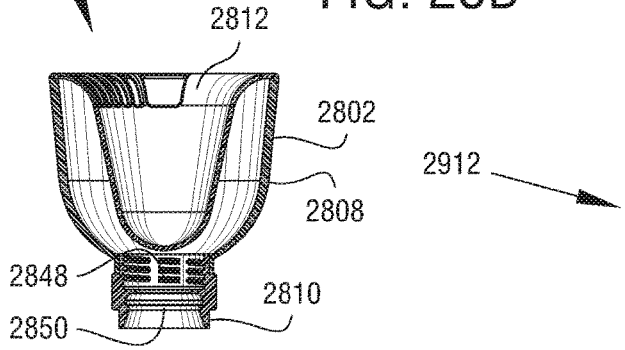
FIG. 28C
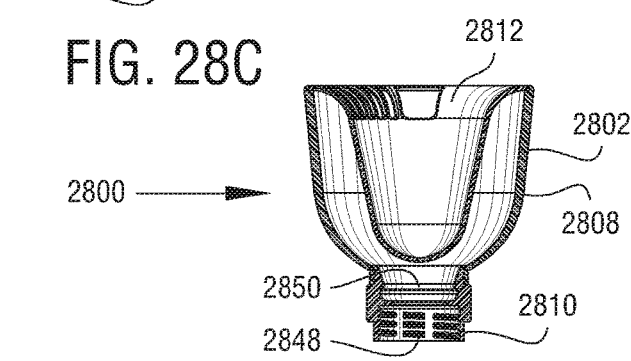
FIG. 28D
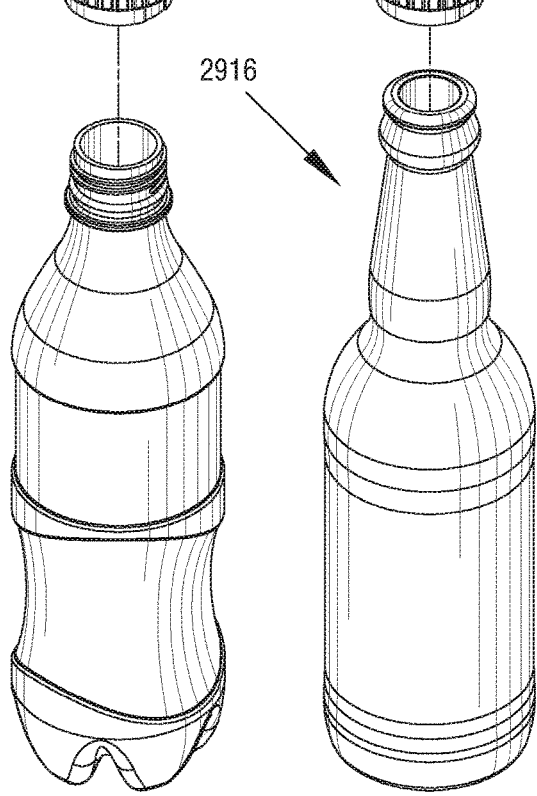
FIG. 29

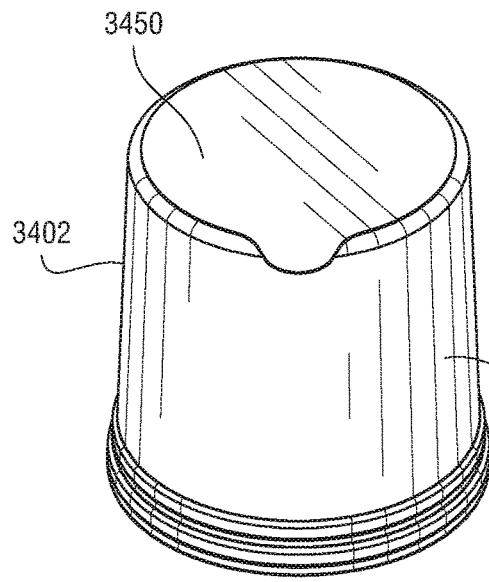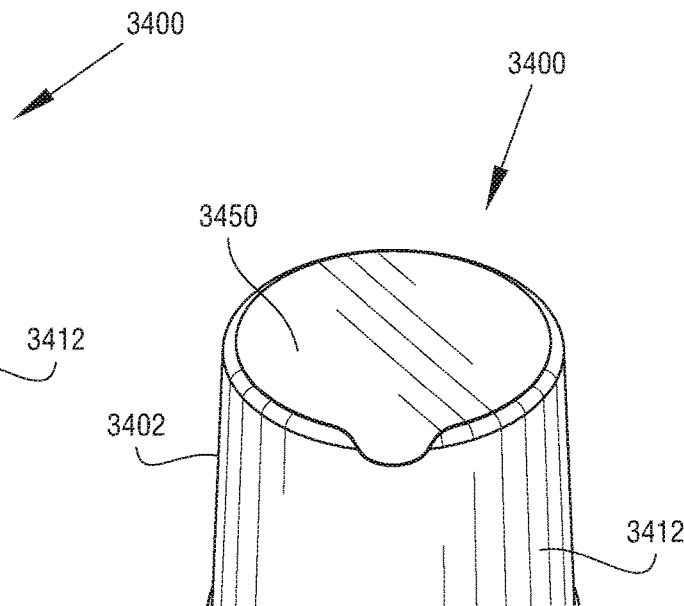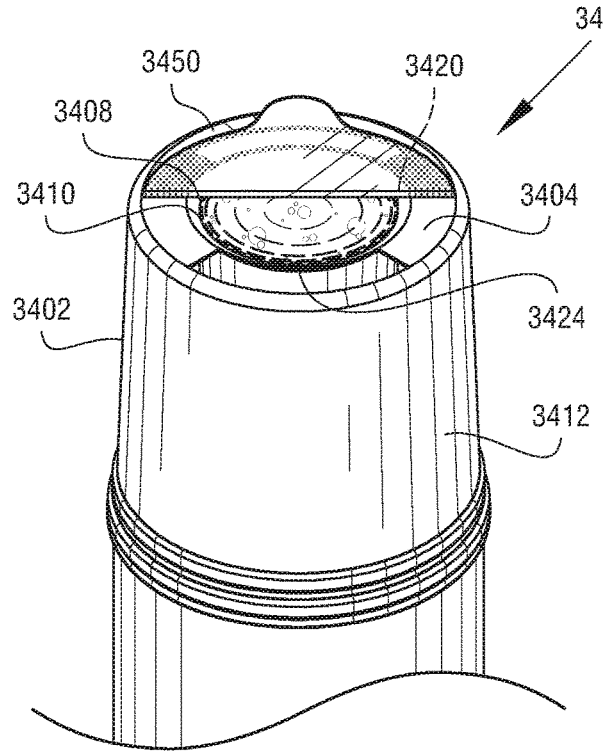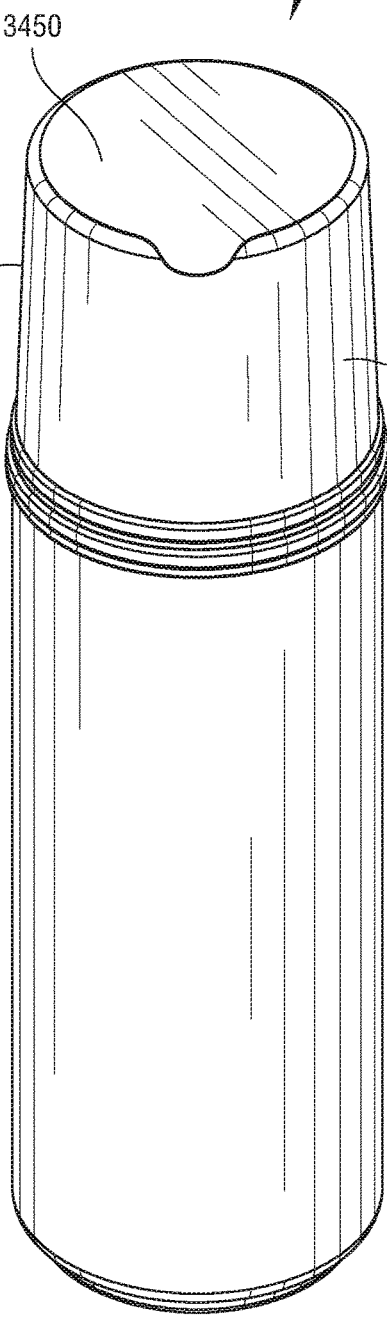
FIG. 34A
FIG. 34C
FIG. 34B

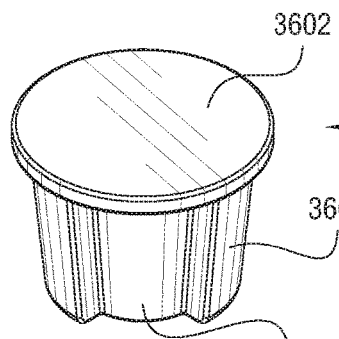
FIG. 36A
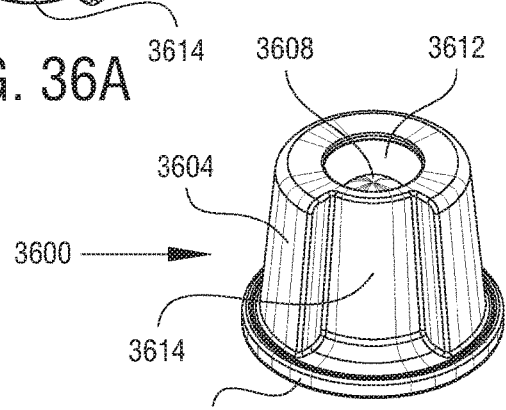
FIG. 36B
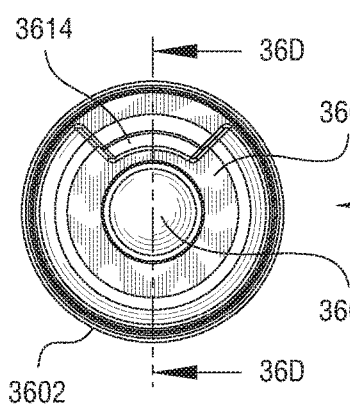
FIG. 36C
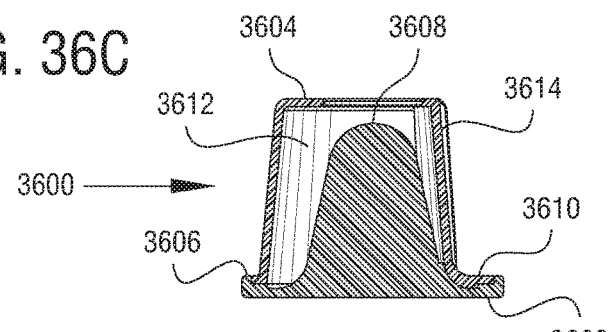
FIG. 36D
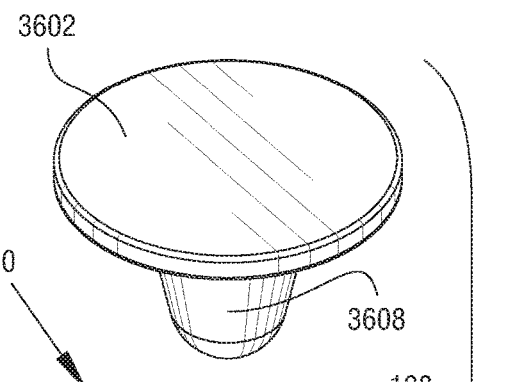
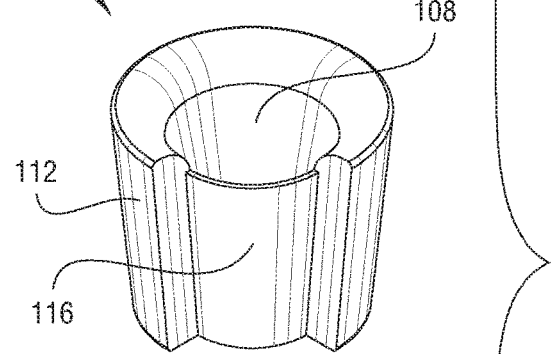
FIG. 36E

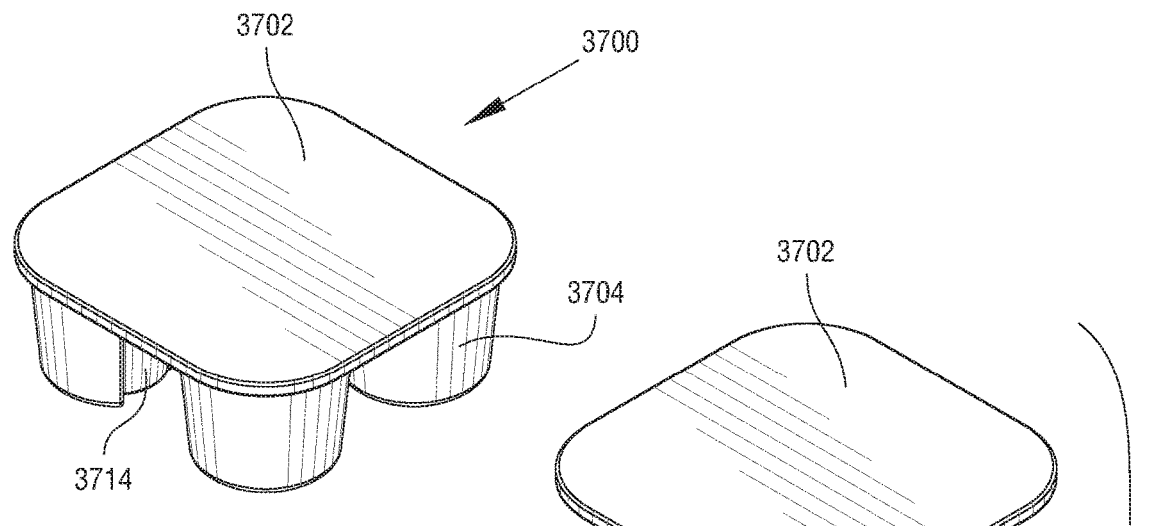
FIG. 37A
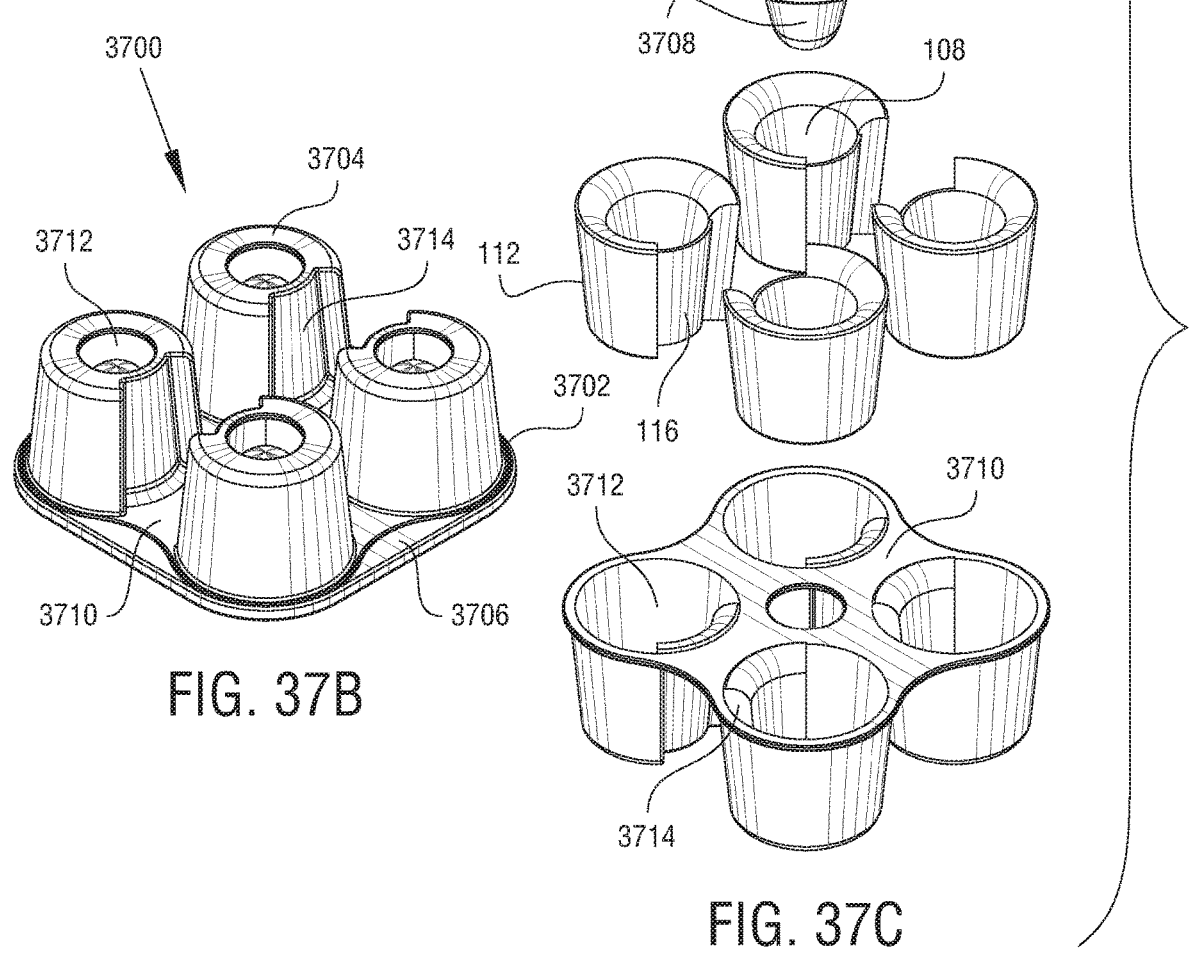
FIG. 37B
FIG. 37C

DEVICES AND METHODS FOR CONSUMING A PLURALITY OF LIQUIDS AND MOLD APPARATUSES FOR FORMING SUCH DEVICES

CROSS-REFERENCE TO RELATED APPLICATION

This application is a continuation of U.S. application Ser. No. 15/175,825, filed Jun. 7, 2016, now U.S. Pat. No. 10,138,022, and titled "DEVICES AND METHODS FOR CONSUMING A PLURALITY OF LIQUIDS AND MOLD APPARATUSES FOR FORMING SUCH DEVICES," the entire contents of which are incorporated herein by reference for all purposes.

TECHNICAL FIELD

The present disclosure relates to devices and methods for facilitating consumption of a first liquid and shortly thereafter a second liquid. More specifically, the present disclosure relates to devices and methods for facilitating consumption of a relatively harsh liquid (for example, a liquid including alcohol) and shortly thereafter a relatively mild liquid (for example, a liquid lacking alcohol).

BACKGROUND

While many persons enjoy the psychoactive effect produced by the consumption of alcoholic beverages, and often relate its use to times of relaxation, socialization, and celebration, few truly enjoy the flavor and taste profiles of their shared intoxicating constituent—ethanol. Consequently, and since the advent of distilled beverages, creative minds have developed numerous concoctions and unique methods of consumption to disguise the undesirable flavor and taste of ethyl alcohol.

Distilled beverages are prepared in a number of ways, including neat or straight, straight up, on the rocks, blended or frozen, with a simple mixer, as an ingredient of a cocktail or shooter, with water, with water poured over sugar, or the like. Depending on the type of liquor, mixer, or both, these drinks are also served in various forms of glassware, including pint glasses, goblet glasses, snifter glasses, cocktail glasses, margarita glasses, highball glasses, rocks glasses, Irish coffee glasses, shot glasses, shooter glasses or the like.

In recent years, many alcoholic beverage connoisseurs have adopted a method of drinking distilled beverages that includes consuming a shot of liquor from a shot glass, bottle, or other beverage container followed by a relatively mild beverage, such as a carbonated soft drink, alcoholic beverage, fruit juice, "energy" drink, or the like, from a different beverage container. This relatively mild beverage is typically, and appropriately, referred to as a "chaser." This method is used to wash out the mouth and soothe the throat.

Recent developments have attempted to mimic this practice via a single-unit drinking device. However, these devices typically only keep the distilled liquor and relatively mild beverage separated prior to tilting the device. That is, upon tilting the device, the compartmented liquids begin to mix prior to entering the user's mouth, which is essentially the same as consuming a poorly mixed drink. In other cases, a shot glass containing liquor is dropped into another partially-filled beverage container prior to consumption, which not only creates a mess, but also requires an additional step in preparing a mixed drink.

SUMMARY

The present disclosure provides various devices and methods for consuming a plurality of liquids and mold apparatuses for forming such devices.

A device for consuming a plurality of liquids according to embodiments of the present disclosure includes: a first liquid chamber adapted to carry a first liquid, the first liquid chamber including an open end adapted for receiving the first liquid in the first liquid chamber and delivering the first liquid from the first liquid chamber; a second liquid chamber coupled to the first liquid chamber, the second liquid chamber including: an inlet adapted for receiving liquids in the second liquid chamber; an outlet adapted for delivering liquids from the second liquid chamber; a first attachment element coupled to the first and second liquid chambers, the first attachment element adapted to detachably couple the device to a first liquid container and facilitate receiving a second liquid carried by the first liquid container in the second liquid chamber via the inlet; and a second attachment element coupled to the first and second liquid chambers, the second attachment element adapted to detachably couple the device to a second liquid container and facilitate receiving a third liquid carried by the second liquid container in the second liquid chamber via the inlet.

The device described herein above, further including a third attachment element coupled to the first and second liquid chambers, the third attachment element adapted to detachably couple the device to a third liquid container and facilitate receiving a fourth liquid carried by the third liquid container in the second liquid chamber via the inlet.

The device(s) described herein above, wherein the first liquid container is a first tab-opened container having a first rim, the first attachment element includes a first shoulder having a first size, and the first shoulder being adapted to detachably couple to the first rim of the first tab-opened container; and wherein the second liquid container is a second tab-opened container having a second rim, the second attachment element includes a second shoulder having a second size, the second size being greater than the first size, and the second shoulder being adapted to detachably couple to the second rim of the second tab-opened container.

The device(s) described herein above, wherein the third liquid container is a twist-off capped container including a container outlet and an outer threaded surface at the container outlet, the third attachment element includes an inner threaded surface being adapted to detachably couple to the outer threaded surface of the twist-off capped container.

The device(s) described herein above, wherein the third liquid container is a pry-off capped container including a container outlet and a lip at the container outlet, the third attachment element includes a third shoulder being adapted to detachably couple to the lip of the pry-off capped container.

The device(s) described herein above, wherein the first liquid container is a first tab-opened container having a first rim, the first attachment element includes a first shoulder having a first size, and the first shoulder being adapted to detachably couple to the first rim of the first tab-opened container; wherein the second liquid container is a twist-off capped container including a first container outlet and an outer threaded surface at the first container outlet, the second attachment element includes an inner threaded surface being adapted to detachably couple to the outer threaded surface of the twist-off capped container; and wherein the third liquid container is a pry-off capped container including a second container outlet and a lip at the second container outlet, the third attachment element includes a third shoulder being adapted to detachably couple to the lip of the pry-off capped container.

The device(s) described herein above, wherein the first liquid container is a first tab-opened container having a first rim, the first attachment element includes a first shoulder having a first size, and the first shoulder being adapted to detachably couple to the first rim of the first tab-opened container; wherein the second liquid container is a capped container including a container outlet, the second attachment element being adapted to detachably couple to the container outlet; and wherein the third liquid container is a coverless container, the third attachment element includes a tapering outer surface of the device, and the tapering outer surface being adapted to be detachably received by the coverless container.

The device(s) described herein above, further including a fourth attachment element coupled to the first and second liquid chambers, the fourth attachment element adapted to detachably couple the device to a fourth liquid container and facilitate receiving a fourth liquid carried by the fourth liquid container in the second liquid chamber via the inlet.

The device(s) described herein above, wherein the first liquid container is a first tab-opened container having a first rim, the first attachment element includes a first shoulder having a first size, and the first shoulder being adapted to detachably couple to the first rim of the first tab-opened container; wherein the second liquid container is a second tab-opened container having a second rim, the second attachment element includes a second shoulder having a second size, the second size being greater than the first size, and the second shoulder being adapted to detachably couple to the second rim of the second tab-opened container; wherein the third liquid container is a twist-off capped container including a first container outlet and an outer threaded surface at the first container outlet, the third attachment element includes an inner threaded surface being adapted to detachably couple to the outer threaded surface of the twist-off capped container; and wherein the fourth liquid container is a pry-off capped container including a second container outlet and a lip at the second container outlet, the fourth attachment element includes a third shoulder having a third size, the third size being less than the first size, and the third shoulder being adapted to detachably couple to the lip of the pry-off capped container.

The device(s) described herein above, wherein the first liquid container is a first tab-opened container having a first rim, the first attachment element includes a first shoulder having a first size, and the first shoulder being adapted to detachably couple to the first rim of the first tab-opened container; wherein the second liquid container is a second tab-opened container having a second rim, the second attachment element includes a second shoulder having a second size, the second size being greater than the first size, and the second shoulder being adapted to detachably couple to the second rim of the second tab-opened container; wherein the third liquid container is a capped container including a container outlet, the third attachment element being adapted to detachably couple to the container outlet; and wherein the fourth liquid container is a coverless container, the fourth attachment element includes a tapering outer surface of the device, and the tapering outer surface being adapted to be detachably received by the coverless container.

The device(s) described herein above, wherein the first liquid container is a first tab-opened container having a first rim, the first attachment element includes a first shoulder having a first size, and the first shoulder being adapted to detachably couple to the first rim of the first tab-opened container; wherein the second liquid container is a twist-off capped container including a first container outlet and an outer threaded surface at the first container outlet, the second attachment element includes an inner threaded surface being adapted to detachably couple to the outer threaded surface of the twist-off capped container; wherein the third liquid container is a pry-off capped container including a second container outlet and a lip at the second container outlet, the third attachment element includes a third shoulder being adapted to detachably couple to the lip of the pry-off capped container; and wherein the fourth liquid container is a coverless container, the fourth attachment element includes a tapering outer surface of the device, and the tapering outer surface being adapted to be detachably received by the coverless container.

The device(s) described herein above, further including a fifth attachment element coupled to the first and second liquid chambers, the fifth attachment element adapted to detachably couple the device to a fifth liquid container and facilitate receiving a fifth liquid carried by the fifth liquid container in the second liquid chamber via the inlet.

The device(s) described herein above, wherein the first liquid container is a first tab-opened container having a first rim, the first attachment element includes a first shoulder having a first size, and the first shoulder being adapted to detachably couple to the first rim of the first tab-opened container; wherein the second liquid container is a second tab-opened container having a second rim, the second attachment element includes a second shoulder having a second size, the second size being greater than the first size, and the second shoulder being adapted to detachably couple to the second rim of the second tab-opened container; wherein the third liquid container is a twist-off capped container including a first container outlet and an outer threaded surface at the first container outlet, the third attachment element includes an inner threaded surface being adapted to detachably couple to the outer threaded surface of the twist-off capped container; wherein the fourth liquid container is a pry-off capped container including a second container outlet and a lip at the second container outlet, the fourth attachment element includes a third shoulder having a third size, the third size being less than the first size, and the third shoulder being adapted to detachably couple to the lip of the pry-off capped container; and wherein the fifth liquid container is a coverless container, the fifth attachment element includes a tapering outer surface of the device, and the tapering outer surface being adapted to be detachably received by the coverless container.

The device(s) described herein above, further including an adapter including the inner threaded surface and the third shoulder, the adapter being detachably coupled to the first shoulder and the second shoulder.

The device(s) described herein above, wherein the adapter is reversibly connectable to the first shoulder and the second shoulder in a first position and a second position, in the first position the inner threaded surface being adapted to detachably couple to the outer threaded surface of the twist-off capped container, and in the second position the third shoulder being adapted to detachably couple to the lip of the pry-off capped container.

The device(s) described herein above, wherein in the first position the inner threaded surface is disposed between the third shoulder and the first shoulder, and in the second position the third shoulder is disposed between the inner threaded surface and the first shoulder.

The device(s) described herein above, wherein the first liquid container is a first tab-opened container having a first rim, the first attachment element includes a first shoulder having a first size, and the first shoulder being adapted to detachably couple to the first rim of the first tab-opened container; and wherein the second liquid container is a second tab-opened container having a second rim, the second attachment element includes a second shoulder having a second size, the second size being greater than the first size, and the second shoulder being adapted to detachably couple to the second rim of the second tab-opened container.

The device(s) described herein above, wherein the first liquid container is a first tab-opened container having a first rim, the first attachment element includes a first shoulder having a first size, and the first shoulder being adapted to detachably couple to the first rim of the first tab-opened container, and further including an adapter detachably coupled to the first attachment element and including the second attachment element.

The device(s) described herein above, wherein the second liquid container is a twist-off capped container including a first container outlet and an outer threaded surface at the first container outlet, the second attachment element includes an inner threaded surface being adapted to detachably couple to the outer threaded surface of the twist-off capped container.

The device(s) described herein above, wherein the adapter further includes a third attachment element adapted to detachably couple the device to a third liquid container and facilitate receiving a fourth liquid carried by the third liquid container in the second liquid chamber via the inlet, wherein the third liquid container is a pry-off capped container including a second container outlet and a lip at the second container outlet, and the third attachment element includes a third shoulder being adapted to detachably couple to the lip of the pry-off capped container.

The device(s) described herein above, wherein the adapter is reversibly connectable to the first shoulder in a first position and a second position, in the first position the inner threaded surface being adapted to detachably couple to the outer threaded surface of the twist-off capped container, and in the second position the third shoulder being adapted to detachably couple to the lip of the pry-off capped container.

The device(s) described herein above, wherein in the first position the inner threaded surface is disposed between the third shoulder and the first shoulder, and in the second position the third shoulder is disposed between the inner threaded surface and the first shoulder.

The device(s) described herein above, wherein the second liquid container is a pry-off capped container including a container outlet and a lip at the container outlet, the second attachment element includes a second shoulder being adapted to detachably couple to the lip of the pry-off capped container.

A device for consuming a plurality of liquids according to embodiments of the present disclosure includes: a brim; a first liquid chamber coupled to the brim and adapted to carry a first liquid, the first liquid chamber including an open end adapted for receiving the first liquid in the first liquid chamber and delivering the first liquid from the first liquid chamber; a outer surface coupled to the brim, the outer surface being adapted to press-fittingly engage an inner surface of a coverless container to detachably secure the device to the coverless container; a lower surface coupled to the outer surface; and a channel extending from the lower surface to the brim, the channel being adapted to deliver therethrough a second liquid carried by the coverless container.

The device described herein above, wherein the device includes a unitary body defining the brim, the first liquid chamber, the outer surface, the lower surface, and the channel.

The device(s) described herein above, wherein the outer surface tapers inwardly proceeding from the brim to the lower surface.

The device(s) described herein above, wherein the first liquid chamber has a circular cross-sectional shape, the outer surface has a semi-circular cross-sectional shape, and the semi-circular cross-sectional shape is substantially concentrically disposed relative to the circular cross-sectional shape.

The device(s) described herein above, further including a removal element coupled to and extending from the brim, the removal element being adapted to be grasped by a user to facilitate removal of the device from the coverless container.

A method according to embodiments of the present disclosure for consuming a first liquid and a second liquid carried by a liquid container, the liquid container including a liquid container outlet adapted to permit passage of the second liquid therethrough, includes: providing a device having a body, the body including: a first liquid chamber adapted to carry the first liquid; an attachment element coupled to the first liquid chamber and adapted to attach the device to the liquid container proximate the liquid container outlet; a device outlet adapted to permit passage of the second liquid therethrough; coupling the device to the liquid container proximate the liquid container outlet via the attachment element; positioning a first liquid within the first liquid chamber; positioning the device and the liquid container in a first orientation in which the body is positioned so as to inhibit flow of the second liquid through the device outlet; consuming the first liquid from the first liquid chamber while the device and the liquid container are positioned in the first orientation; repositioning the device and the liquid container in a second orientation in which the body is positioned so as to permit flow of the second liquid through the device outlet; and consuming the second liquid from the device outlet while the device and the liquid container are positioned in the second orientation.

The method described herein above, wherein in the first orientation the device outlet is at a first elevation, in the second orientation the device outlet is at a second elevation, and the second elevation is less than the first elevation.

The method(s) described herein above, wherein the liquid container is a tab-opened container having a rim at the liquid container outlet, the attachment element includes a shoulder, and coupling the device to the liquid container includes detachably engaging the rim and shoulder.

The method(s) described herein above, wherein the liquid container is a twist-off capped container including an outer threaded surface at the liquid container outlet, the attachment element includes an inner threaded surface, and coupling the device to the liquid container includes detachably engaging the outer threaded surface and the inner threaded surface.

The method(s) described herein above, wherein the liquid container is a pry-off capped container including a lip at the liquid container outlet, the attachment element includes a shoulder, and coupling the device to the liquid container includes detachably engaging the lip and the shoulder.

The method(s) described herein above, wherein the liquid container is a coverless container having an inner surface, the attachment element includes a tapering outer surface of the device, and coupling the device to the liquid container includes detachably engaging the outer surface against the inner surface.

The method(s) described herein above, wherein the first liquid has a first alcohol content, the second liquid has a second alcohol content, and the second alcohol content is less than the first alcohol content.

The method(s) described herein above, wherein the first liquid includes alcohol and the second liquid lacks alcohol.

A mold apparatus according to embodiments of the present disclosure for forming a liquid consumption device includes: a die including a die chamber, the die chamber being adapted to receive an uncured material and permit the uncured material to cure therein and thereby form the liquid consumption device; a liquid chamber-forming feature disposed within the die chamber and adapted to form a liquid chamber in the liquid consumption device when the uncured material cures in the die chamber; and a liquid channel-forming feature disposed within the die chamber and adapted to form a liquid channel in an outer surface of the liquid consumption device when the uncured material cures in the die chamber.

The mold apparatus described herein above, wherein the liquid channel-forming feature monolithically couples to the die within the die chamber.

The mold apparatus(es) described herein above, wherein the die is a first die, and further including a second die being movable relative to the first die, the second die including the liquid chamber-forming feature.

The mold apparatus(es) described herein above, wherein the second die further includes a base, and the liquid chamber-forming feature monolithically couples to the base.

The mold apparatus(es) described herein above, wherein the die includes a plurality of die chambers, each of the die chambers being adapted to receive an associated uncured material and permit the associated uncured material to cure therein and thereby form an associated liquid consumption device, and further including: a plurality of liquid chamber-forming features, each of the liquid chamber-forming features disposed within one of the die chambers and adapted to form a liquid chamber in the associated liquid consumption device when the associated uncured material cures in the die chamber; and a plurality of liquid channel-forming features, each of the liquid channel-forming features disposed within one of the die chambers and adapted to form a liquid channel in an outer surface of the associated liquid consumption device when the associated uncured material cures in the die chamber.

The mold apparatus(es) described herein above, wherein each of the liquid channel-forming features monolithically couples to the die within one of the die chambers.

The mold apparatus(es) described herein above, wherein the die is a first die, and further including a second die being movable relative to the first die, the second die including the liquid chamber-forming features.

The mold apparatus(es) described herein above, wherein the second die further includes a base, and the liquid chamber-forming features monolithically couple to the base.

A mold apparatus according to embodiments of the present disclosure for forming a liquid consumption device includes: a base adapted to engage a rim of a coverless container while the coverless container carries an uncured material, the base being adapted to permit the uncured material to cure in the coverless container and thereby form the liquid consumption device; a liquid chamber-forming feature carried by the base and adapted to form a liquid chamber in the liquid consumption device when the uncured material cures in the coverless container; and a liquid channel-forming feature carried by the base and adapted to form a liquid channel in an outer surface of the liquid consumption device when the uncured material cures in the coverless container.

The mold apparatus described herein above, wherein the liquid chamber-forming feature monolithically couples to the base.

The mold apparatus(es) described herein above, wherein the liquid channel-forming feature monolithically couples to the base.

The mold apparatus(es) described herein above, wherein the base is a first base, and further including: a second base adapted to engage a foot of the coverless container; and a plurality of arms detachably coupling the first base to the second base such that the first base and the second base are adapted to securely carry the coverless container therebetween.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

FIG. 9A is a perspective view of a device for facilitating consumption of a plurality of liquids, according to another embodiment of the present disclosure.

FIG. 9B is a top view of the device of FIG. 9A.

FIG. 9C is a longitudinal sectional view of the device along line 9C-9C of FIG. 9B.

FIG. 10A is a perspective view of a device for facilitating consumption of a plurality of liquids, according to another embodiment of the present disclosure.

FIG. 10B is a top view of the device of FIG. 10A.

FIG. 10C is a longitudinal sectional view of the device along line 10C-10C of FIG. 10B.

FIG. 14A is a perspective view of a device for facilitating consumption of a plurality of liquids, according to another embodiment of the present disclosure.

FIG. 14B is a top view of the device of FIG. 14A.

FIG. 14C is a longitudinal sectional view of the device along line 14C-14C of FIG. 14B.

FIG. 16B is a perspective view of the device of FIG. 15A coupled to the can of FIG. 16A.

FIG. 16C is a perspective view of the device of FIG. 15A coupled to the can of FIG. 16A. A liquid has been delivered to the device.

FIG. 16D is a top view of the device and the can of FIG. 16C.

FIG. 16E is a section view of the device and the can along line 16E-16E of FIG. 16D.

FIG. 16F is a detail view of a portion of the device and the can enclosed by line 16F-16F of FIG. 16E.

FIG. 18A is a perspective view of a device for facilitating consumption of a plurality of liquids, according to another embodiment of the present disclosure.

FIG. 18B is a top view of the device of FIG. 18A.

FIG. 18C is a longitudinal sectional view of the device along line 18C-18C of FIG. 18B.

FIG. 18H is a longitudinal sectional view of an upper portion of the device of FIG. 18A along line 18C-18C of FIG. 18B.

FIG. 18I is a longitudinal sectional view of a first inner portion of the device of FIG. 18A along line 18C-18C of FIG. 18B.

FIG. 18J is a longitudinal sectional view of a second inner portion of the device of FIG. 18A along line 18C-18C of FIG. 18B.

FIG. 18K is a longitudinal sectional view of an outer portion of the device of FIG. 18A along line 18C-18C of FIG. 18B.

FIG. 18L is a longitudinal sectional view of a lower portion of the device of FIG. 18A along line 18C-18C of FIG. 18B.

FIG. 26A is a perspective view of a device for facilitating consumption of a plurality of liquids, according to another embodiment of the present disclosure.

FIG. 26B is a top view of the device of FIG. 26A.

FIG. 26C is a longitudinal sectional view of the device along line 26C-26C of FIG. 26B.

FIG. 28A is a perspective view of a device for facilitating consumption of a plurality of liquids, according to another embodiment of the present disclosure.

FIG. 28B is a top view of the device of FIG. 28A.

FIG. 28C is a longitudinal sectional view of the device along line 28C-28C of FIG. 28A with an adapter of the device shown in a first position.

FIG. 28D is a longitudinal sectional view of the device along line 28D-28D of FIG. 28A with the adapter shown in a second position.

FIG. 29 is an exploded perspective view of the device of FIG. 28A and various types of liquid containers that may be coupled to the device.

FIG. 34A is a perspective view of a device for facilitating consumption of a plurality of liquids, according to another embodiment of the present disclosure.

FIG. 34B is a perspective view of the device of FIG. 34A coupled to a container.

FIG. 34C is a partial perspective view of the device and container of FIG. 34B. A cover is being detached from the device to expose a first liquid carried by the device.

FIG. 36A is an upper perspective view of a mold apparatus for forming devices for facilitating consumption of a plurality of liquids, according to an embodiment of the present disclosure.

FIG. 36B is a lower perspective view of the mold apparatus of FIG. 36A.

FIG. 36C is an upper exploded perspective view of the mold apparatus of FIG. 36A and a device formed by the mold apparatus.

FIG. 36D is a bottom view of the mold apparatus of FIG. 36A.

FIG. 36E is a longitudinal sectional view of the mold apparatus along line 36D-36D of FIG. 36D.

FIG. 37A is an upper perspective view of a mold apparatus for forming devices for facilitating consumption of a plurality of liquids, according to another embodiment of the present disclosure.

FIG. 37B is a lower perspective view of the mold apparatus of FIG. 37A.

FIG. 37C is an upper exploded perspective view of the mold apparatus of FIG. 37A and a plurality of devices formed by the mold apparatus.

Figure 1A:
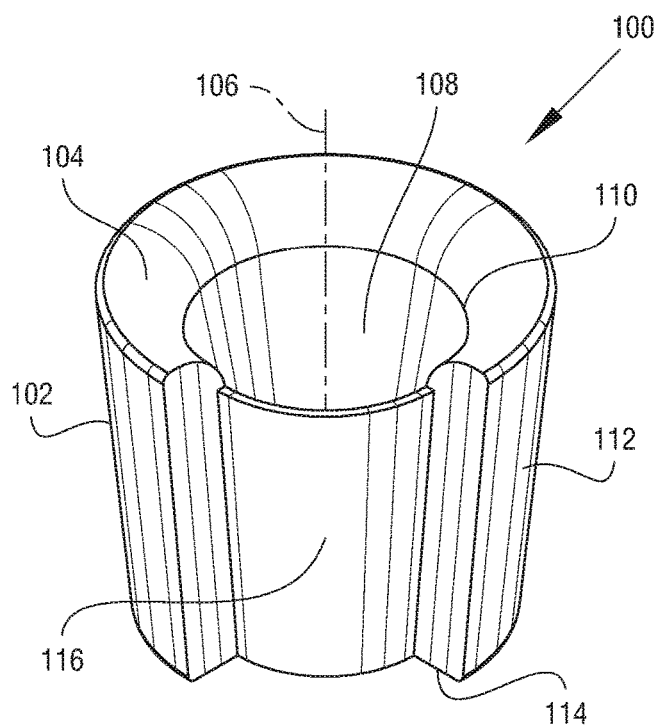
FIG. 1A is a perspective view of a device for facilitating consumption of a plurality of liquids, according to an embodiment of the present disclosure.

It should be understood that the drawings are intended to facilitate understanding of exemplary embodiments of the present disclosure are not necessarily to scale.

DETAILED DESCRIPTION

Devices and methods according to embodiments of the disclosure facilitate consumption of a plurality of liquids, such as a first liquid followed by a second liquid. The first liquid may be a relatively harsh liquid and the second liquid may be a relatively mild liquid. Examples of relatively harsh liquids include distilled beverages, flavored distilled spirits, other liquids including alcohol, wheatgrass, liquid supplements, liquid vitamins, liquid medication, espresso, or the like. Examples of relatively mild liquids include beer, soft drinks, juices, "energy" drinks, coffee, tea, or the like. In some embodiments, a relatively harsh liquid has a relatively high alcohol content and a relatively mild liquid has relatively low alcohol content or lacks alcohol. In some embodiments, a relatively harsh liquid has a relatively dominant taste profile and a relatively mild liquid has a less dominant taste profile. As used herein, the term "taste profile" refers to the sensation of taste, which includes sweetness, sourness, saltiness, bitterness, and umami. In some embodiments, a relatively harsh liquid has a less desirable flavor profile and a relatively mild liquid has a more desirable flavor profile. As used herein, the term "flavor profile" refers to the sensory impression obtained via taste and smell. In some embodiments, a relatively harsh liquid has a higher concentration of dissolved solids and a relatively mild liquid has a lower concentration of dissolved solids.

Devices and methods according to embodiments of the disclosure may be used together with one or more types of liquid containers. Examples of such containers include coverless containers, twist-off capped containers, pry-off capped containers, and tab-opened containers. As used herein, the term "coverless container" refers to a container that lacks a structure that is monolithically coupled to the container's sidewall(s) and overlies the container's liquid chamber, thereby defining an opening that permits flow therethrough. Examples of coverless containers include glassware (such as beer steins, pint glasses, pilsner glasses, pony glasses, yard glasses, or the like), stemware (such as chalices, champagne flutes, cocktail glasses, hurricane glasses, margarita glasses, sherry glasses, snifters, wine glasses, or the like), tumblers (such as Collins glasses, highball glasses, lowball glasses, table glasses, whiskey glasses or the like) and other drinkware (such as beakers, cups, mugs, jars, repurposed laboratory glassware, or the like). As used herein, the term "twist-off capped container" refers to a container that includes a cover or "cap" that is detached from the container by rotating the cover about an axis that is perpendicular to an opening obscured by the cover, thereby permitting flow through the opening. Twist-off capped containers typically take the form of bottles. As used herein, the term "pry-off capped container" refers to a container that includes a cover or "cap" that is detached from the container by pivoting the cover about an axis that is parallel to an opening obscured by the cover, thereby permitting flow through the opening. Examples of pry-off capped containers include containers having crown corks, bottle clasps, bottle closers, easy pull bottle caps, pull-off bottle caps, flip-tops, cork stoppers, glass stoppers, rubber stoppers, or the like. As used herein, the term "tab-opened container" refers to a container that includes a lever or "tab" that is pivoted about an axis that is parallel to an opening to pivot a cover obscuring the opening into the container's chamber, thereby permitting flow through the opening. Tab-opened containers typically take the form of cans including pull-tabs, stay-on-tabs, wide mouths openings, sustainable beverage ends, press buttons, full aperture ends, or the like.

As used herein, the term "cure" refers to processes by which liquids change to solids. Such processes include, for example, freezing a liquid to form a solid, permitting a liquid with dissolved gelatin to set and form a gelatinous solid, heating a batter to set and form a cake, or the like.

Figure 1B:
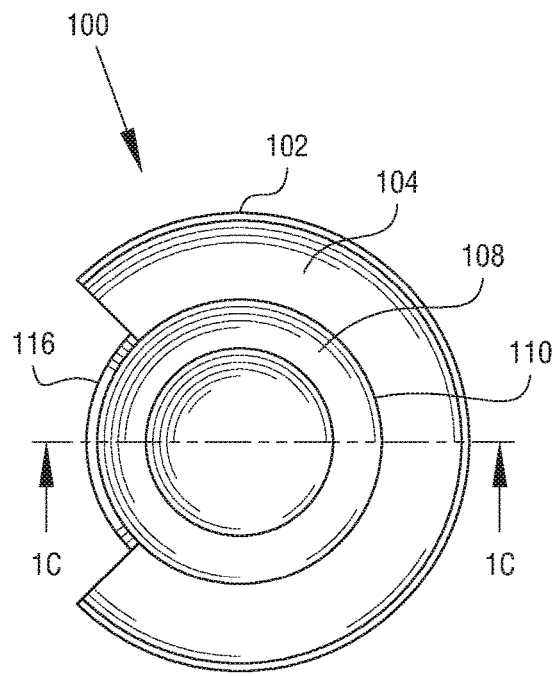
FIG. 1B is a top view of the device of FIG. 1A.
Figure 1C:
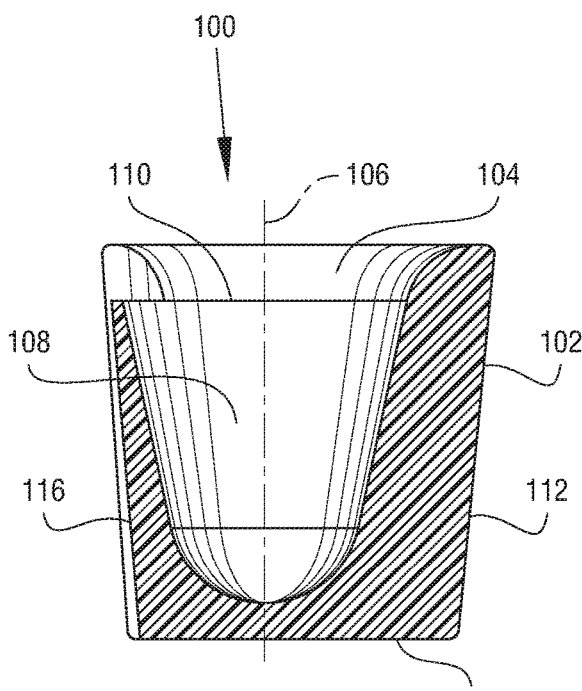
FIG. 1C is a longitudinal sectional view of the device along line 1C-1C of FIG. 1B.

Turning now to the figures, FIGS. 1A-1C illustrate an exemplary device 100 for facilitating consumption of a plurality of liquids when coupled to a liquid container (specifically, in this example, a coverless container). Generally, the device 100 includes a body 102 that is illustratively shown as a unitary component. In other embodiments, however, the body may be formed as two or more distinct components that are coupled to one another.

The body 102 defines a brim 104 that illustratively includes a curved shape (see FIG. 1C). In other embodiments, the brim 104 may have a planar shape or a non-curved shape. Illustratively, the brim 104 has an angular width about a longitudinal axis 106 of the device 100 of substantially 270 degrees (that is, 270 degrees within ±5 degrees). In other embodiments, the brim may have other angular widths about the longitudinal axis 106.

The brim 104 partially extends about and is coupled to a first liquid chamber 108. The first liquid chamber 108 is adapted to carry a first liquid, which may be, for example, any of the relatively harsh liquids described herein. The first liquid chamber 108 includes an open end 110 that facilitates (1) receiving the first liquid in the first liquid chamber 108 (for example, filling the first liquid chamber 108 with the first liquid), and (2) delivering the first liquid from the first liquid chamber 108 (for example, facilitating pouring of the first liquid from the first liquid chamber 108 and consumption of the first liquid by a device user). Illustratively, the first liquid chamber 108 may be concentrically disposed relative to the brim 104. Stated another way, the first liquid chamber 108 and the brim 104 may share a common longitudinal axis 106.

Illustratively, the first liquid chamber 108 tapers inwardly proceeding away from the open end 110. The first liquid chamber 108 may taper at various angles relative to the longitudinal axis 106. In some embodiments and as described in further detail below in connection with FIGS. 3C and 3D, the first liquid chamber 108 may taper at an angle that depends on the dimensions of the coverless container with which the device 100 is to be used. In other embodiments, the first liquid chamber does not taper and instead includes a conical shape. Illustratively, the first liquid chamber 108 has a domed shape opposite the open end 110. In other embodiments, the first liquid chamber has other curved shapes or a planar shape opposite the open end.

The first liquid chamber 108 may have any of various appropriate capacities or volumes. In some embodiments, the first liquid chamber 108 has the capacity to receive a single or double shot, according to the independent standards set forth by any of various countries, in order to maintain consistency, simplify preparation, and/or reduce over-pouring. For example, in the United States, the standard volume of a single shot is 1.5 fl. oz. (44.4 ml) and, in Australia, the standard volume of a single shot is 1.0 fl. oz. (29.6 ml). In some embodiments, the first liquid chamber 108 has a volume of substantially 1.5 fl. oz. (44.4 ml) (as used herein with regard to volumes, the term "substantially" is understood to refer to the nominal value within ±10 percent). In some embodiments, the first liquid chamber 108 has a volume of substantially 1.0 fl. oz. (29.6 ml). In some embodiments, the first liquid chamber 108 has a volume of substantially 3.0 fl. oz. (88.7 ml). In some embodiments, the first liquid chamber 108 has the capacity to receive a less-than-standard shot volume. Such embodiments may appeal to resellers interested in increasing their per-sale profit margins while maintaining the appearance that customers are receiving a standard drink volume.

The body 102 also defines an outer surface 112 that is coupled to the brim 104 opposite the first liquid chamber 108. As described in further detail below, the outer surface 112 acts as an attachment element for coupling the device 100 to a coverless container. Specifically, the outer surface 112 is adapted to press-fittingly engage an inner surface of a coverless container to detachably secure the device 100 to the coverless container. Accordingly, the outer surface 112 may have a shape that is the partial inverse of the shape of the inner surface of the coverless container. Illustratively, the outer surface 112 tapers inwardly proceeding away from the brim 104 to facilitate use with "tapering-down" coverless containers (for example, 16 fl. oz. (473 ml) pint glasses). In other embodiments and as described in further detail below, the outer surface may taper outwardly proceeding away from the brim (to facilitate use with "tapering-up" coverless containers, such as "wine" glasses), or the outer surface may have a semi-cylindrical shape (that is, a non-tapering shape, to facilitate use with non-tapering coverless containers, such as "coffee" mugs). Illustratively, the outer surface 112 may be substantially concentrically disposed relative to the first liquid chamber 108. That is, the outer surface 112 may have a semi-circular cross-sectional shape, the first liquid chamber 108 may have a circular cross-sectional shape, and the semi-circular cross-sectional shape may be substantially concentrically disposed relative to the circular cross-sectional shape (as used herein with regard to concentricity, the term "substantially" is understood to mean concentric within 0.25 inches). Stated another way, the outer surface 112 and the first liquid chamber 108 may share the longitudinal axis 106. Alternatively, and in other embodiments, the first liquid chamber 108 may be offset from the shared longitudinal axis 106, with the outer edge of the first liquid chamber 108 disposed proximate the outer edge of the brim 104. Stated another way, the outer diameter of the first liquid chamber 108 may alternatively be disposed tangentially about the outer diameter of the brim 104 and proximate the outer surface 112. Such an alternative structure could provide a closer proximity of the first liquid chamber 108 to a user's mouth (when positioned for consuming a first liquid 210) as well as provide a greater surface area for a larger channel 116 to be disposed thereon (allowing for greater ease of access to a second liquid 202 when positioned for use thereinafter).

In some embodiments, the device 100 advantageously provides a relatively secure connection to a coverless container compared to a typical cover or lid. This secure connection is facilitated by the relatively large surface area for engaging the inner surface of the coverless container compared to a typical cover or lid.

The body 102 further defines a lower surface 114 that is coupled to the outer surface 112 opposite the brim 104. Illustratively, the lower surface 114 has a flat shape to facilitate freely standing the device 100 with the open end 110 of the first liquid chamber 108 facing in an upward direction. In other embodiments, the lower surface has a non-flat shape, such as a curved shape or a domed shape.

The body 102 further defines a channel 116 that interrupts the outer surface 112 and extends from the brim 104 to the lower surface 114. The channel 116 is adapted to facilitate delivery therethrough of a second liquid (which may be, for example, any of the relatively mild liquids described herein) carried by the coverless container. Illustratively, the channel 116 has an angular width about the longitudinal axis 106 of substantially 90 degrees (that is, 90 degrees within ±5 degrees). In other embodiments, the channel may have other angular widths about the longitudinal axis.

Devices according to embodiments of the present disclosure can be used to convert a container into a compartmented liquid container that facilitates consuming a first liquid (for example, any of the relatively harsh liquids described herein) and a second liquid (for example, any of the relatively mild liquids described herein) therefrom. FIGS. 2A-3B illustrate an exemplary device and liquid container for consuming a first liquid and a second liquid. The exemplary device is the device 100 described above, and the exemplary liquid container is a pint glass 200.

Figure 2A:
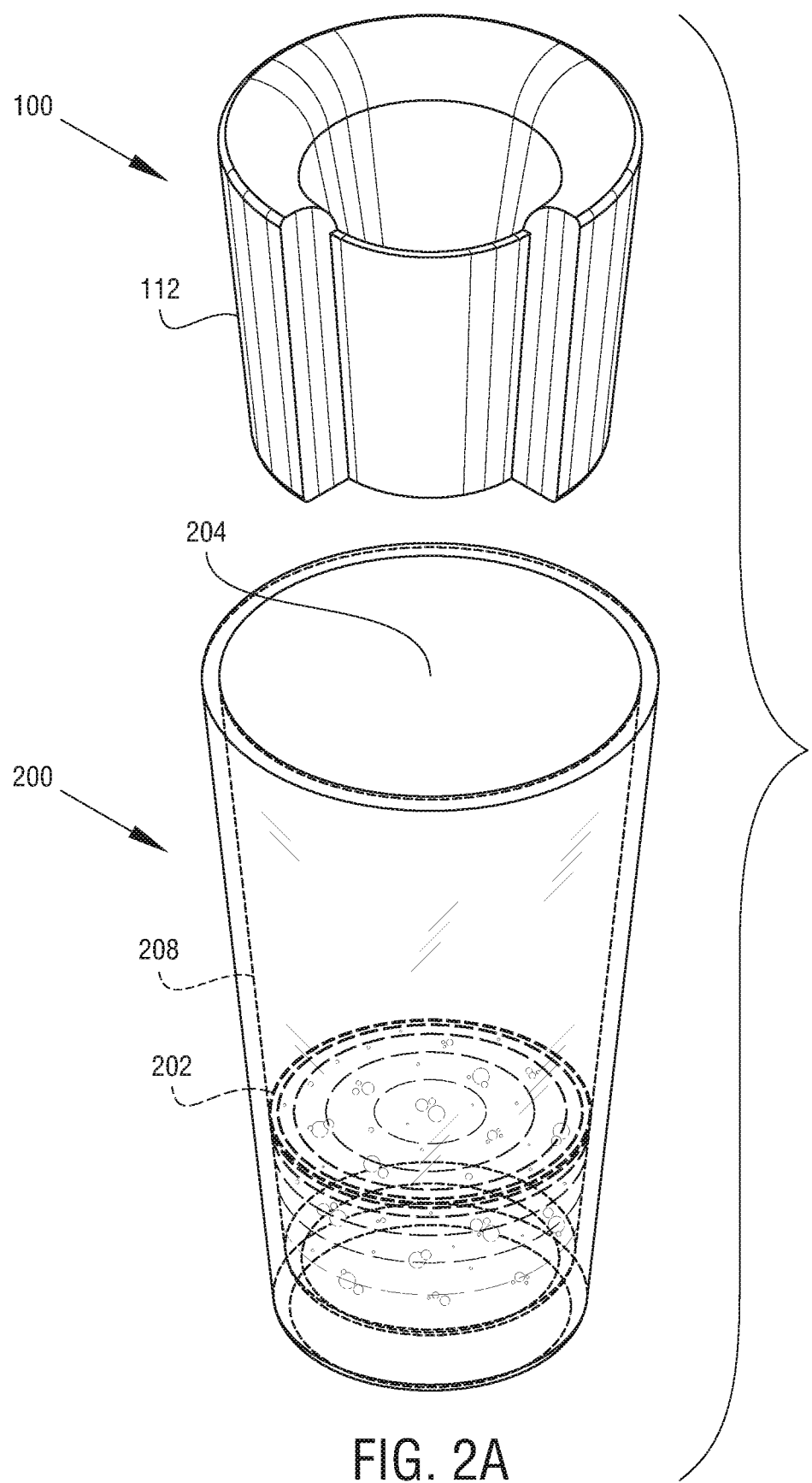
FIG. 2A is a perspective view of the device of FIG. 1A and a pint glass for performing a method according to an embodiment of the present disclosure. A liquid has been delivered to the pint glass.
Figure 2B:
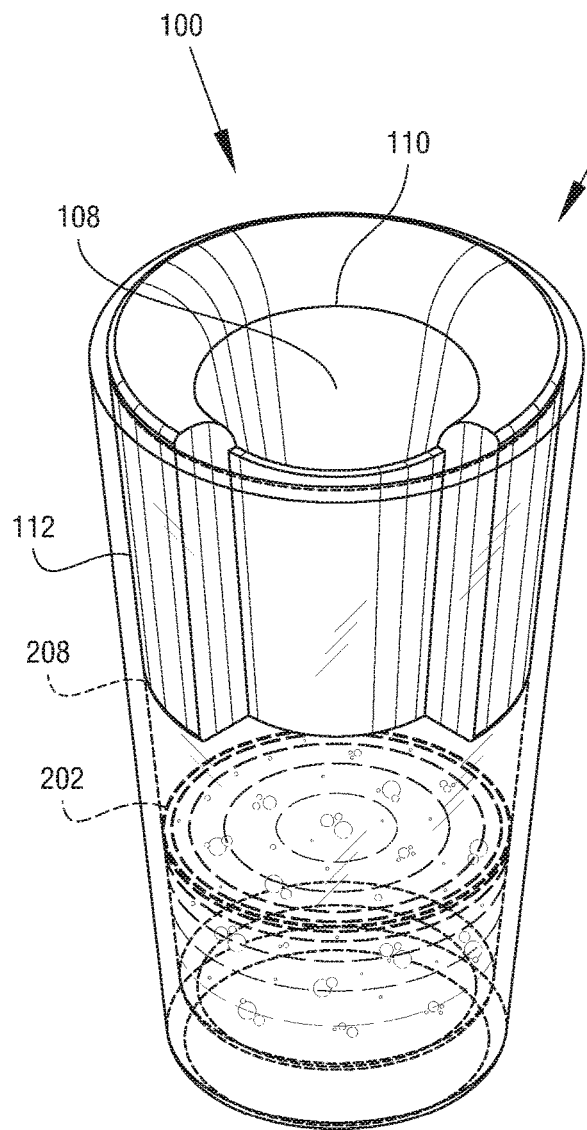
FIG. 2B is a perspective view of the device of FIG. 1A coupled to the pint glass of FIG. 2A.
Figure 2C:
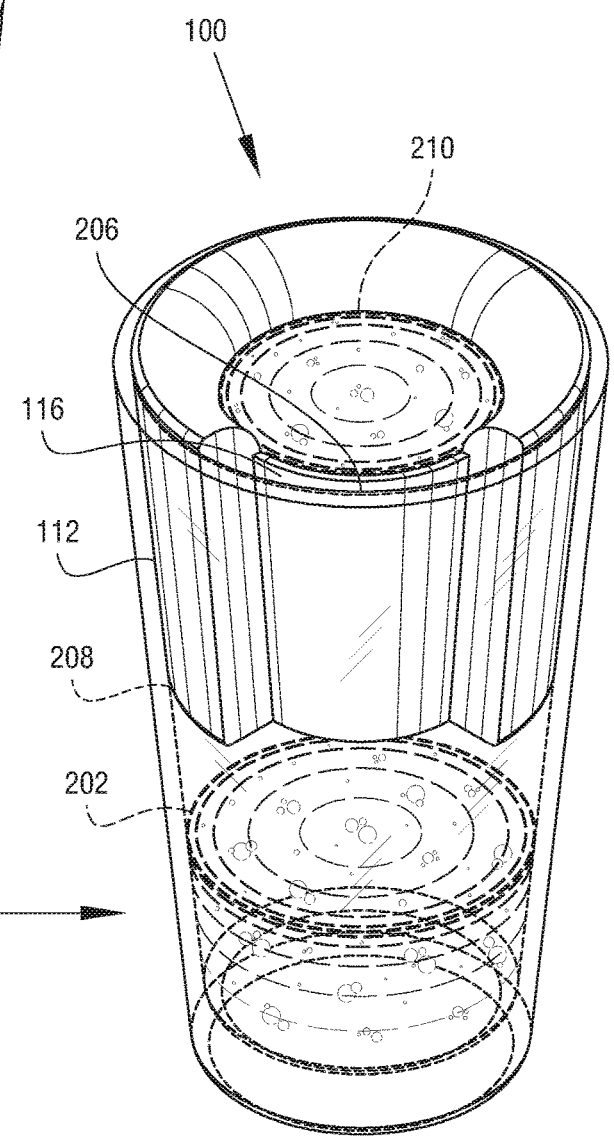
FIG. 2C is a perspective view of the device of FIG. 1A coupled to the pint glass of FIG. 2A. A liquid has been delivered to the device.
Figure 2D:
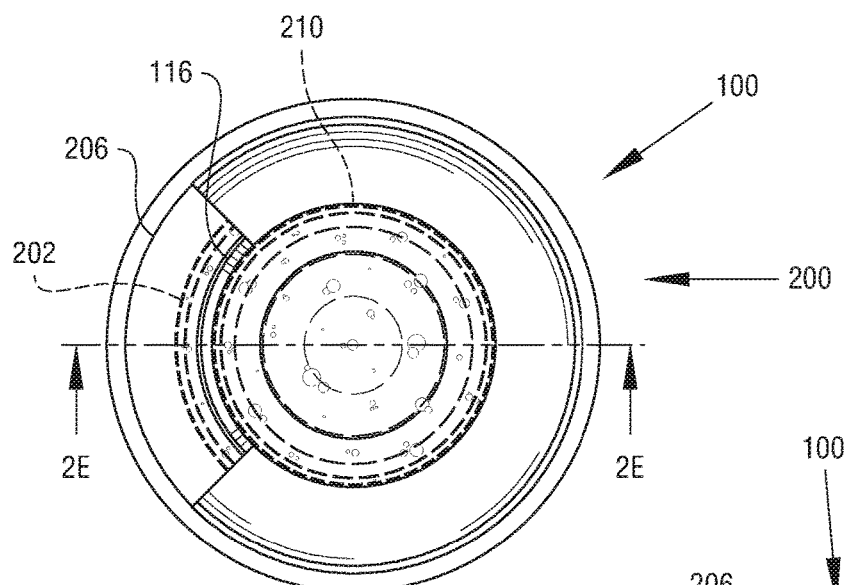
FIG. 2D is a top view of the device and the pint glass of FIG. 2C.
Figure 2E:
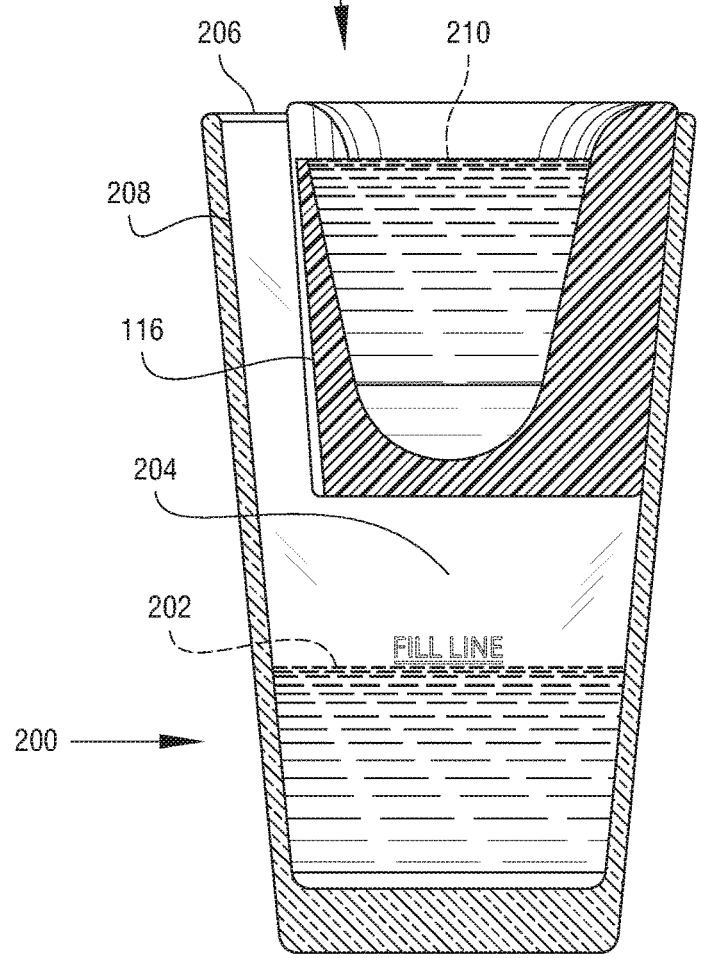
FIG. 2E is a section view of the device and the pint glass along line 2E-2E of FIG. 2D.

A method begins by providing a device according to an embodiment of the present disclosure (for example, the device 100 as shown in FIGS. 1A-2A) and a liquid container (for example, a coverless container, specifically the pint glass 200 as shown in FIG. 2A). A second liquid is then delivered to the liquid chamber of the liquid container (for example, the second liquid 202 is delivered to the liquid chamber 204 of the pint glass 200). For example, the second liquid may be delivered via the opening or outlet of the liquid container. Various volumes of the second liquid may be delivered to the liquid chamber of the liquid container. For example, the US standard volume of a single shot (substantially 1.5 fl. oz. or 44.4 ml) of the second liquid may be delivered to the liquid chamber of the liquid container. In some embodiments, the volume of the liquid chamber of the liquid container that is occupied by the second liquid and the device (see below) is less than the total volume of the liquid chamber of the liquid container.

Next, the device is detachably coupled to the liquid container proximate the liquid container outlet via an attachment element of the device. For example and as shown specifically in FIG. 2B, the device 100 may be coupled to the liquid container by press-fittingly engaging the outer surface 112 of the device 100 against an inner surface 208 of the pint glass 200 to detachably secure the device 100 to the pint glass 200. In addition, the device is coupled to the liquid container such that the open end of the device faces in the same direction as the liquid container outlet. Illustratively, the open end of the device is disposed in a common plane, or nearly disposed in a common plane, with the liquid container outlet.

A first liquid is then delivered to the liquid chamber of the device. For example and as shown specifically in FIGS. 2B and 2C, the first liquid 210 may be delivered via the open end 110 to the liquid chamber 108 of the device 100. Various volumes of the first liquid may be delivered to the liquid chamber of the device. Illustratively, the volumes of the first liquid and second liquid delivered to the device and liquid container, respectively, may be substantially equal (that is, equal within ±10 percent). For example, the US standard volume of a single shot (substantially 1.5 fl. oz. or 44.4 ml) of the first liquid may be delivered to the liquid chamber of the device.

Next, the liquid container and the device are positioned to deliver the first liquid from the device. More specifically, the liquid container and the device are positioned in a first orientation in which the body of the device inhibits flow of the second liquid through the device outlet. For example and as shown specifically in FIG. 3A, the pint glass 200 and the device 100 are positioned in a first orientation in which the body 102 of the device 100 inhibits flow of the second liquid 202 through the device outlet 206 (for example, defined by the channel 116 at the brim 104). Illustratively, the liquid container and the device are pivoted horizontally and the device outlet is at a first elevation in the first orientation. The first elevation may be the relative maximum elevation of the device outlet about the longitudinal axis when the liquid container and the device are pivoted horizontally. Stated another way, the first elevation may be the "12 o'clock" position of the device outlet relative to the longitudinal axis when the liquid container and the device are pivoted horizontally. In any case, the user consumes the first liquid from the first liquid chamber while the liquid container and the device are positioned in the first orientation.

The liquid container and the device are then positioned to deliver the second liquid from the liquid container. More specifically, the liquid container and the device are positioned in a second orientation in which the body permits flow of the second liquid through the device outlet. For example, and as shown specifically in FIG. 3B, the pint glass 200 and the device 100 are positioned in a second orientation in which the body 102 permits flow of the second liquid 202 through the device outlet 206 (for example, via the channel 116). Illustratively, the liquid container and the device are pivoted horizontally and the device outlet is at a second elevation in the second orientation. The second elevation may be less than the first elevation. The second elevation may be the relative minimum elevation of the device outlet about the longitudinal axis when the liquid container and the device are pivoted horizontally. Stated another way, the second elevation may be the "6 o'clock" position of the device outlet relative to the longitudinal axis when the liquid container and the device are pivoted horizontally. Stated another way, the liquid container and the device may be rotated by 180 degrees about the longitudinal axis from the first orientation to reach the second orientation. In any case, the user consumes the second liquid from the liquid chamber of the liquid container while the liquid container and the device are positioned in the second orientation.

The method described above and illustrated in FIGS. 2A-3B can be modified in various manners. For example, the device may be capable of standing upright (that is, with the open end facing upwardly), and the first liquid may be delivered to the device prior to coupling the device to the liquid container. In such embodiments, the device could be sold as a prefilled and sealed unit (not shown).

Figure 3A:
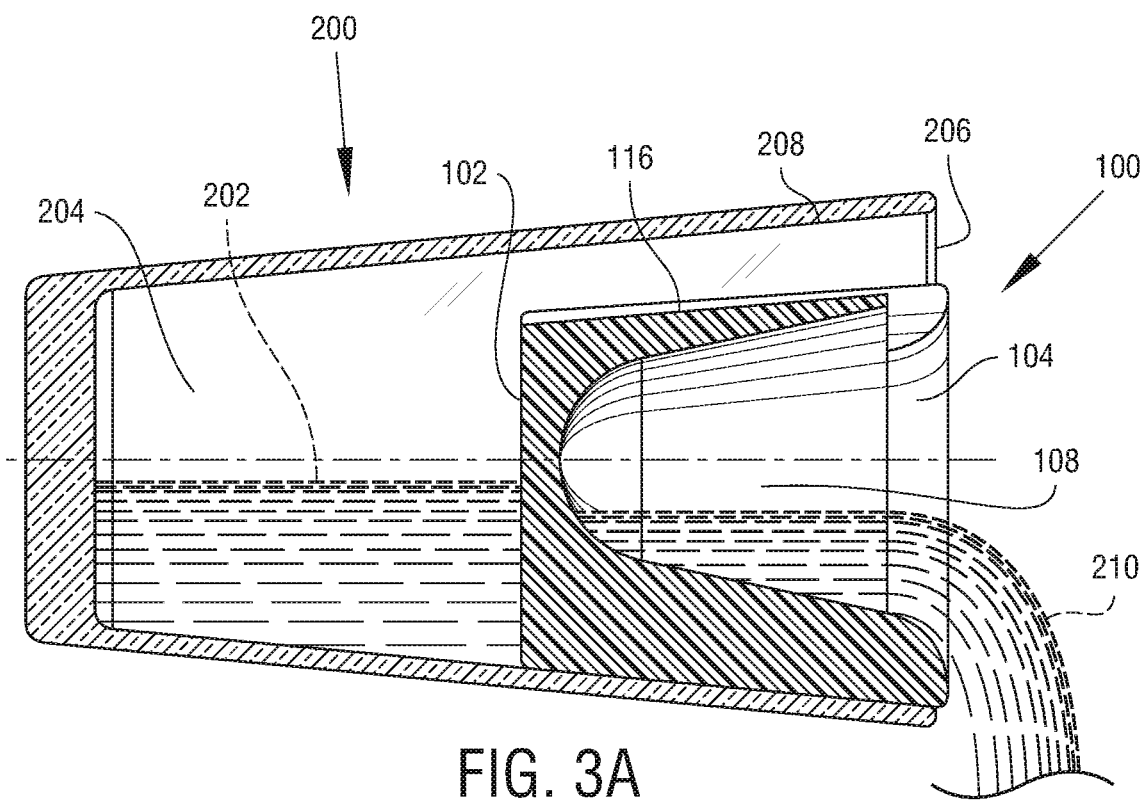
FIG. 3A is a section view of the device and the pint glass along line 2E-2E of FIG. 2D. The device and the pint glass are in a first orientation to deliver a first liquid from the device.
Figure 3B:
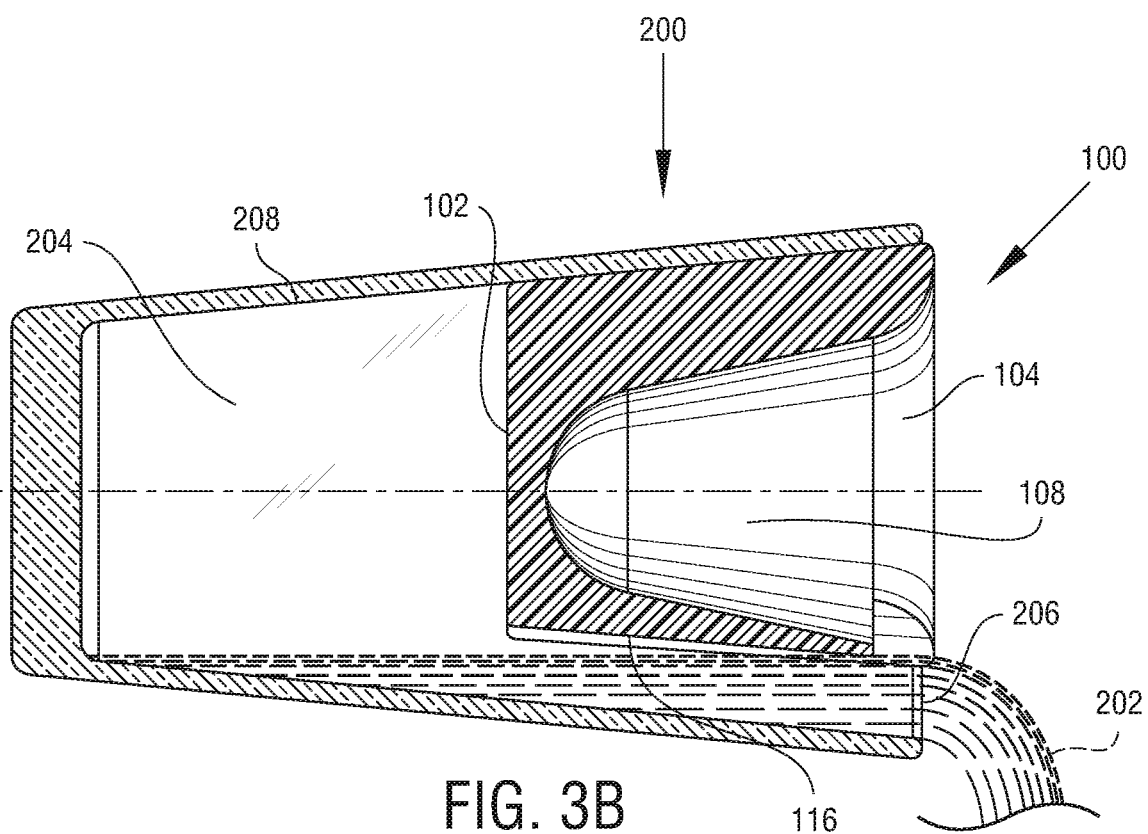
FIG. 3B is a section view of the device and the pint glass along line 2E-2E of FIG. 2D. The device and the pint glass are in a second orientation to deliver a second liquid from the pint glass.
Figure 3C:
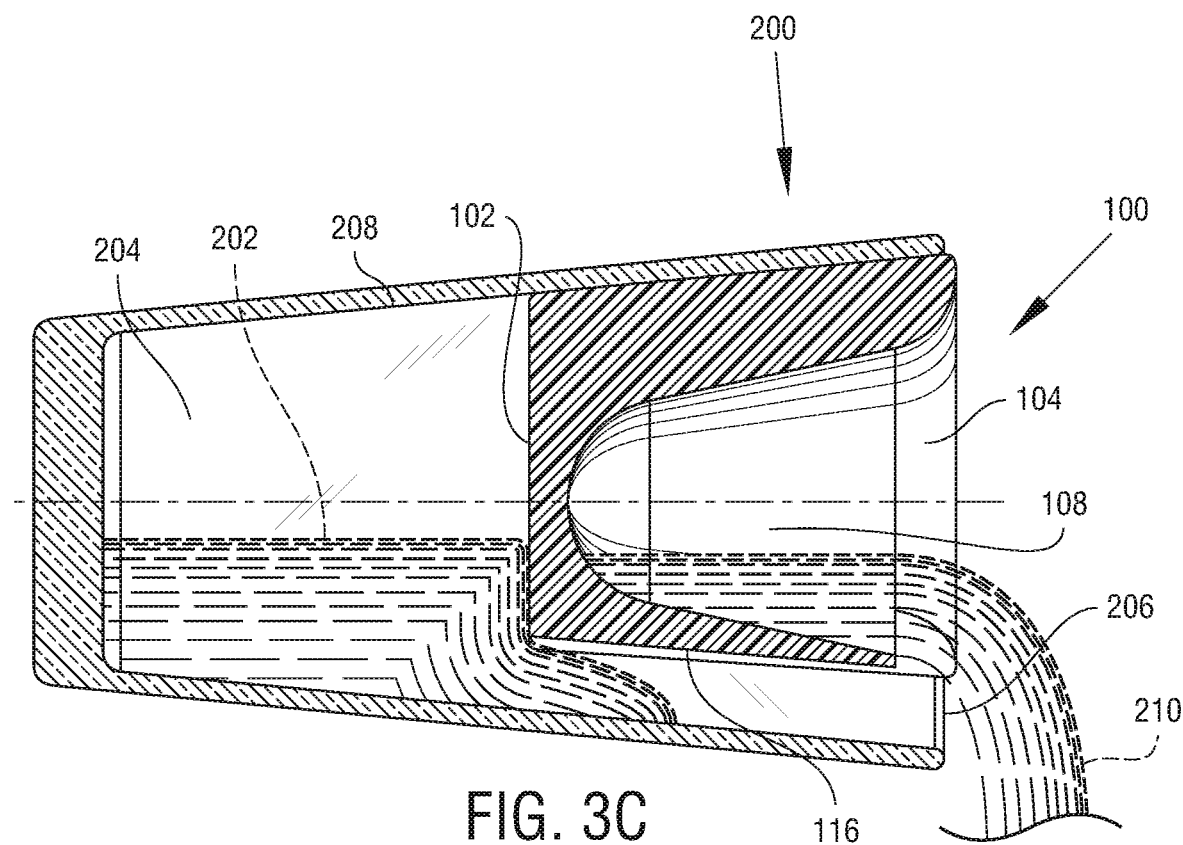
FIG. 3C is a section view of the device and the pint glass along line 2E-2E of FIG. 2D. A first liquid is delivered from the device.
Figure 3D:
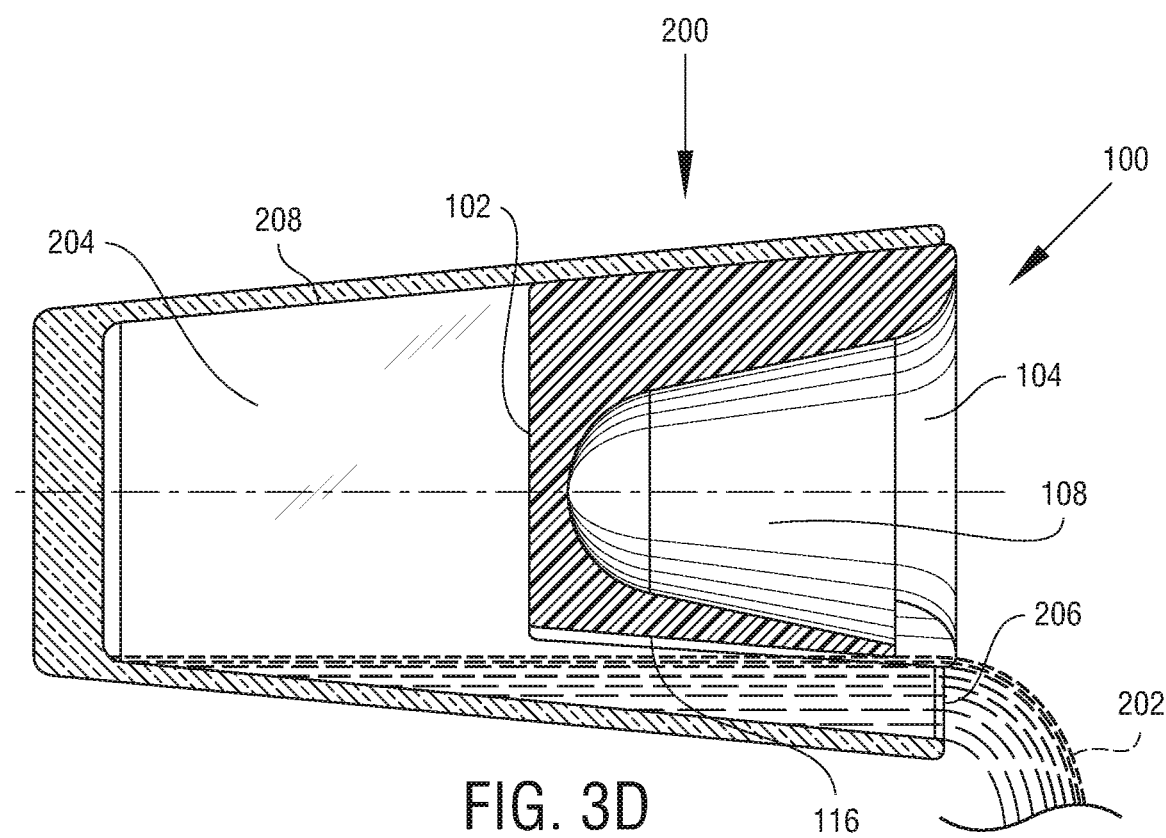
FIG. 3D is a section view of the device and the pint glass along line 2E-2E of FIG. 2D. A second liquid is delivered from the pint glass.

As another exemplary modification to the method described above and referring to FIGS. 3C and 3D, a relatively small volume of the second liquid (for example, a half-shot (substantially 0.75 fl. oz. or 22 ml), a quarter-shot (substantially 0.375 fl. oz. or 11 ml), or the like) could be delivered to the liquid chamber of the liquid container (for example, the pint glass 200). Thereafter and as shown in FIGS. 3C and 3D, the liquid container and the device (for example, the device 100) are positioned in an orientation in which the device and liquid container deliver the first liquid, and thereafter, the second liquid, therefrom. Illustratively, the liquid container and the device are pivoted horizontally and the device outlet is at the second elevation, described above, in the orientation. In the orientation, the device does not inhibit flow of the second liquid through the device outlet. Instead, the first liquid is delivered first, and the second liquid is delivered thereafter due to the relatively small volume of the second liquid contained in the liquid container. Furthermore, and as described briefly above, the taper angle of the first liquid chamber of the device and the dimensions of the coverless container may facilitate delivering the first liquid and the second liquid in the manner shown in FIGS. 3C and 3D. That is, the first liquid chamber of the device may taper at an angle that is greater than that of the liquid chamber of the coverless container to facilitate delivery of the first liquid prior to delivery of the second liquid. As such, the coverless container and the device may require less pivoting to deliver the first liquid (for example, pivoting to an angle between vertical and horizontal) and more pivoting to deliver the second liquid (for example, pivoting to horizontal). This may provide additional control over the method of consumption of the first and second liquids.

Figure 4:
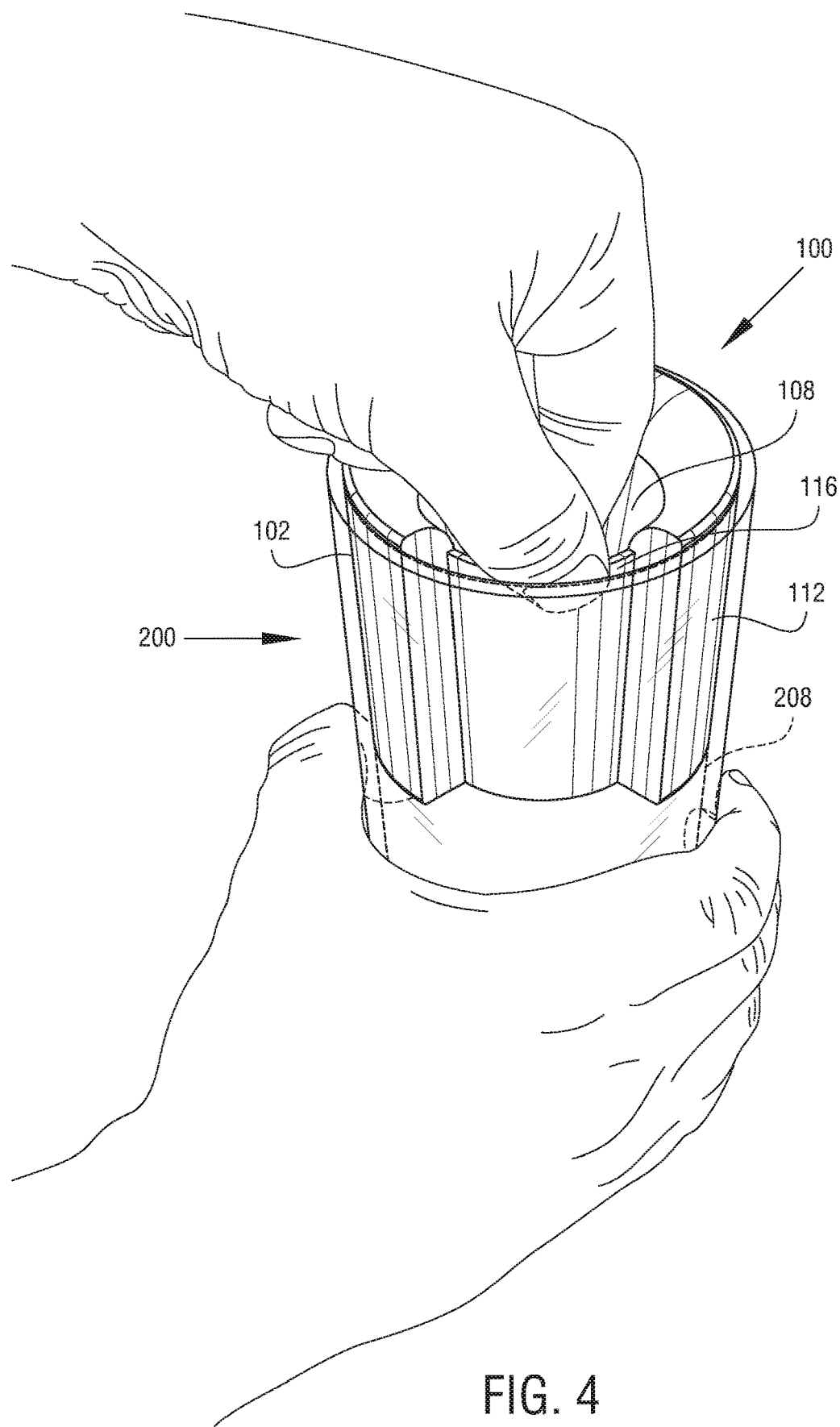
FIG. 4 is a perspective view of the device of FIG. 1A being decoupled from the pint glass of FIG. 2A.

The method described above may include subsequently detaching the device from the liquid container. For example and as shown in FIG. 4, the device 100 may be decoupled from the pint glass 200 by pulling the device 100 and the pint glass 200 in opposite directions, thereby disengaging the press fit between the outer surface 112 of the device 100 and the inner surface 208 of the pint glass 200. Illustratively, a portion of the body 102 defining the first liquid chamber 108 and the channel 116 may be grasped to pull the device 100 from the pint glass 200. In other embodiments, and as described in further detail below, devices include one or more removal elements that may be grasped to decouple the device from a liquid container.

Figure 5A:
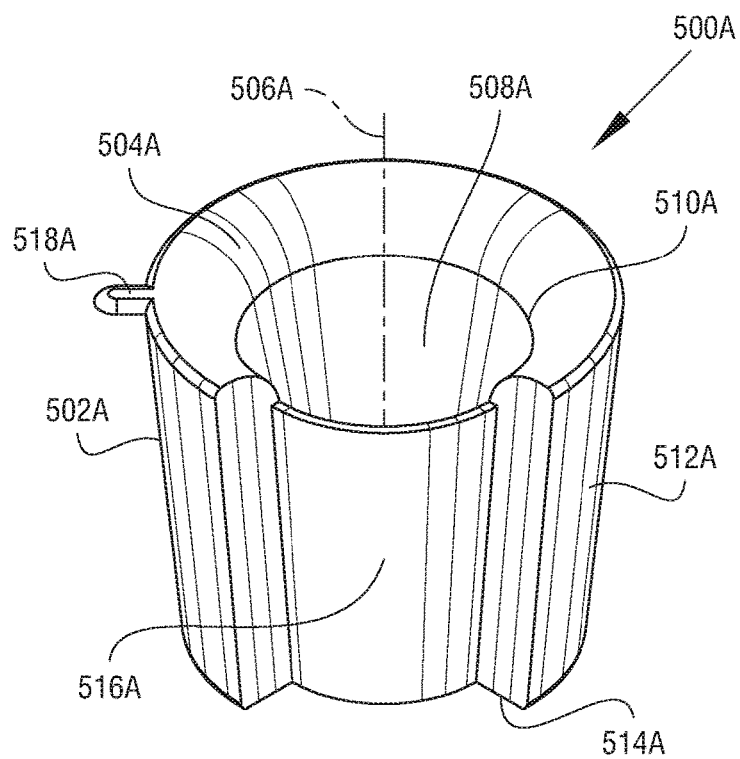
FIG. 5A is a perspective view of a device for facilitating consumption of a plurality of liquids, according to another embodiment of the present disclosure.
Figure 5B:
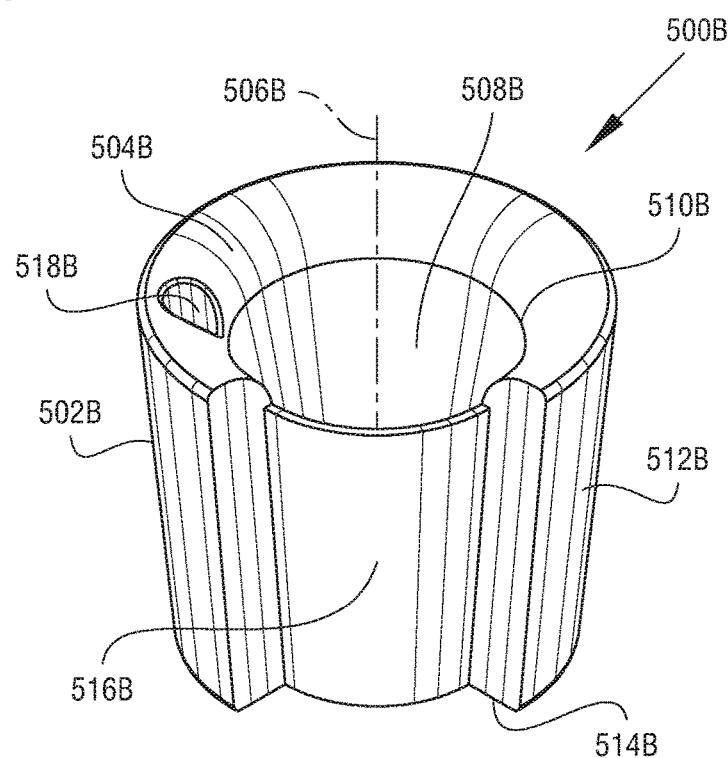
FIG. 5B is a perspective view of a device for facilitating consumption of a plurality of liquids, according to another embodiment of the present disclosure.
Figure 5C:
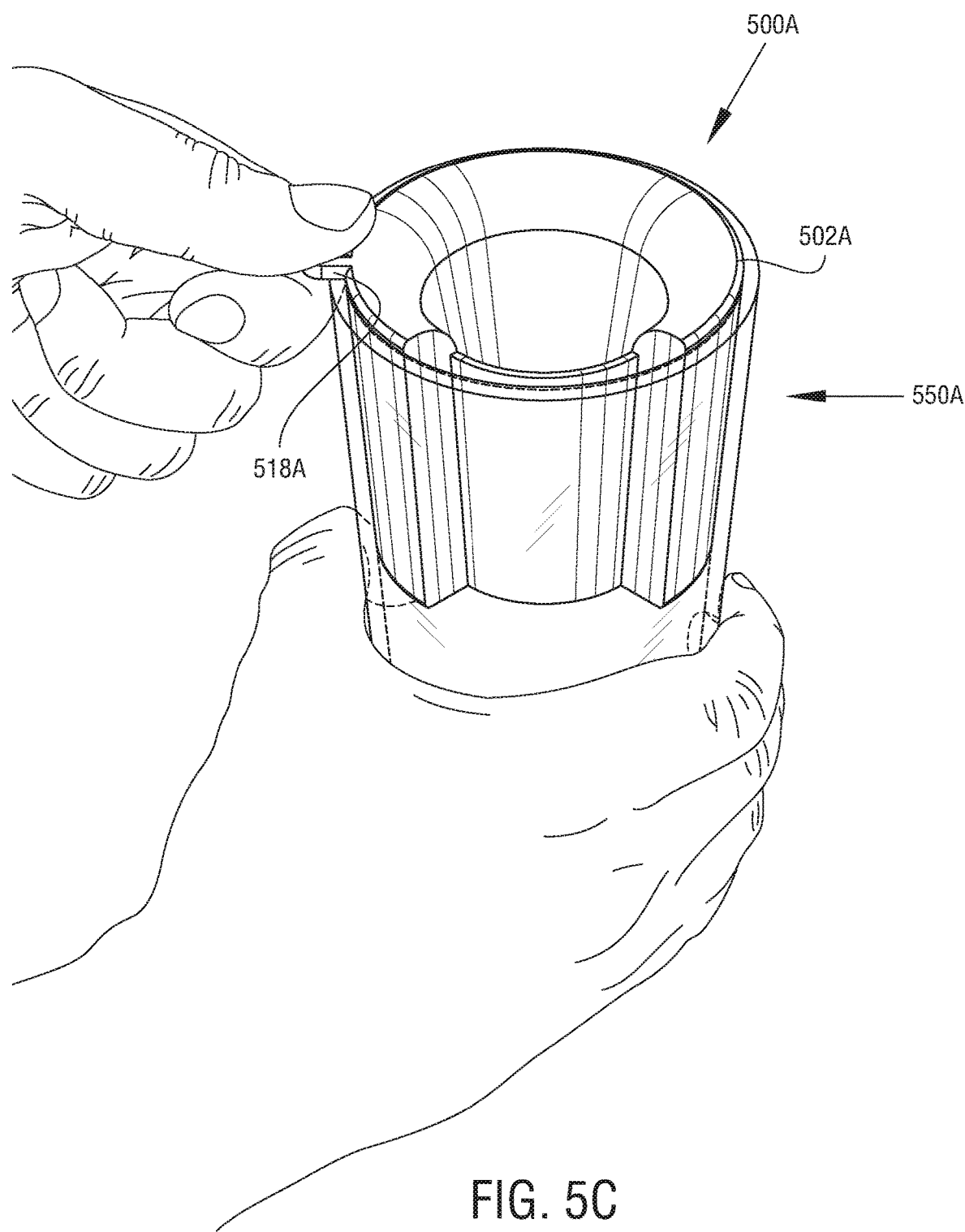
FIG. 5C is a perspective view of the device of FIG. 5A being decoupled from a pint glass.

FIGS. 5A and 5C illustrate an exemplary liquid consumption device 500A that includes a removal element. The device 500A is similar to the device 100 described above. That is, the device 500A includes a monolithic body 502A that defines a brim 504A, a longitudinal axis 506A, a first liquid chamber 508A, an open end 510A, an outer surface 512A, a lower surface 514A, and a channel 516A that may be as described in connection with those features of the device 100. In addition, the body 502A defines the removal element. The removal element may be grasped to decouple the device 500A from a liquid container (for example, a coverless container, specifically the pint glass 550A as shown in FIG. 5C) after performing any of the methods described herein. As shown in the figures, the removal element may be a tab 518A that extends radially outwardly, relative to the longitudinal axis 506A, from the brim 504A. During use, the tab 518A may be disposed above the outlet of the liquid container.

Figure 5D:
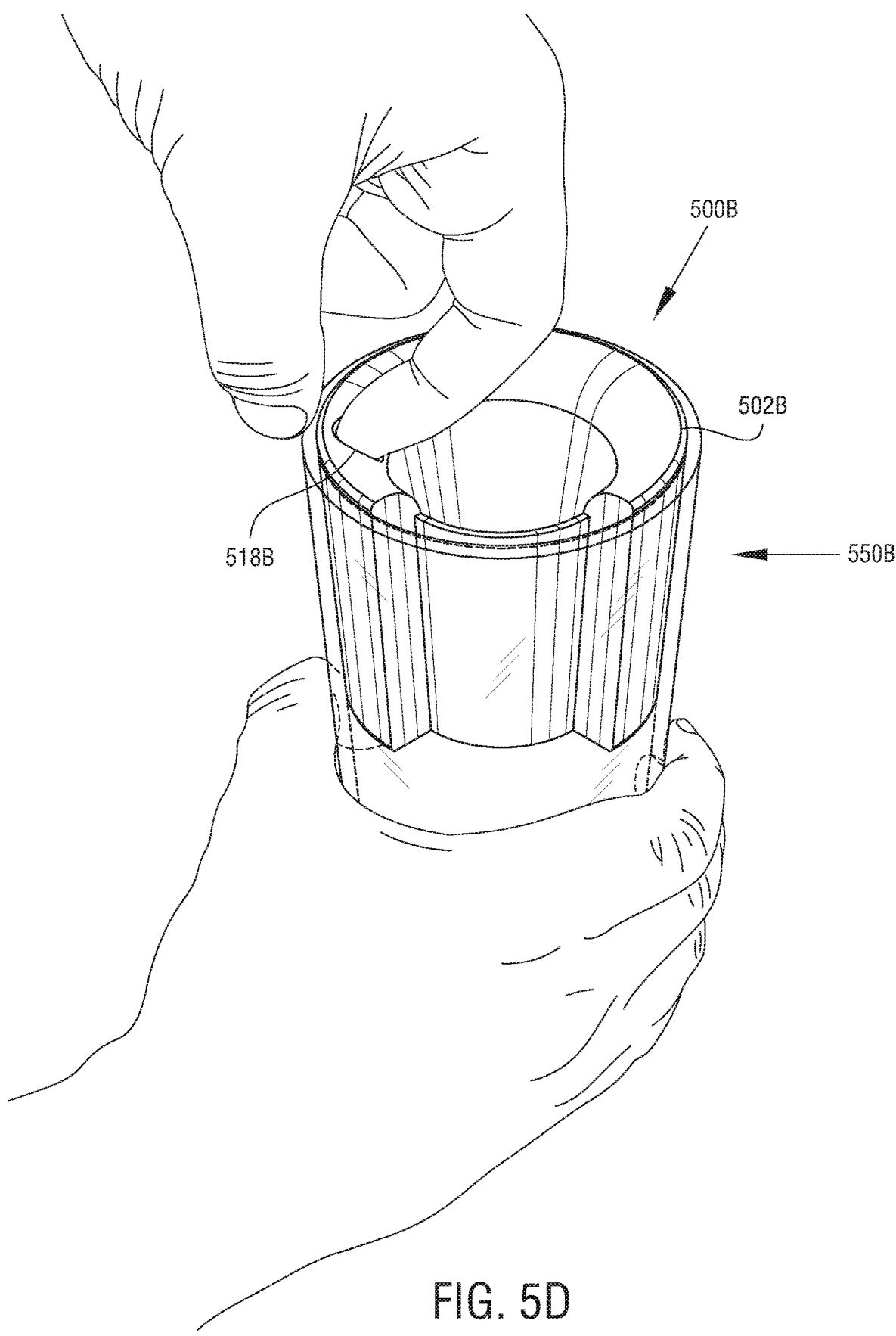
FIG. 5D is a perspective view of the device of FIG. 5B being decoupled from a pint glass.

FIGS. 5B and 5D illustrate another exemplary liquid consumption device 500B that includes a removal element. The device 500B is similar to the device 100 described above. That is, the device 500B includes a monolithic body 502B that defines a brim 504B, a longitudinal axis 506B, a first liquid chamber 508B, an open end 510B, an outer surface 512B, a lower surface 514B, and a channel 516B that may be as described in connection with those features of the device 100. In addition, the body 502B defines the removal element. The removal element may be grasped to decouple the device 500B from a liquid container (for example, a coverless container, specifically the pint glass 550B as shown in FIG. 5D) after performing any of the methods described herein. As shown in the figures, the removal element may be a recessed surface 518B formed in the brim 504B.

Figure 6A:
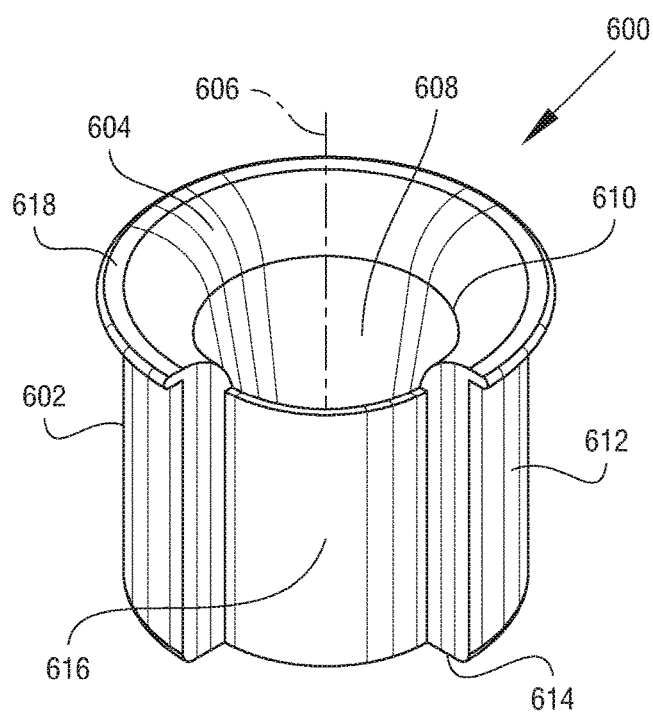
FIG. 6A is a perspective view of a device for facilitating consumption of a plurality of liquids, according to another embodiment of the present disclosure.
Figure 6B:
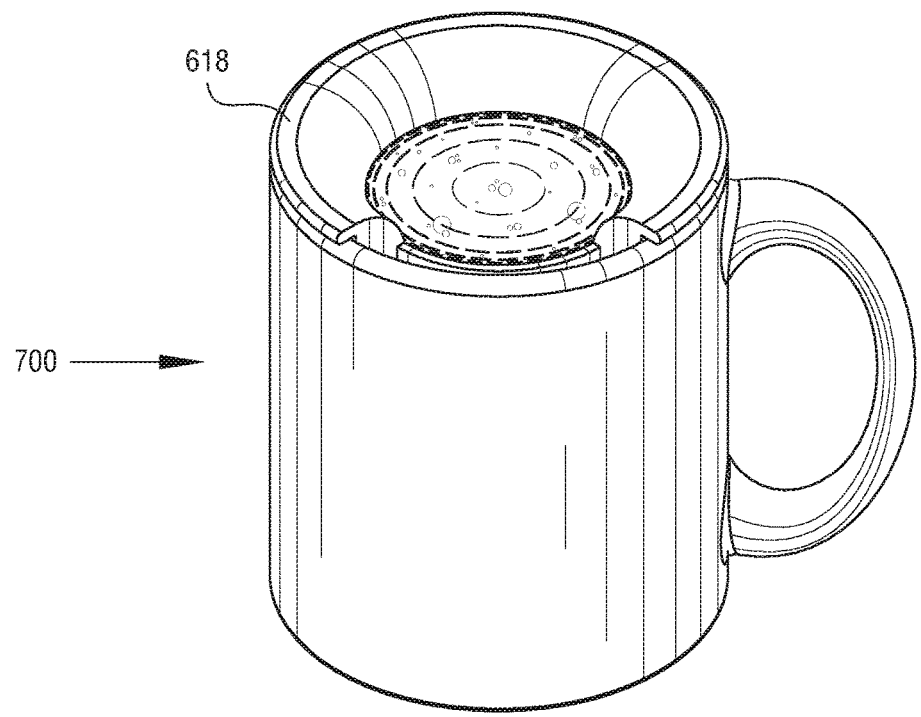
FIG. 6B is a perspective view of the device of FIG. 6A coupled to a mug. A liquid has been delivered to the device.
Figure 7:
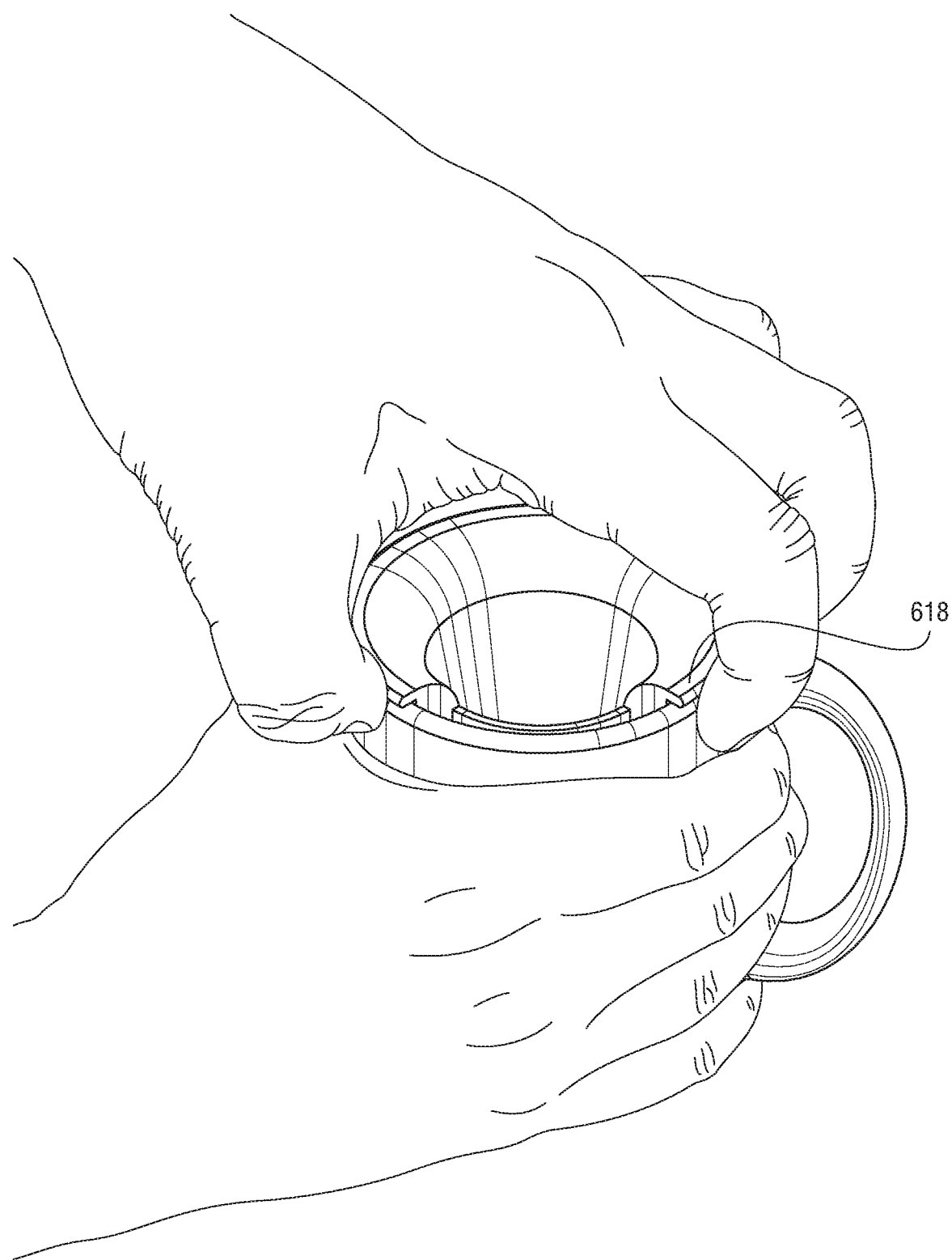
FIG. 7 is a perspective view of the device of FIG. 6A being decoupled from the mug of FIG. 6B.

FIGS. 6A, 6B, and 7 illustrate another exemplary liquid consumption device 600 that includes a removal element. The device 600 is similar to the device 100 described above. That is, the device 600 includes a monolithic body 602 that defines a brim 604, a longitudinal axis 606, a first liquid chamber 608, an open end 610, a lower surface 614, and a channel 616 that may be as described in connection with those features of the device 100. The body 602 also defines an outer surface 612 having a non-tapering shape to facilitate coupling the device 600 to a non-tapering coverless container (for example, a non-tapering item of drinkware, such as the "coffee" mug 700 as shown in FIG. 7). In addition, the body 602 defines the removal element. The removal element may be grasped to decouple the device 600 from the coverless container after performing any of the methods described herein. As shown in the figures, the removal element may be a flange 618 that extends radially outwardly, relative to the longitudinal axis 606, from the brim 604. Illustratively, the flange 618 extends outwardly from the entire perimeter of the brim 604. In other embodiments, the flange may extend outwardly from less than the entire perimeter of the brim (that is, one or more portions of the perimeter of the brim). During use, the flange 618 may be disposed above the outlet of the liquid container.

Figure 8A:
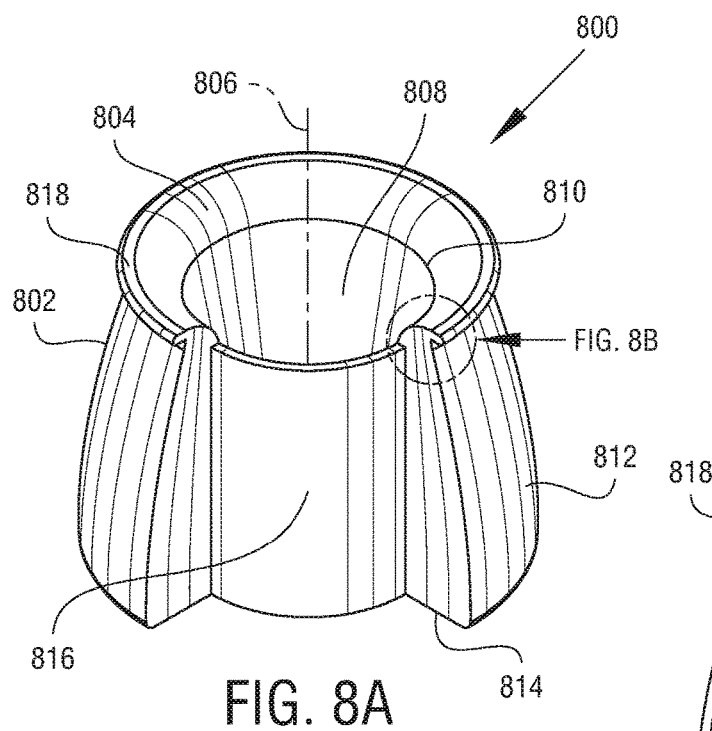
FIG. 8A is a perspective view of a device for facilitating consumption of a plurality of liquids, according to another embodiment of the present disclosure.
Figure 8B:
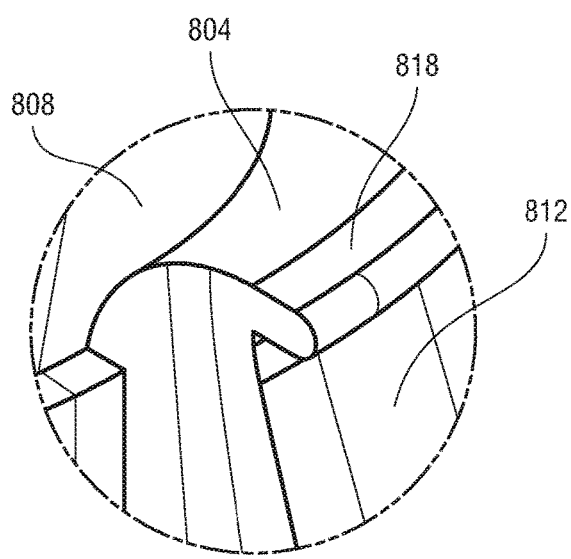
FIG. 8B is a detail view of a portion of the device enclosed by line 8B-8B of FIG. 8A.
Figure 8C:
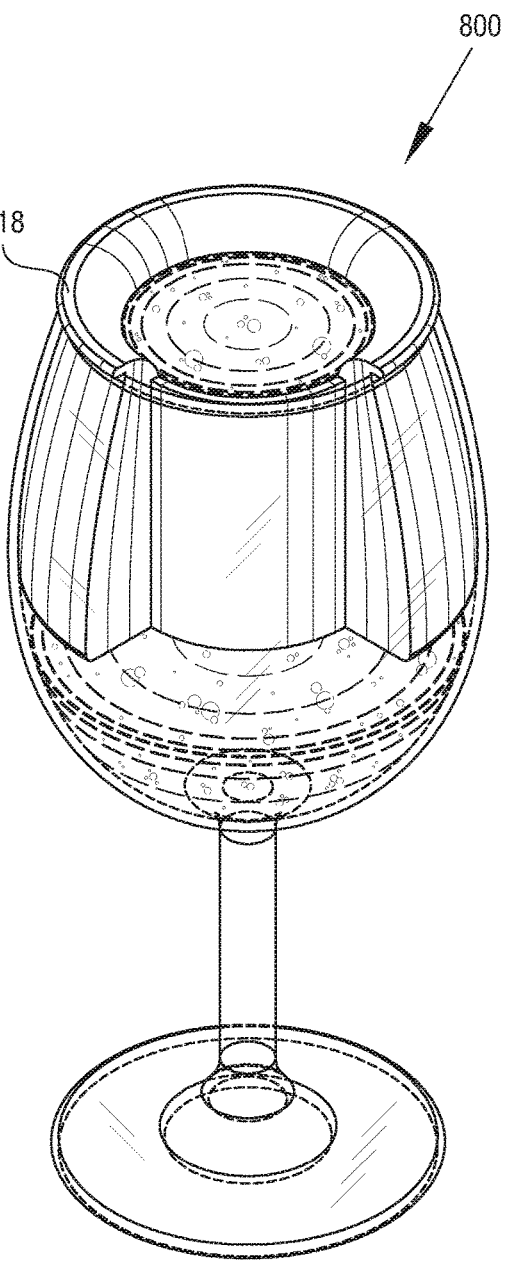
FIG. 8C is a perspective view of the device of FIG. 8A coupled to a wine glass.
Figure 11A:
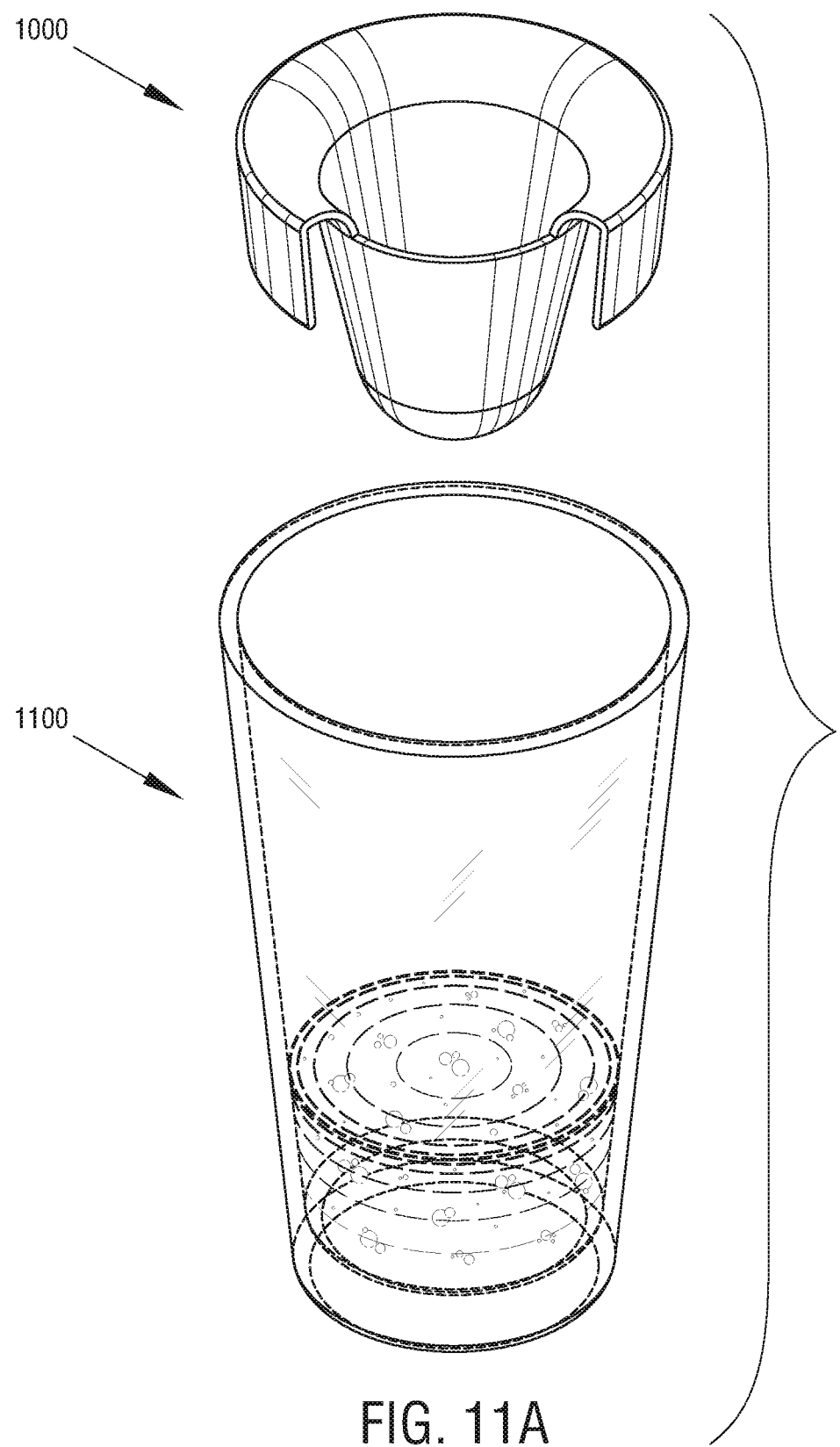
FIG. 11A is an exploded perspective view of the device of FIG. 10A and a pint glass to which the device may be coupled.
Figure 11B:
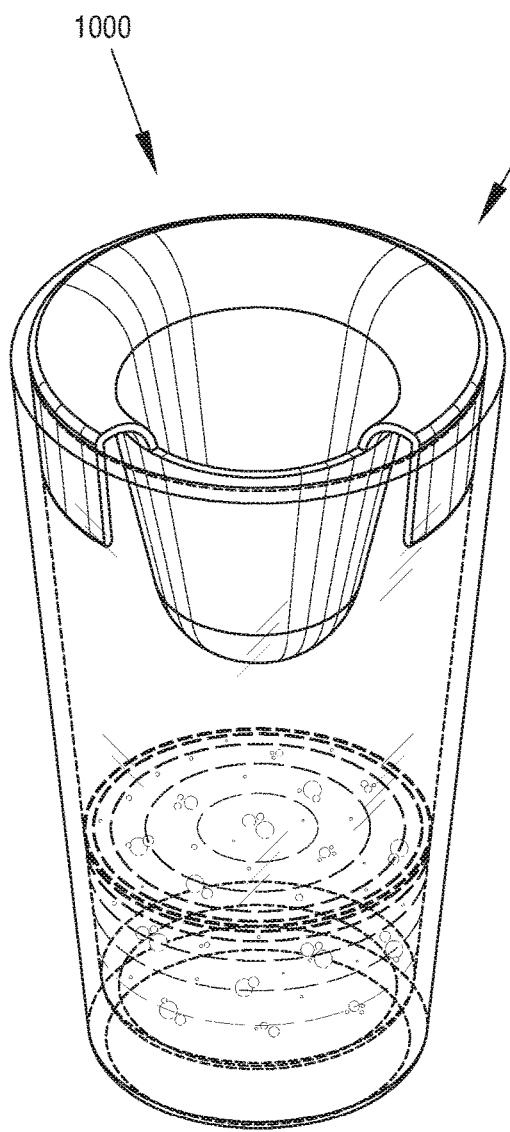
FIG. 11B is a perspective view of the device of FIG. 10A coupled to the pint glass of FIG. 11A.
Figure 11C:
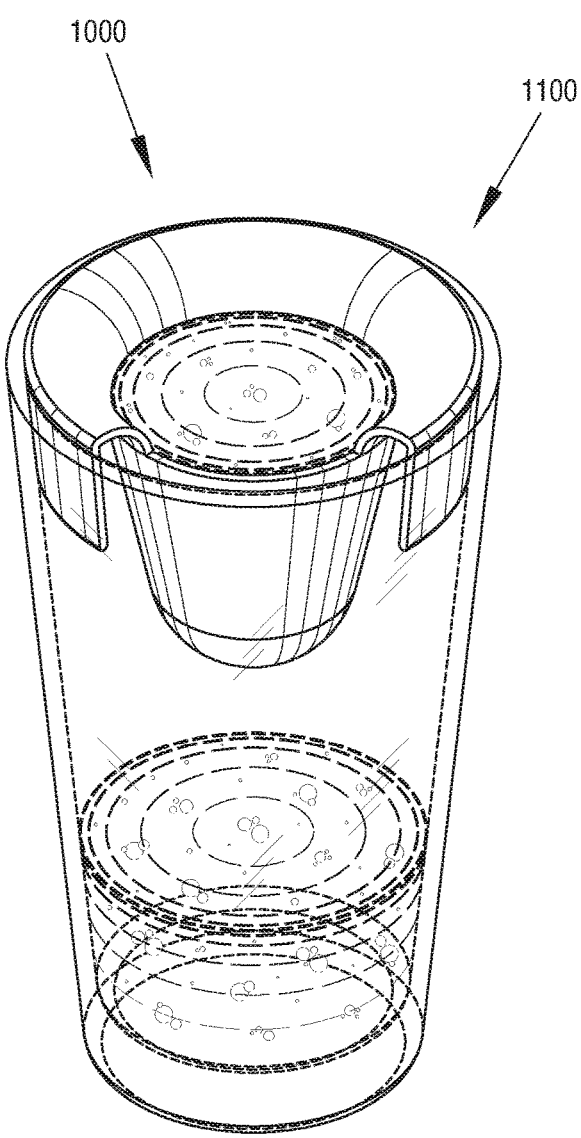
FIG. 11C is a perspective view of the device of FIG. 10A coupled to the pint glass of FIG. 11A after receiving a first liquid in the device.

FIGS. 8A-8C illustrate another exemplary liquid consumption device 800 that includes a removal element. The device 800 is similar to the device 100 described above. That is, the device 800 includes a monolithic body 802 that defines a brim 804, a longitudinal axis 806, a first liquid chamber 808, an open end 810, a lower surface 814, and a channel 816 that may be as described in connection with those features of the device 100. The body 802 also defines an outer surface 812 that tapers outwardly proceeding away from the brim 804 to facilitate coupling the device 800 to a "tapering-up" coverless container (for example, a tapering-up item of stemware, such as the "wine" glass 850 as shown in FIG. 8C). In addition, the body 802 defines the removal element. The removal element may be grasped to decouple the device 800 from a liquid container after performing any of the methods described herein. As shown in the figures, the removal element may be a flange 818 that extends radially outwardly, relative to the longitudinal axis 806, from the brim 804. Illustratively, the flange 818 extends outwardly from the entire perimeter of the brim 804. In other embodiments, the flange may extend outwardly from less than the entire perimeter of the brim (that is, one or more portions of the perimeter of the brim). During use, the flange 818 may be disposed above the outlet of the liquid container.

Devices for facilitating consumption of a plurality of liquids when coupled to coverless containers may be modified in various manners. For example, FIGS. 9A-9C illustrate an exemplary device 900 for facilitating consumption of a plurality of liquids when coupled to a coverless container. The device 900 is similar to the device 100 described above. That is, the device 900 includes a monolithic body 902 that defines a brim 904, a longitudinal axis 906, a first liquid chamber 908, an open end 910, a lower surface 914, and a channel 916 that may be as described in connection with those features of the device 100. Unlike the device 100, however, an outer surface 912 of the device 900 is also disposed radially outwardly relative to the channel 916. Stated another way, the channel 916 may be disposed internally in the body 902 and extend from the brim 904 to the lower surface 914. In some embodiments, the portion of the outer surface 912 disposed radially outwardly relative to the channel 916 has a height that is less than other portions of the outer surface 912. For example and as shown in the figures, the portion of the outer surface 912 disposed radially outwardly relative to the channel 916 may terminate below the brim 904. In other embodiments, the portion of the outer surface 912 disposed radially outwardly relative to the channel 916 has the same height as other portions of the outer surface 912. The device 900 may be used to perform any of the methods described herein.

FIGS. 10A-10C and 11A-11C illustrate another exemplary device 1000 for facilitating consumption of a plurality of liquids when coupled to a coverless container. The device 1000 is similar to the device 100 described above. That is, the device 1000 includes a monolithic body 1002 that defines a brim 1004, a longitudinal axis 1006, a first liquid chamber 1008, an open end 1010, and an outer surface 1012 that may be as described in connection with those features of the device 100. Unlike the device 100, however, the body 1002 includes relatively thin walls that define the above features, which may in turn provide the device 1000 with relative flexibility and light weight. A lower surface 1014 of the body 1002 is defined together by the surfaces opposite the first liquid chamber 1008 and the brim 1004. In addition, the brim 1004 and the outer surface 1012 define a relatively short channel 1016 that facilitates delivery therethrough of a second liquid carried by a coverless container (for example, a pint glass 1100). The device 1000 may be used to perform any of the methods described herein.

Figure 12A:
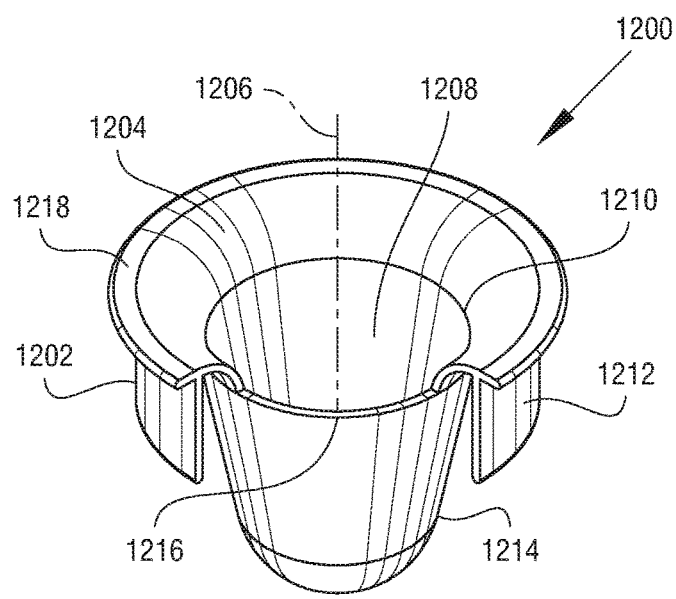
FIG. 12A is a perspective view of a device for facilitating consumption of a plurality of liquids, according to another embodiment of the present disclosure.
Figure 12B:
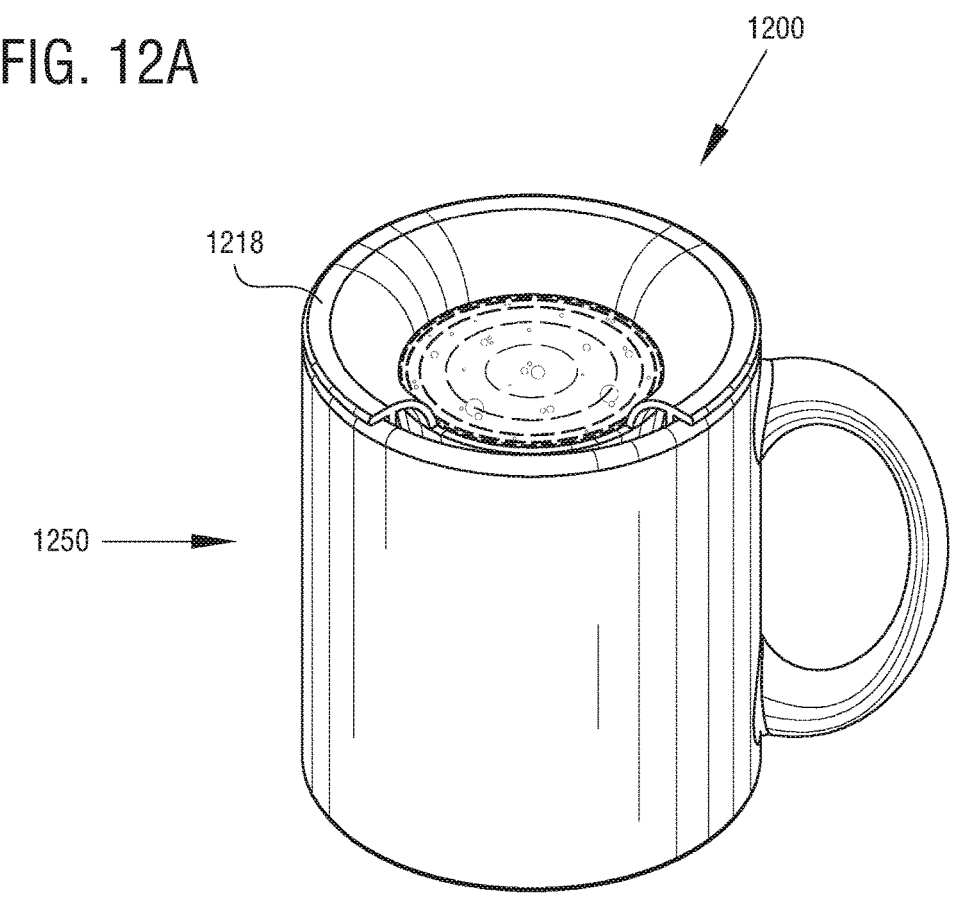
FIG. 12B is a perspective view of the device of FIG. 12A coupled to a mug.

FIGS. 12A and 12B illustrate another exemplary device 1200 for facilitating consumption of a plurality of liquids when coupled to a coverless container. The device 1200 is similar to the device 1000 described above. That is, the device 1200 includes a monolithic body 1202 that defines a brim 1204, a longitudinal axis 1206, a first liquid chamber 1208, an open end 1210, a lower surface 1214, and a channel 1216 that may be as described in connection with those features of the device 1000. Unlike the device 1000, however, the body 1202 defines a non-tapering outer surface 1212 that facilitates coupling the device 1200 to a non-tapering coverless container (for example, a non-tapering item of drinkware, such as a "coffee" mug 1250). In addition, the body 1202 defines the removal element that may be grasped to decouple the device 1200 from the coverless container after performing any of the methods described herein. As shown in the figures, the removal element may be a flange 1218 that extends radially outwardly, relative to the longitudinal axis 1206, from the brim 1204. Illustratively, the flange 1218 extends outwardly from the entire perimeter of the brim 1204. In other embodiments, the flange may extend outwardly from less than the entire perimeter of the brim (that is, one or more portions of the perimeter of the brim). During use, the flange 1218 may be disposed above the outlet of the liquid container.

Figure 13A:
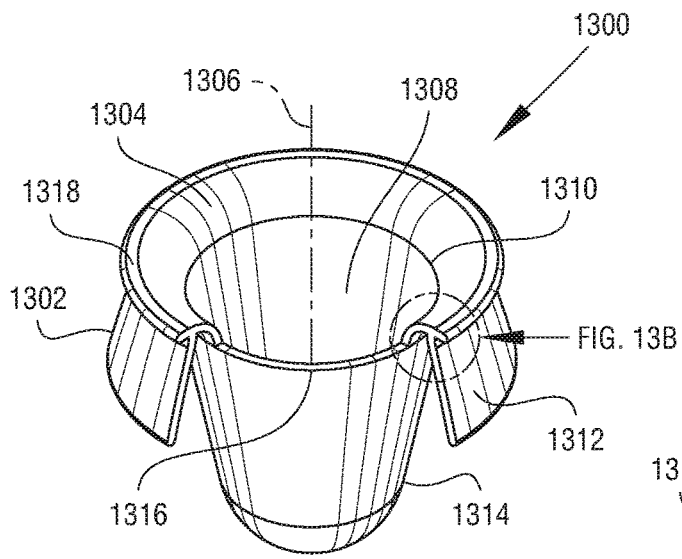
FIG. 13A is a perspective view of a device for facilitating consumption of a plurality of liquids, according to another embodiment of the present disclosure.
Figure 13B:
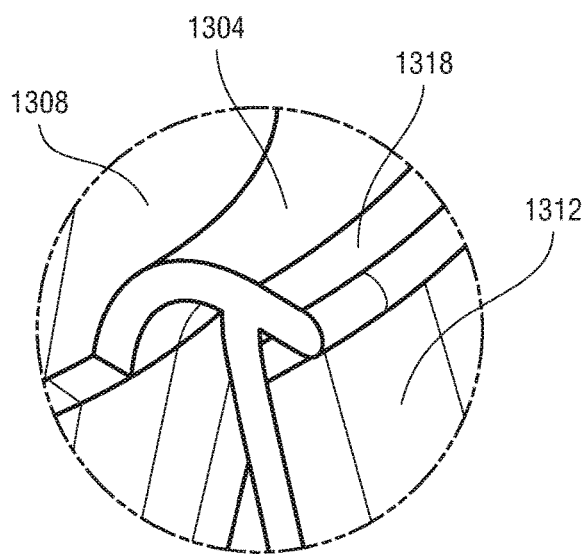
FIG. 13B is a detail view of a portion of the device enclosed by line 13A-13A of FIG. 13A.
Figure 13C:
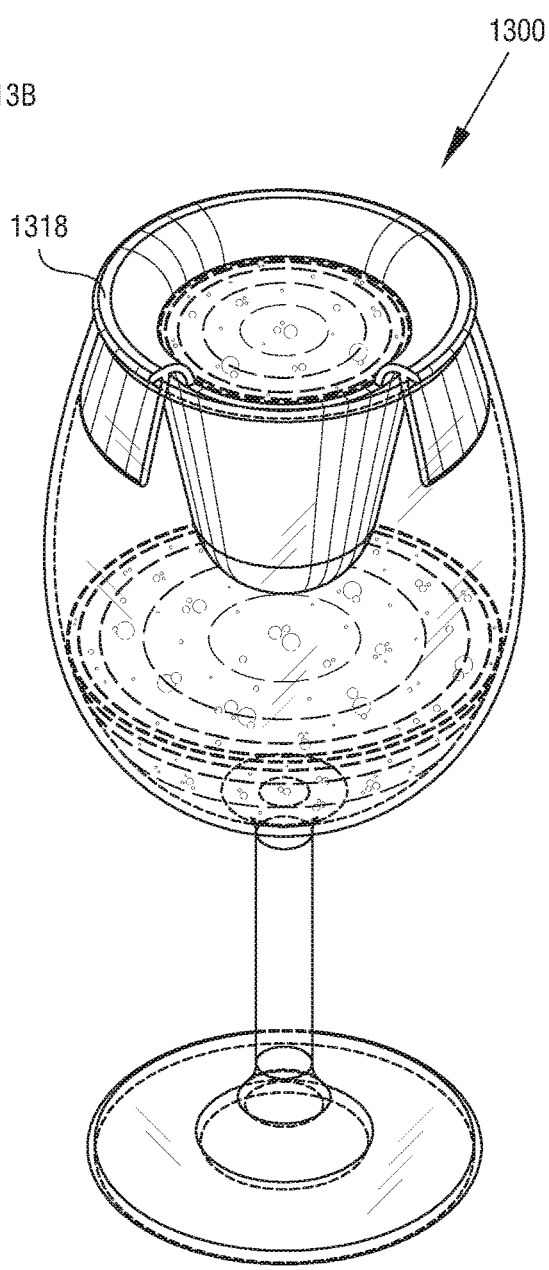
FIG. 13C is a perspective view of the device of FIG. 13A coupled to a wine glass.

FIGS. 13A-13C illustrate another exemplary device 1300 for facilitating consumption of a plurality of liquids when coupled to a coverless container. The device 1300 is similar to the device 1000 described above. That is, the device 1300 includes a monolithic body 1302 that defines a brim 1304, a longitudinal axis 1306, a first liquid chamber 1308, an open end 1310, a lower surface 1314, and a channel 1316 that may be as described in connection with those features of the device 1000. Unlike the device 1000, however, the body 1302 defines an outer surface 1312 that tapers outwardly proceeding away from the brim 1304 to facilitate coupling the device 1300 to a tapering-up coverless container (for example, a tapering-up item of stemware, such as a "wine" glass 1350). In addition, the body 1302 defines the removal element that may be grasped to decouple the device 1300 from the coverless container after performing any of the methods described herein. As shown in the figures, the removal element may be a flange 1318 that extends radially outwardly, relative to the longitudinal axis 1306, from the brim 1304. Illustratively, the flange 1318 extends outwardly from the entire perimeter of the brim 1304. In other embodiments, the flange may extend outwardly from less than the entire perimeter of the brim (that is, one or more portions of the perimeter of the brim). During use, the flange 1318 may be disposed above the outlet of the liquid container.

FIGS. 14A-14C illustrate another exemplary device 1400 for facilitating consumption of a plurality of liquids when coupled to a coverless container. The device 1400 is similar to the device 1000 described above. That is, the device 1400 includes a monolithic body 1402 that defines a brim 1404, a longitudinal axis 1406, a first liquid chamber 1408, an open end 1410, a lower surface 1414, and a channel 1416 that may be as described in connection with those features of the device 1000. Unlike the device 1000, however, an outer surface 1412 of the device 1200 is also disposed radially outwardly relative to the channel 1416. Stated another way, the channel 1416 may be disposed internally in the body 1402 and extend from the brim 1404 to the lower surface 1414. In some embodiments, the portion of the outer surface 1412 disposed radially outwardly relative to the channel 1416 has a height that is less than other portions of the outer surface 1412. For example and as shown in the figures, the portion of the outer surface 1412 disposed radially outwardly relative to the channel 1416 may terminate below the brim 1404. In other embodiments, the portion of the outer surface 1412 disposed radially outwardly relative to the channel 1416 has the same height as other portions of the outer surface 1412. The device 1400 may be used to perform any of the methods described herein.

Turning now to FIGS. 15A-15D, an exemplary device 1500 for facilitating consumption of a plurality of liquids when coupled to a liquid container is illustrated. Generally, the device 1500 includes a body 1502 that is illustratively shown as a unitary component. In other embodiments, however, the body may be formed as two or more distinct components that are coupled to one another.

Figure 15A:
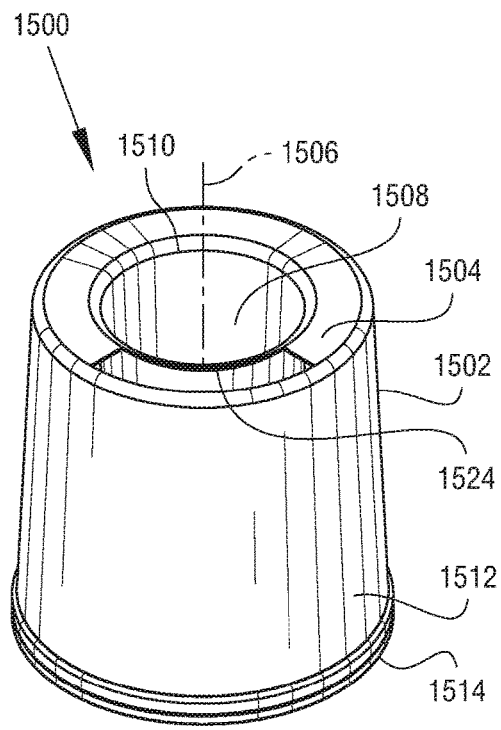
FIG. 15A is a perspective view of a device for facilitating consumption of a plurality of liquids, according to another embodiment of the present disclosure.
Figure 15B:
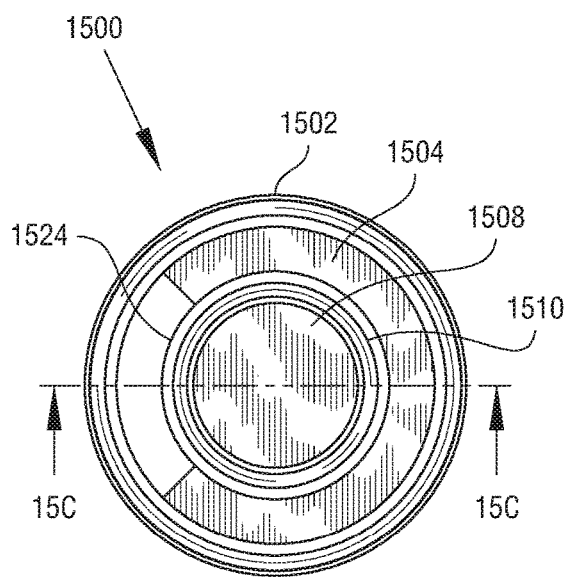
FIG. 15B is a top view of the device of FIG. 15A.
Figure 15C:
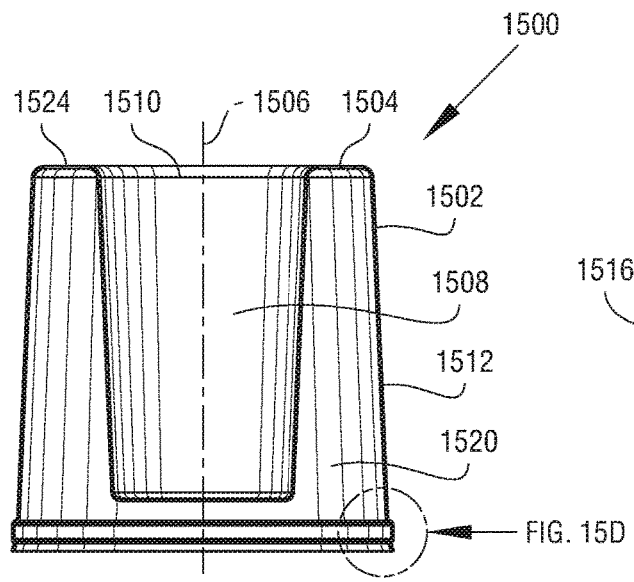
FIG. 15C is a longitudinal sectional view of the device along line 15C-15C of FIG. 15B.
Figure 15D:
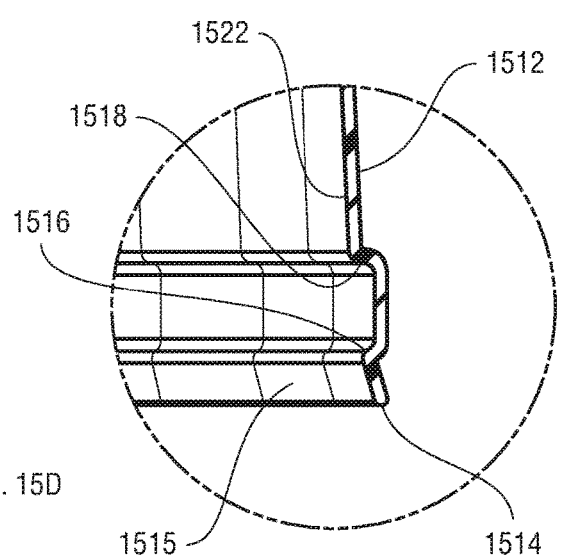
FIG. 15D is a detail view of a portion of the device enclosed by line 15D-15D of FIG. 15C.

The body 1502 defines a brim 1504 that illustratively includes a planar shape (see FIG. 15C). In other embodiments, the brim may have a curved or a non-curved shape. Illustratively, the brim 1504 has an uninterrupted angular width about a longitudinal axis 1506 of the device 1500 of substantially 270 degrees (that is, 270 degrees within ±5 degrees). In other embodiments, the brim may have other angular widths about the longitudinal axis.

The brim 1504 partially extends about and is coupled to a first liquid chamber 1508. The first liquid chamber 1508 is adapted to carry a first liquid, which may be, for example, any of the relatively harsh liquids described herein. The first liquid chamber 1508 includes an open end 1510 that facilitates (1) receiving the first liquid in the first liquid chamber 1508 (for example, filling the first liquid chamber 1508 with the first liquid), and (2) delivering the first liquid from the first liquid chamber 1508 (for example, facilitating pouring of the first liquid from the first liquid chamber 1508 and consumption of the first liquid by a device user). Illustratively, the first liquid chamber 1508 may be substantially concentrically disposed relative to the brim 1504. Stated another way, the first liquid chamber 1508 and the brim 1504 may share a common longitudinal axis 1506. In other embodiments, the first liquid chamber 1508 may be offset from the shared longitudinal axis 1506 with the outer edge of the first liquid chamber 1508 being disposed proximate the outer edge of the brim 1504. Stated another way, the outer diameter of the first liquid chamber 1508 may alternatively be disposed tangentially about the outer diameter of the brim 1504 and proximate the outer surface 1512. Such an alternative structure could provide a closer proximity of the first liquid chamber 1508 to a user's mouth (when positioned for consuming a first liquid) as well as provide a greater surface area for a larger channel 1524 to be disposed about the brim 1504 (allowing for greater ease of access to a second liquid when positioned for use thereinafter).

Illustratively, the first liquid chamber 1508 tapers inwardly proceeding away from the open end 1510. The first liquid chamber 1508 may taper at various angles relative to the longitudinal axis 1506. In other embodiments, the first liquid chamber does not taper and instead includes a conical shape. Illustratively, the first liquid chamber 1508 has a planar shape opposite the open end 1510. In other embodiments, the first liquid chamber has a domed shape or other curved shapes opposite the open end.

The first liquid chamber 1508 may have any of various appropriate capacities or volumes. In some embodiments, the first liquid chamber has the capacity to receive a single or double shot, according to the independent standards set forth by any of various countries, in order to maintain consistency, simplify preparation, and/or reduce over-pouring. In some embodiments, the first liquid chamber 1508 has a volume of substantially 1.5 fl. oz. (44.4 ml). In some embodiments, the first liquid chamber 1508 has a volume of substantially 1.0 fl. oz. (29.6 ml). In some embodiments, the first liquid chamber 1508 has a volume of substantially 3.0 fl. oz. (88.7 ml). In some embodiments, the first liquid chamber 1508 has the capacity to receive a less-than-standard shot volume. In a similar manner to the device 100 described above, such embodiments may appeal to resellers interested in increasing their per-sale profit margins while maintaining the appearance that customers are receiving a standard drink volume.

The body 1502 also defines an outer surface 1512 that is coupled to the brim 1504 opposite the first liquid chamber 1508. Illustratively, the outer surface 1512 tapers outwardly proceeding away from the brim 1504. In other embodiments, the outer surface tapers inwardly proceeding away from the brim, or the outer surface has a cylindrical shape (that is, a non-tapering shape). Illustratively, the outer surface 1512 may be substantially concentrically disposed relative to the first liquid chamber 1508. That is, the outer surface 1512 may have a circular cross-sectional shape, the first liquid chamber 1508 may have a circular cross-sectional shape, and the two circular cross-sectional shapes may be substantially concentrically disposed relative to each other. Stated another way, the outer surface 1512 and the first liquid chamber 1508 may share the longitudinal axis 1506. In other embodiments, the outer surface 1512 may be substantially concentrically disposed relative an associated tab-opened container, while the first liquid chamber 1508 is offset from the longitudinal axis 1506 and disposed closer to the outer surface 1512, in order to provide the potential advantages discussed previously.

The body 1502 further defines a lower surface 1514 that is coupled to the outer surface 1512 opposite the brim 1504. The lower surface 1514 couples to a guide surface 1515 opposite the outer surface 1512. The guide surface 1515 may have a shape that facilitates guiding a container to an appropriate position for coupling to the device 1500. Illustratively, the guide surface 1515 tapers inwardly proceeding away from the lower surface 1514. The guide surface 1515 couples to an attachment element opposite the lower surface 1514. The attachment element couples the device 1500 to a tab-opened container. Specifically, the attachment element includes a lower shoulder 1516 and an upper shoulder 1518 for engaging a rim of a tab-opened container to detachably secure the device 1500 to the tab-opened container. Illustratively, the lower shoulder 1516 and the upper shoulder 1518 are spaced apart such that the rim of a tab-opened container may be disposed therebetween, thereby coupling the device to the tab-opened container. For example and referring briefly to FIGS. 16E and 16F, the lower shoulder 1516 may underlie and engage a lower surface 1606 of the rim 1604 of a tab-opened container, and the upper shoulder 1518 may overlie and engage an upper surface 1608 of the rim 1604 of the tab-opened container to couple the device to the tab-opened container. Stated another way, the lower shoulder 1516 and the upper shoulder 1518 may engage the rim 1604 to facilitate press-fitting engagement of the device to the tab-opened container. Returning to FIGS. 15A-15D, illustratively, the lower shoulder 1516 and the upper shoulder 1518 are disposed radially inwardly relative to the guide surface 1515. Illustratively, the lower shoulder 1516 and the upper shoulder 1518 extend around the entire perimeter of the inner cavity 1520. In other embodiments, the shoulders 1516 and 1518 may extend around less than the entire perimeter of the inner cavity (that is, one or more portions of the perimeter of the inner cavity).

The body 1502 further defines a channel 1524 that extends from the brim 1504 to the inner surface 1522. The channel 1524, together with the inner cavity 1520, is adapted to facilitate delivery therethrough of a second liquid (which may be, for example, any of the relatively mild liquids described herein) carried by the tab-opened container. Illustratively, the channel 1524 has an angular width about the longitudinal axis 1506 of substantially 90 degrees (that is, 90 degrees within ±5 degrees). In other embodiments, the channel may have other angular widths about the longitudinal axis.

As described above, devices according to embodiments of the present disclosure can be used to convert a container into a compartmented liquid container that facilitates consuming a first liquid (for example, any of the relatively harsh liquids described herein) and a second liquid (for example, any of the relatively mild liquids described herein) therefrom. FIGS. 16A-17D illustrate an exemplary device and liquid container for consuming a first liquid and a second liquid. The exemplary device is the device 1500 described above, and the exemplary liquid container is a tab-opened can 1600.

Figure 16A:
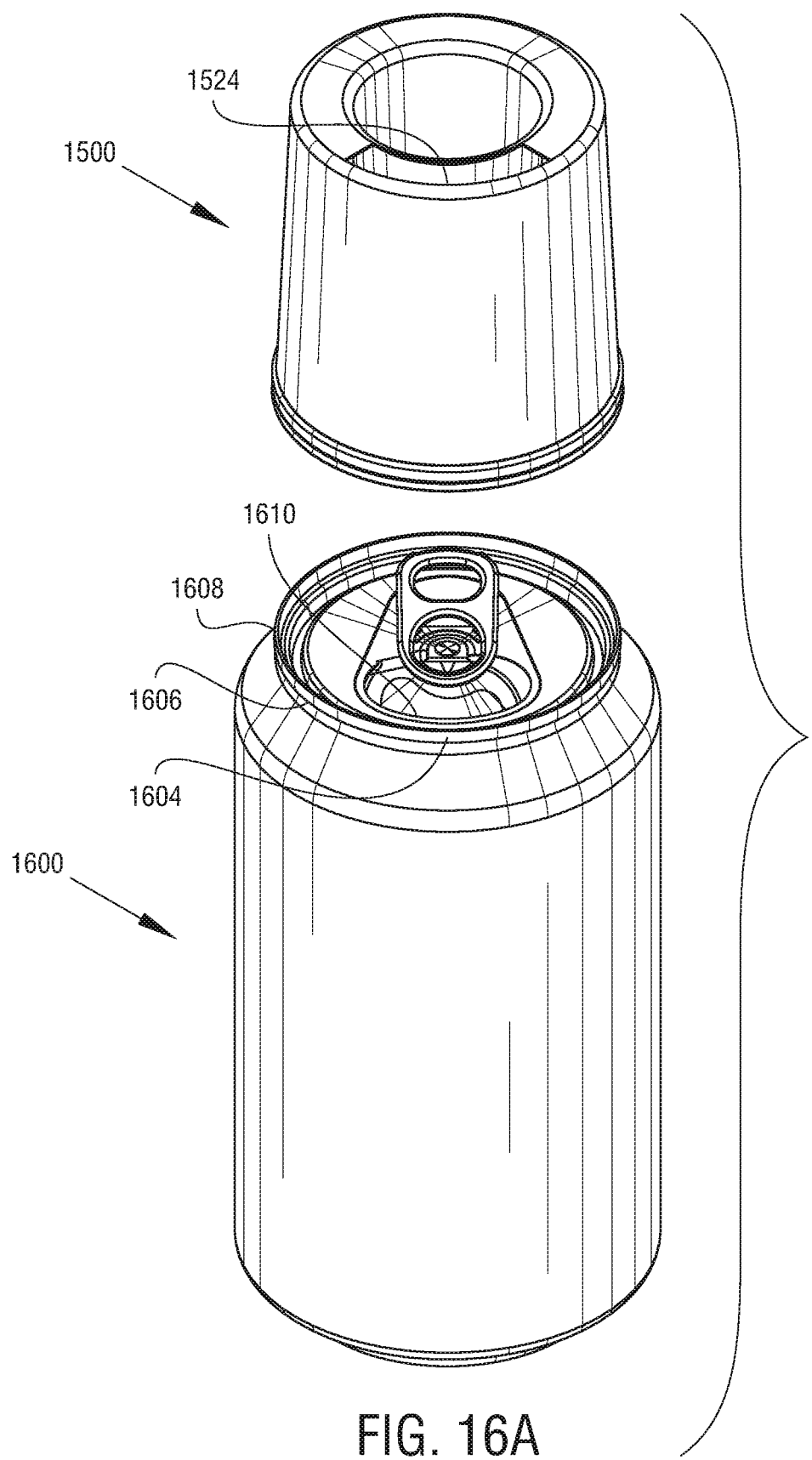
FIG. 16A is a perspective view of the device of FIG. 15A and an opened, pre-filled can for performing a method according to another embodiment of the present disclosure.

A method begins by providing a device according to an embodiment of the present disclosure (for example, the device 1500 as shown in FIGS. 15A-15D) and a liquid container (for example, a tab-opened container, specifically the tab-opened can 1600 as shown in FIG. 16A). In the present example, the tab-opened container is provided pre-filled with a second liquid. The liquid chamber of the liquid container may carry various volumes of the second liquid. For example, the liquid chamber of the liquid container may carry substantially 7.5 fl. oz. or 222 ml of the second liquid (that is, the liquid container may be an "7.5 fl. oz. can"), substantially 8 fl. oz. or 237 ml of the second liquid (that is, the liquid container may be an "8 fl. oz. can"), substantially 8.4 fl. oz. or 250 ml of the second liquid (that is, the liquid container may be an "8.4 fl. oz. can"), substantially 12 fl. oz. or 355 ml of the second liquid (that is, the liquid container may be a "12 fl. oz. can"), substantially 16 fl. oz. or 474 ml of the second liquid (that is, the liquid container may be a "16 fl. oz. can"), substantially 1 pint 3.2 fl. oz. or 568 ml of the second liquid (that is, the liquid container may be an "1 pint 3.2 fl. oz. can"), substantially 22 fl. oz. or 651 ml of the second liquid (that is, the liquid container may be an "22 fl. oz. can"), substantially 24 fl. oz. or 710 ml of the second liquid (that is, the liquid container may be an "24 fl. oz. can"), substantially 25.4 fl. oz. or 752 ml of the second liquid (that is, the liquid container may be an "25.4 fl. oz. can"), substantially 32 fl. oz. or 946 ml of the second liquid (that is, the liquid container may be an "32 fl. oz. can"), or the like. A portion of the second liquid may be consumed from the liquid container prior to continuing.

Next, the device is detachably coupled to the liquid container proximate the liquid container outlet via an attachment element of the device. For example and as shown specifically in FIGS. 16B, 16E, and 16F, the device 1500 may be coupled to the can 1600 by detachably engaging the lower shoulder 1516 with the lower rim surface 1606 of the can 1600 and by detachably engaging the upper shoulder 1518 with the upper rim surface 1608 of the can 1600. As such, the open end 1510 and the channel 1524 of the device 1500 faces in the same direction as the liquid container outlet 1610.

In some embodiments, the device may be coupled to the liquid container in the manner in which the device outlet is angularly aligned with the liquid container outlet of the liquid container. Stated another way, a plane parallel to the longitudinal axis of the device (not shown) may bisect both the device outlet and the liquid container outlet. For example and as shown specifically in FIG. 16D, the channel 1524 of the device 1500 may be angularly aligned with the outlet 1610 of the can 1600. In other embodiments, the device may be coupled to the liquid container in the manner in which the device outlet is partially angularly aligned with the liquid container outlet of the liquid container. Stated another way, the plane parallel to the longitudinal axis of the device may intersect with a portion of the device outlet and a portion of the liquid container outlet. For example, the channel 1524 of the device 1500 may be partially angularly aligned with the outlet 1610 of the can 1600. In other embodiments, the device may be coupled to the liquid container in the manner in which the device outlet is angularly offset from the liquid container outlet of the liquid container. Stated another way, the plane parallel to the longitudinal axis of the device may intersect with one of the device outlet and the liquid container outlet but not the other of the device outlet and the liquid container outlet. For example, the channel 1524 of the device 1500 may be angularly offset from the outlet 1610 of the can 1600.

A first liquid is then delivered to the liquid chamber of the device. For example and as shown specifically in FIG. 16C, the first liquid 1612 may be delivered via the open end 1510 to the liquid chamber 1508 of the device 1500. Various volumes of the first liquid may be delivered to the liquid chamber of the device. For example, the US standard volume of a single shot (substantially 1.5 fl. oz. or 44.4 ml) of the first liquid may be delivered to the liquid chamber of the device.

Next, the liquid container and the device are positioned to deliver the first liquid from the device. More specifically, the liquid container and the device are positioned in a first orientation in which one or both of the liquid container and the body of the device inhibit flow of the second liquid through the device outlet. For example and as shown specifically in FIG. 17A, the tab-opened can 1600 and the device 1500 are positioned in a first orientation in which the tab-opened can 1600 and the body 1502 of the device 1500 inhibit flow of the second liquid 1602 through the device outlet (for example, defined by the channel 1524 at the brim 1504). Illustratively, the liquid container and the device are pivoted horizontally and one or both of the device outlet and the liquid container outlet are at a first elevation in the first orientation. The first elevation may be the relative maximum elevation of one or both of the liquid container outlet and the device outlet about the longitudinal axis when the liquid container and the device are pivoted horizontally. Stated another way, the first elevation may be the "12 o'clock" position of one or both of the liquid container outlet and the device outlet relative to the longitudinal axis when the liquid container and the device are pivoted horizontally. In any case, the user consumes the first liquid from the first liquid chamber while the liquid container and the device are positioned in the first orientation.

The liquid container and the device are then positioned to deliver the second liquid from the liquid container. More specifically, the liquid container and the device are positioned in a second orientation in which the body permits flow of the second liquid through the device outlet. For example and as shown specifically in FIG. 17B, the tab-opened can 1600 and the device 1500 are positioned in a second orientation in which the body 1502 permits flow of the second liquid 1602 through the device outlet (for example, defined by the channel 1524 at the brim 1504). Illustratively, the liquid container and the device are pivoted horizontally and one or both of the device outlet and the liquid container outlet are at a second elevation in the second orientation. The second elevation may be less than the first elevation. The second elevation may be the relative minimum elevation of one or both of the device outlet and the liquid container outlet about the longitudinal axis when the liquid container and the device are pivoted horizontally. Stated another way, the second elevation may be the "6 o'clock" position of one or both of the device outlet and the liquid container outlet relative to the longitudinal axis when the liquid container and the device are pivoted horizontally. Stated another way, the liquid container and the device may be rotated by 180 degrees about the longitudinal axis from the first orientation to reach the second orientation. In any case, the user consumes the second liquid from the liquid chamber of the liquid container while the liquid container and the device are positioned in the second orientation.

In some embodiments, the liquid container outlet may be at substantially the same elevation in both the first orientation and the second orientation, and the device may be pivoted about the longitudinal axis relative to the liquid container to move from the first orientation to the second orientation. For example, in the first orientation the liquid container and the device are pivoted horizontally and the device outlet is at the first elevation, as described above, and the liquid container outlet is at a different, relatively low elevation. The liquid container outlet, for example, may be substantially at the relative minimum elevation of the liquid container outlet about the longitudinal axis when the liquid container and the device are pivoted horizontally (that is, the relative minimum elevation within ±45 degrees). In the second orientation, the liquid container and the device are pivoted horizontally and the device outlet is at the second elevation, as described above, and the liquid container outlet is at substantially the same elevation as in the first orientation (that is, the same elevation within ±15 degrees).

Figure 17A:
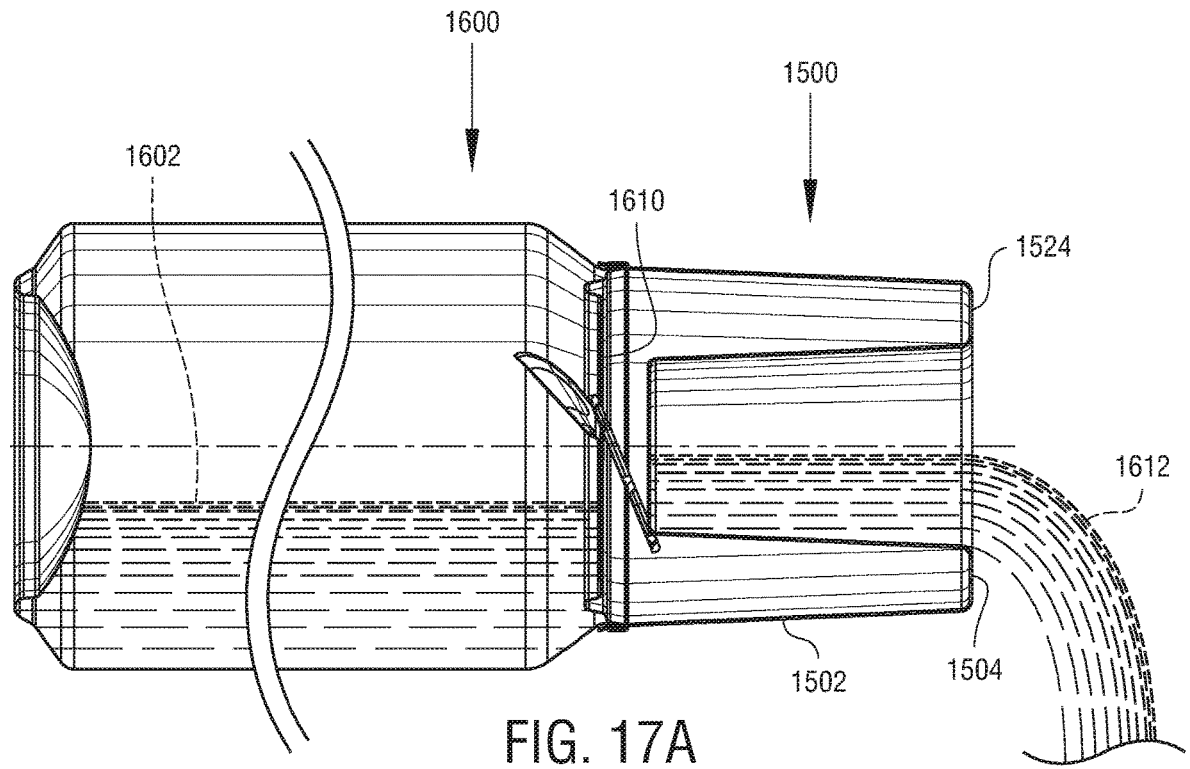
FIG. 17A is a section view of the device and the can along line 16E-16E of FIG. 16D. The device and the can are in a first orientation to deliver a first liquid from the device.
Figure 17B:
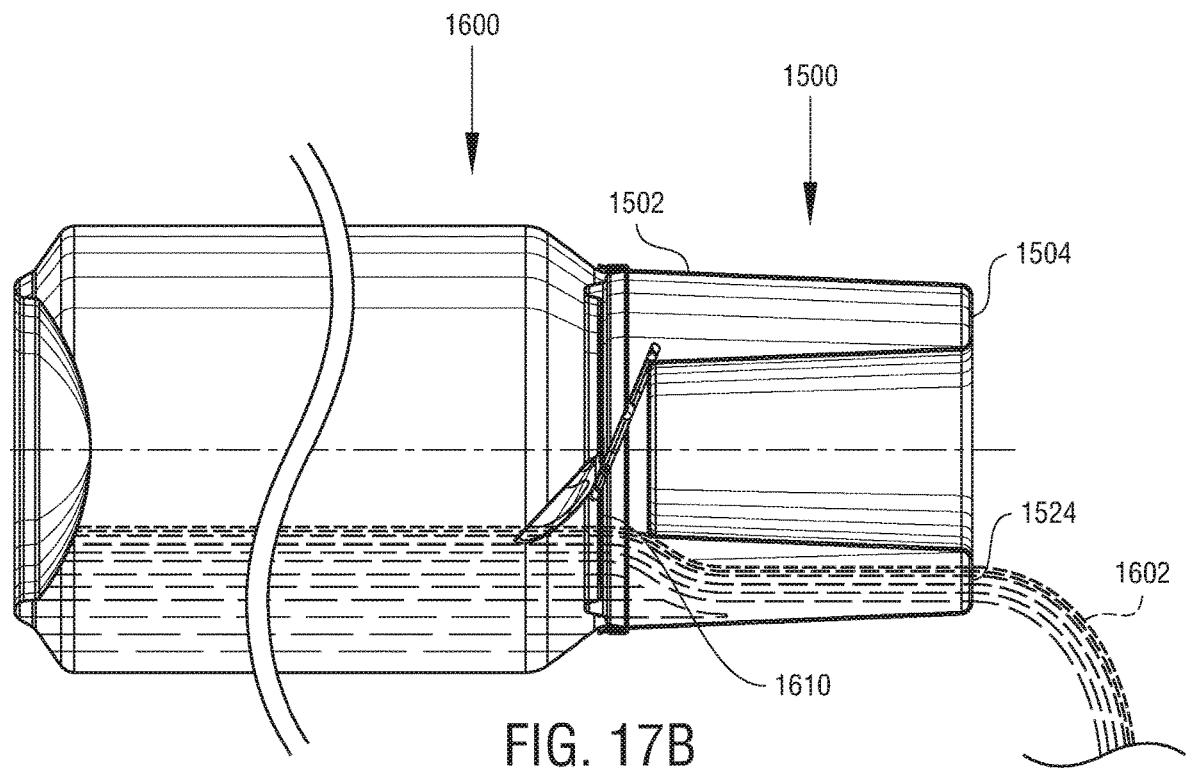
FIG. 17B is a section view of the device and the can along line 16E-16E of FIG. 16D. The device and the can are in a second orientation to deliver a second liquid from the can.
Figure 17C:
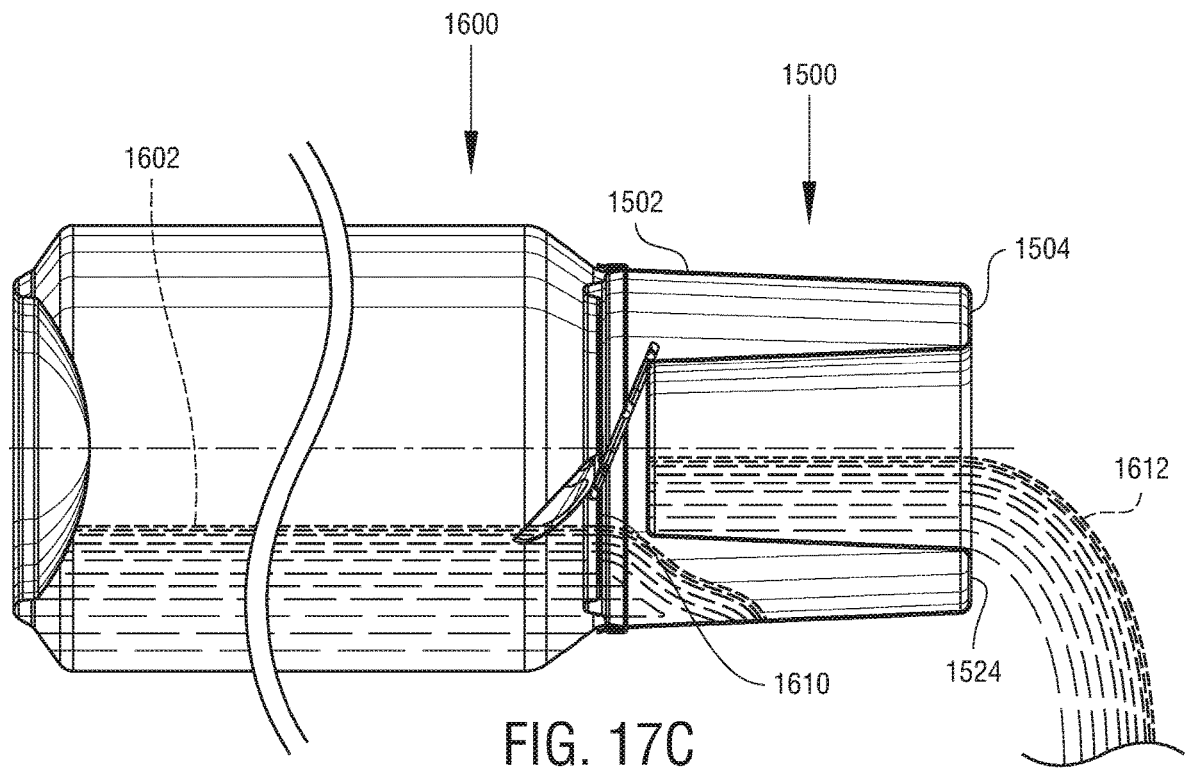
FIG. 17C is a section view of the device and the can along line 16E-16E of FIG. 16D. A first liquid is delivered from the device.
Figure 17D:
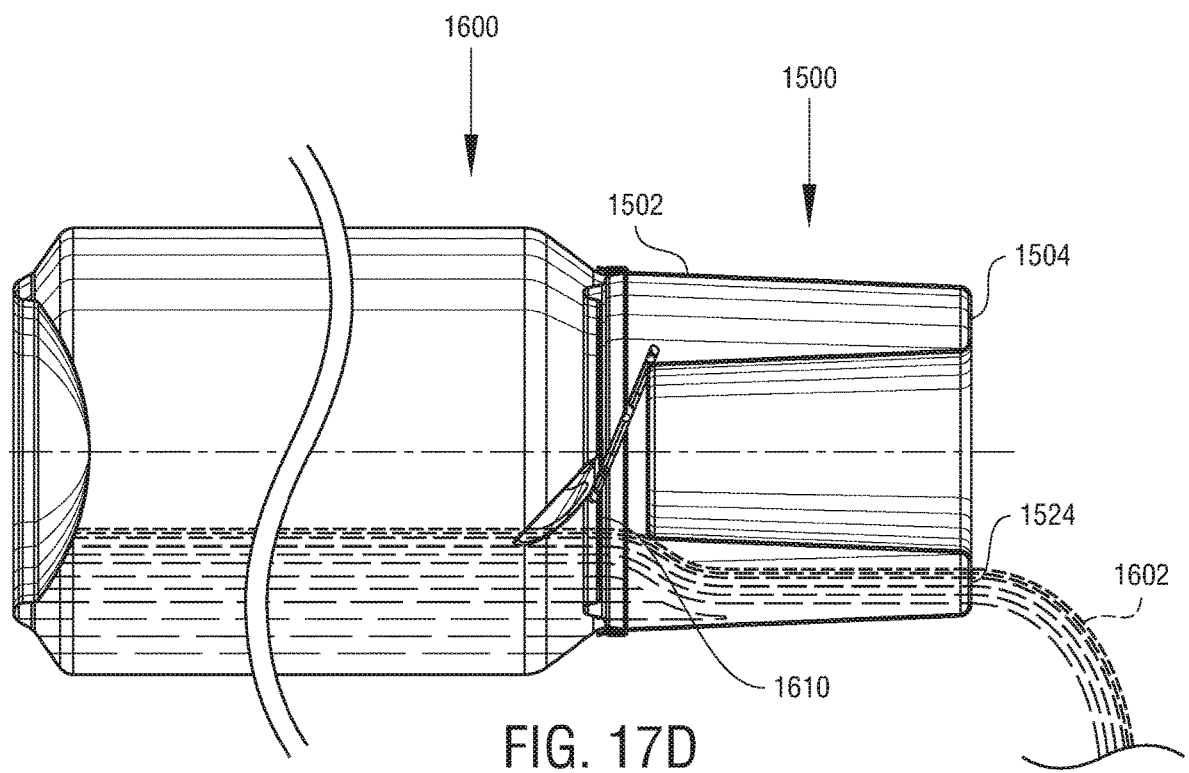
FIG. 17D is a section view of the device and the can along line 16E-16E of FIG. 16D. A second liquid is delivered from the can.

The method described above and illustrated in FIGS. 16A-17B can be modified in various manners. For example and referring to FIGS. 17C and 17D, a relatively small volume of the second liquid (for example, a half-shot (substantially 0.75 fl. oz. or 22 ml), a quarter-shot (substantially 0.375 fl. oz. or 11 ml), or the like) could be carried by the liquid container prior to coupling the device to the liquid container (for example, the tab-opened can 1600). Thereafter and as shown in FIGS. 17C and 17D, the liquid container and the device (for example, the device 1500) are positioned in an orientation in which the device and liquid container deliver the first liquid, and thereafter, the second liquid, therefrom. Illustratively, the liquid container and the device are pivoted horizontally and the device outlet and the liquid container are substantially at the second elevation, described above, in the orientation (that is, the second orientation within ±45 degrees). In the orientation, the liquid container and the device do not inhibit flow of the second liquid through the device outlet. Instead, the first liquid is delivered first, and the second liquid is delivered thereafter due to the relatively small volume of the second liquid contained in the liquid container.

The method described above may include subsequently detaching the device from the liquid container. For example, the device 1500 may be decoupled from the tab-opened can 1600 by pulling the device 1500 and the tab-opened can 1600 in opposite directions, thereby disengaging the lower shoulder 1516 from the lower rim surface 1606 of the can 1600 and disengaging the upper shoulder 1518 from the upper rim surface 1608 of the can 1600. The device may include one or more removal elements (not shown), such as those described above, to facilitate detaching the device from the can 1600. Alternatively, once the user has consumed all of the second liquid 1602 from the can 1600, the assembled unit could be appropriately disposed of. A disposable option may appeal to resellers by encouraging repeat customer purchases while also reducing the cost of labor associated with retrieving, cleaning, and storing the device 1500.

Devices according to embodiments of the disclosure may each facilitate coupling the device to two or more different types of liquid containers. That is, generally, devices according to embodiments of the disclosure may each include two or more attachment elements, and each of the attachment elements facilitates coupling the device to a different type of liquid container. As such, these embodiments facilitate consumption of a first liquid from the device and a second liquid from a variety of liquid containers that may be coupled to the device.

FIGS. 18A-18G and 19 illustrate an exemplary device 1800 that facilitates consumption of a first liquid therefrom and a second liquid from a plurality of types of liquid containers that may be coupled to the device. Generally, the device 1800 includes a body 1802 that is illustratively shown as a plurality of distinct components that are detachably coupled to one another. In other embodiments, however, the body may be formed as a unitary component. Illustratively, the distinct components of the body 1802 include a lower portion 1804, an outer portion 1806, first inner portion 1808, a second inner portion 1810, and an upper portion 1812.

In some embodiments, the lower portion 1804 of the body 1802, which is shown individually in FIG. 18L, is axisymmetric about a longitudinal axis 1814 of the device 1800, with the exception of possible indicia as described below. Illustratively, the lower portion 1804 of the body 1802 generally includes a shape that is similar to an inverted funnel. That is, the lower portion 1804 illustratively includes a relatively large inlet 1816 that is disposed below a relatively small outlet 1818. The inlet 1816 facilitates receiving a second liquid from a plurality of types of liquid containers that may be coupled to the device 1800.

Figure 24A:
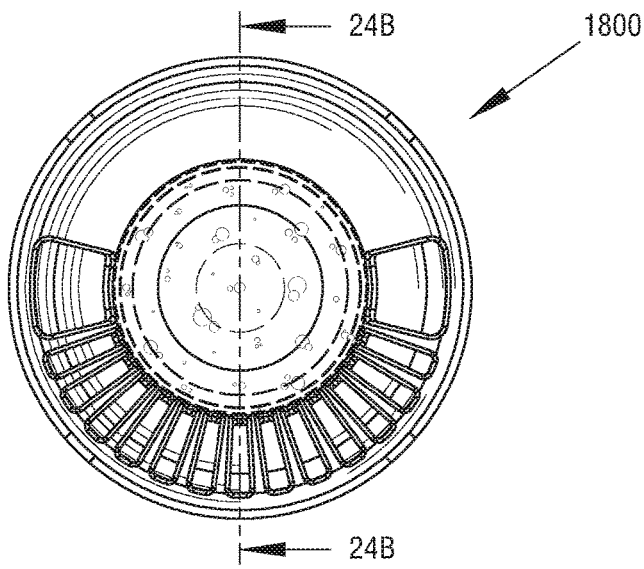
FIG. 24A is a top view of the device of FIG. 18A carrying a first liquid and coupled to a tab-opened container carrying a second liquid.
Figure 24B:
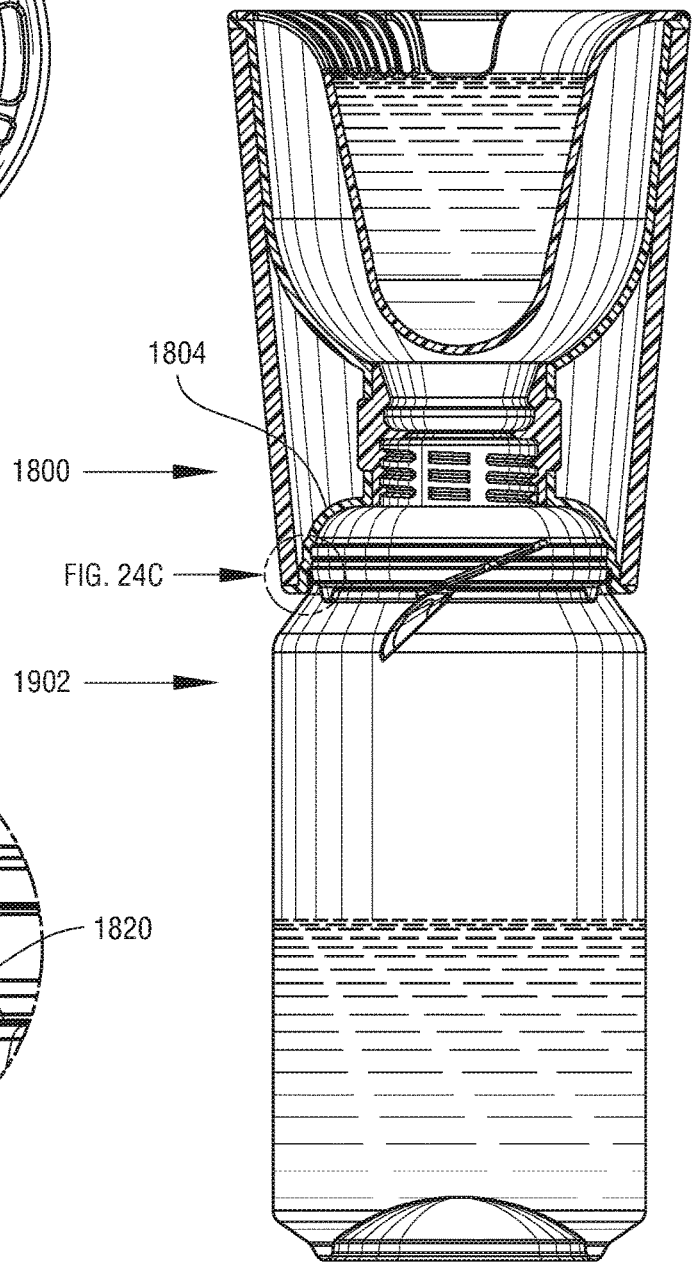
FIG. 24B is a longitudinal sectional view of the device and the tab-opened container along line 24B-24B of FIG. 24A.
Figure 24C:
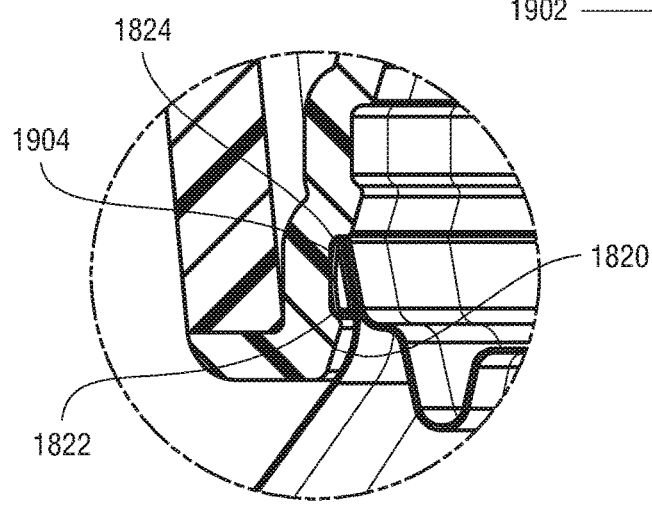
FIG. 24C is a detail view of a portion of the device and the tab-opened container enclosed by line 24C-24C of FIG. 24B.

Proximate the inlet 1816 and within the lower portion 1804, the lower portion 1804 includes a first guide surface 1820. The first guide surface 1820 may have a shape that facilitates guiding a container to an appropriate position for coupling to the device 1800. Illustratively, the first guide surface 1820 tapers inwardly proceeding away from the inlet 1816. The first guide surface 1820 couples to a first attachment element opposite the inlet 1816. The first attachment element is adapted to detachably couple the device 1800 to a specific type of liquid container and facilitate delivering a second liquid carried by the liquid container to the device 1800 via the inlet 1816. Illustratively and referring briefly to FIGS. 19 and 24A-24C, the first attachment element includes a first lower shoulder 1822 and a first upper shoulder 1824 for detachably engaging a rim 1904 of a tab-opened container of a specific rim size (for example, a 16 fl. oz. (473 ml) can 1902 (see FIG. 19) or a 12 fl. oz. (355 ml) can). Illustratively, the first lower shoulder 1822 and the first upper shoulder 1824 are spaced apart such that the rim 1904 of the tab-opened container may be disposed therebetween, thereby coupling the device 1800 to the tab-opened container. For example and referring briefly to FIG. 24C, the first lower shoulder 1822 may underlie and engage a lower surface of the rim 1904 of the tab-opened container, and the first upper shoulder 1824 may overlie and engage an upper surface of the rim 1904 of the tab-opened container to couple the device 1800 to the tab-opened container. Stated another way, the first lower shoulder 1822 and the first upper shoulder 1824 may engage the rim 1904 to facilitate press-fitting engagement of the device 1800 to the tab-opened container. Returning to FIGS. 18A-18G, illustratively, the first lower shoulder 1822 and the first upper shoulder 1824 are disposed radially inwardly relative to the first guide surface 1820. Illustratively, the first lower shoulder 1822 and the first upper shoulder 1824 extend around the entire perimeter within the lower portion 1804. In other embodiments, the first lower shoulder 1822 and the first upper shoulder 1824 may extend around less than the entire perimeter within the lower portion 1804.

The first lower shoulder 1822 and the first upper shoulder 1824 provide the first attachment element with a diameter that facilitates press-fittingly and detachably receiving the tab-opened container. For example, the diameter may be substantially 2.0 in. (51 mm) (that is, 2.0 in. (51 mm) within ±0.25 in. (6.4 mm)), substantially 2.1 in. (53 mm) (that is, 2.1 in. (53 mm) within ±0.25 in. (6.4 mm)), substantially 2.5 in. (64 mm) (that is, 2.5 in. (64 mm) within ±0.25 in. (6.4 mm)), substantially 2.7 in. (69 mm) (that is, 2.7 in. (69 mm) within ±0.25 in. (6.4 mm)), or substantially 3.0 in. (76 mm) (that is, 3.0 in. (76 mm) within ±0.25 in. (6.4 mm)).

Figure 23A:
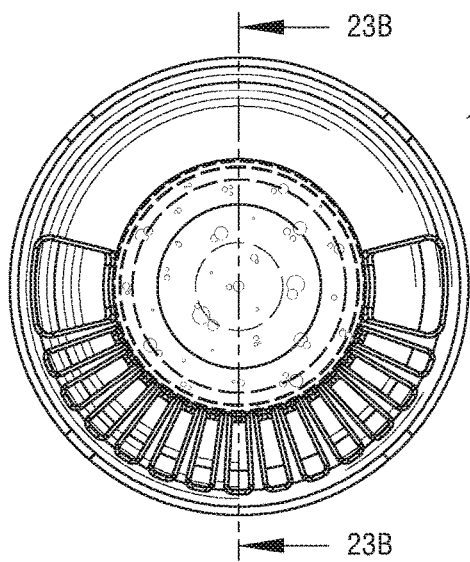
FIG. 23A is a top view of the device of FIG. 18A carrying a first liquid and coupled to a tab-opened container carrying a second liquid.
Figure 23B:
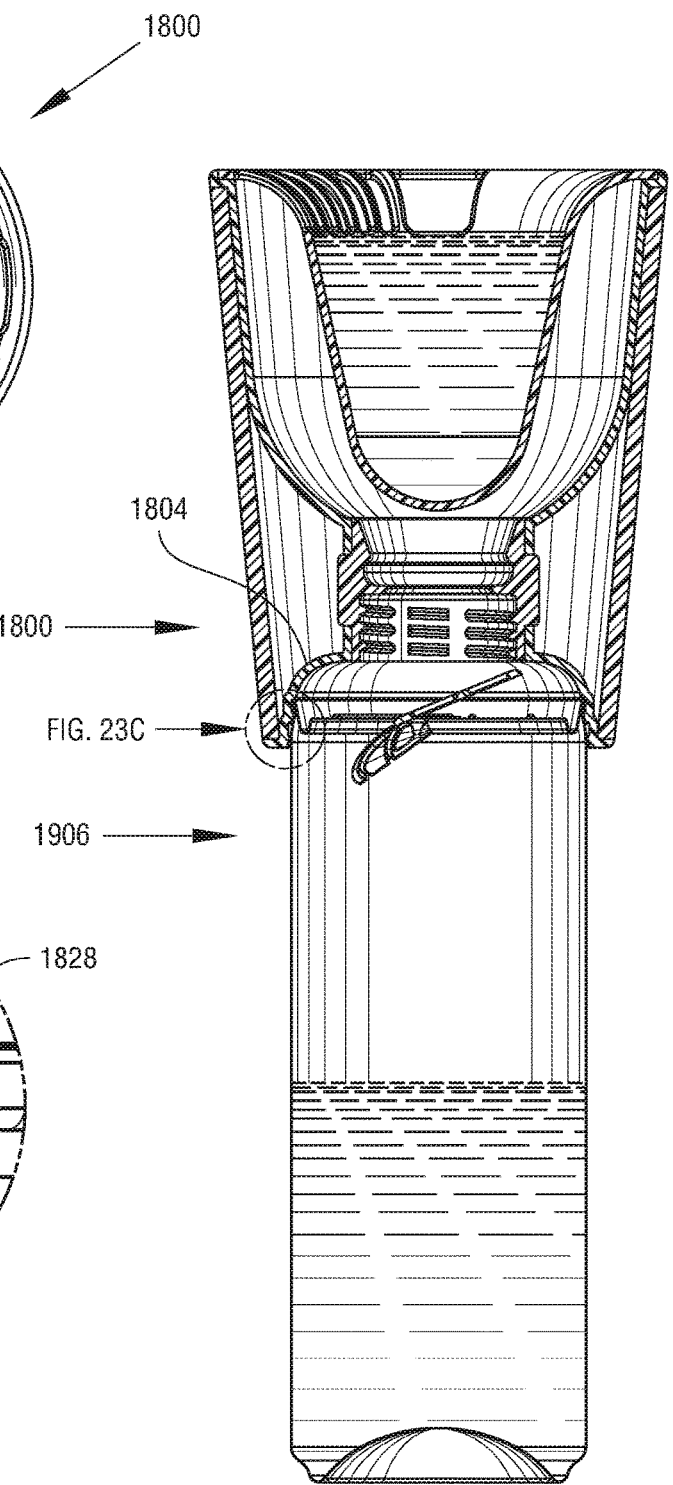
FIG. 23B is a longitudinal sectional view of the device and the tab-opened container along line 23B-23B of FIG. 23A.
Figure 23C:
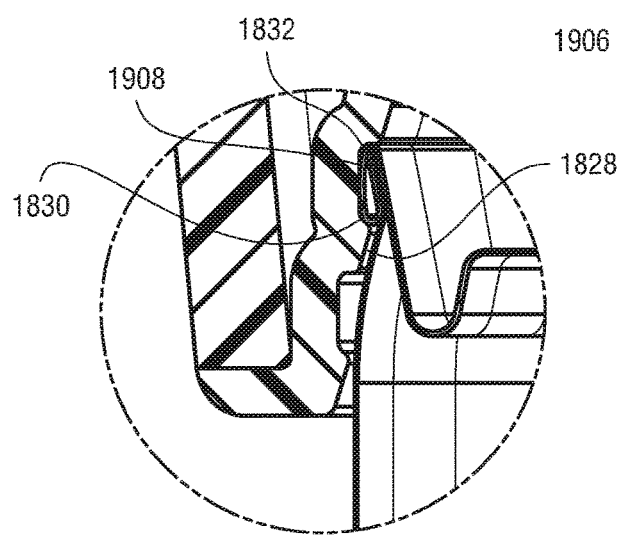
FIG. 23C is a detail view of a portion of the device and the tab-opened container enclosed by line 23C-23C of FIG. 23B.

Above the first attachment element, the lower portion 1804 includes a second guide surface 1828. The second guide surface 1828 may have a shape that facilitates guiding a container to an appropriate position for coupling to the device 1800. Illustratively, the second guide surface 1828 tapers inwardly proceeding away from the first attachment element. The second guide surface 1828 couples to a second attachment element opposite the first attachment element. The second attachment element is adapted to detachably couple the device 1800 to a specific type of liquid container and facilitate delivering a second liquid carried by the liquid container to the device 1800 via the inlet 1816. Illustratively and referring briefly to FIGS. 19 and 23A-23C, the second attachment element includes a second lower shoulder 1830 and a second upper shoulder 1832 for detachably engaging a rim 1908 of a tab-opened container of a specific rim size (for example, a 8.4 fl. oz. (248 ml) can 1906 (see FIG. 19)). Illustratively, the second lower shoulder 1830 and the second upper shoulder 1832 are spaced apart such that the rim 1908 of the tab-opened container may be disposed therebetween, thereby coupling the device 1800 to the tab-opened container. For example and referring briefly to FIG. 23C, the second lower shoulder 1830 may underlie and engage a lower surface of the rim 1908 of the tab-opened container, and the second upper shoulder 1832 may overlie and engage an upper surface of the rim 1908 of the tab-opened container to couple the device 1800 to the tab-opened container. Stated another way, the second lower shoulder 1830 and the second upper shoulder 1832 may engage the rim 1908 to facilitate press-fitting engagement of the device 1800 to the tab-opened container. Returning to FIGS. 18A-18G, illustratively, the second lower shoulder 1830 and the second upper shoulder 1832 are disposed radially inwardly relative to the second guide surface 1828. Illustratively, the second lower shoulder 1830 and the second upper shoulder 1832 extend around the entire perimeter within the lower portion 1804. In other embodiments, the second lower shoulder 1830 and the second upper shoulder 1832 may extend around less than the entire perimeter within the lower portion 1804.

The second lower shoulder 1830 and the second upper shoulder 1832 provide the second attachment element with a diameter that facilitates press-fittingly and detachably receiving the tab-opened container. For example, the diameter may be substantially 2.0 in. (51 mm) (that is, 2.0 in. (51 mm) within ±0.25 in. (6.4 mm)), substantially 2.1 in. (53 mm) (that is, 2.1 in. (53 mm) within ±0.25 in. (6.4 mm)), substantially 2.5 in. (64 mm) (that is, 2.5 in. (64 mm) within ±0.25 in. (6.4 mm)), substantially 2.7 in. (69 mm) (that is, 2.7 in. (69 mm) within ±0.25 in. (6.4 mm)), or substantially 3.0 in. (76 mm) (that is, 3.0 in. (76 mm) within ±0.25 in. (6.4 mm)).

Above the second attachment element, the lower portion 1804 of the body 1802 includes a curved wall 1834 that tapers inwardly proceeding away from the inlet 1816 and towards the outlet 1818. The curved wall 1834 in turn couples to the outlet 1818. The outlet 1818 press fittingly and detachably receives the second inner portion 1810, as described in further detail below. In other embodiments, the wall 1834 is alternatively angled, while maintaining the same overall configuration.

Proximate the inlet 1816, lower portion 1804 of the body 1802 further defines a lower surface 1826. Illustratively, the lower surface 1826 has a flat shape to facilitate freely standing the device 1800. In other embodiments, the lower surface has a non-flat shape, such as a curved shape or a domed shape.

Figure 20A:
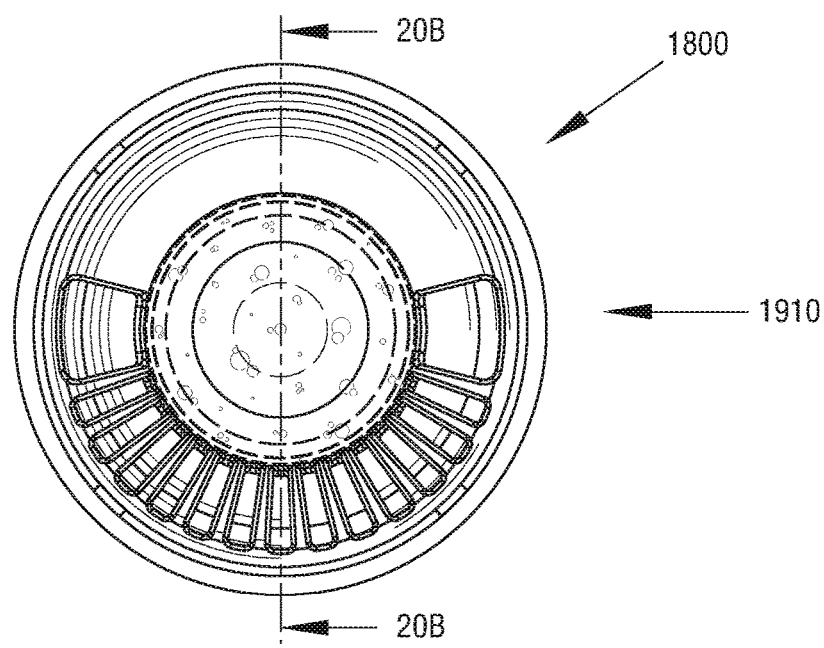
FIG. 20A is a top view of the device of FIG. 18A carrying a first liquid and coupled to a coverless container carrying a second liquid.
Figure 20B:
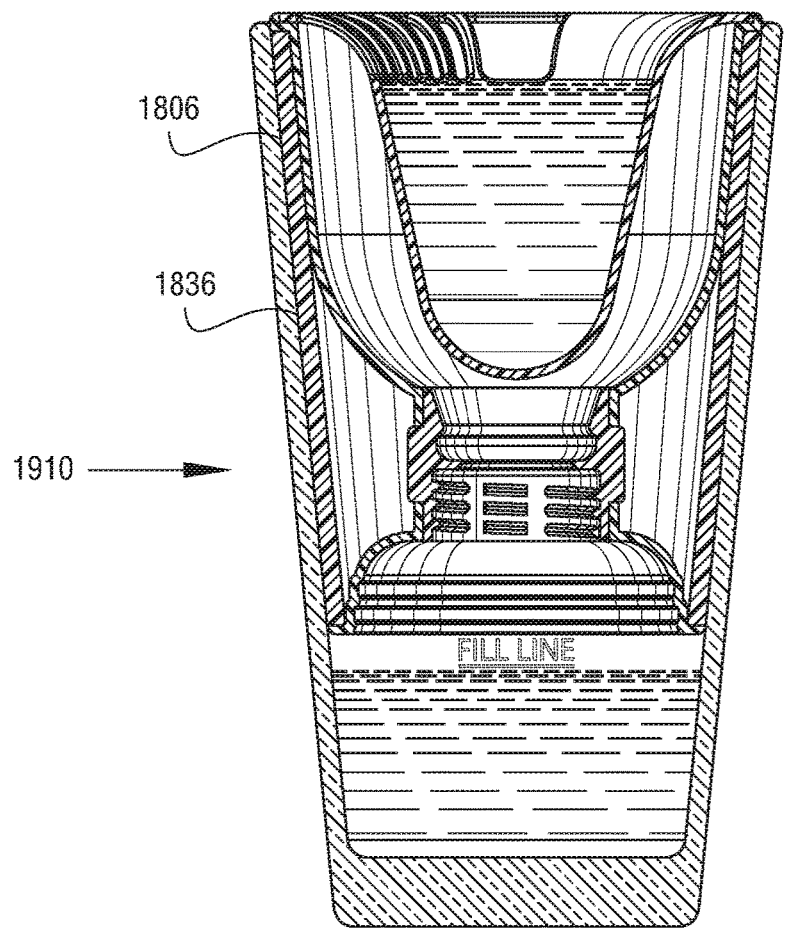
FIG. 20B is a longitudinal sectional view of the device and the coverless container along line 20B-20B of FIG. 20A.

Proximate the lower surface 1826, the lower portion 1804 of the body 1802 couples to the outer portion 1806 of the body 1802. In some embodiments, the outer portion 1806, which is shown individually in FIG. 18K, is axisymmetric about the longitudinal axis 1814. The outer portion 1806 of the body 1802 defines a third attachment element. The third attachment element is adapted to detachably couple the device 1800 to another specific type of liquid container and facilitate delivering a second liquid carried by the liquid container to the device 1800 via the inlet 1816. Illustratively and referring briefly to FIGS. 19 and 20A-20B, the third attachment element is an outer surface 1836 that is adapted to detachably and press-fittingly engage an inner surface of a coverless container to detachably secure the device 1800 to the coverless container. Accordingly, the outer surface 1836 may have a shape that is the inverse of the shape of the inner surface of the coverless container. Illustratively, the outer surface 1836 tapers inwardly proceeding away from the upper portion 1812 to facilitate use with "tapering-down" coverless containers, such as a pint glass 1910 (as a specific example, a 16 fl. oz. (473 ml) pint glass). In other embodiments, the outer surface may taper outwardly proceeding away from the upper portion (to facilitate use with "tapering-up" coverless containers, such as "wine" glasses), or the outer surface may have a semi-cylindrical shape (that is, a non-tapering shape, to facilitate use with non-tapering coverless containers, such as "coffee" mugs).

Opposite the lower portion 1804, the outer portion 1806 of the body 1802 couples to the first inner portion 1808 of the body 1802. In some embodiments, the first inner portion 1808, which is shown individually in FIG. 18I, is axisymmetric about the longitudinal axis 1814, with the exception of possible coupling elements as described below. Illustratively, the first inner portion 1808 of the body 1802 generally includes a shape that is similar to a funnel. That is, the first inner portion 1808 illustratively includes a relatively small inlet 1838 that is disposed below a relatively large outlet 1840. Proximate the outlet 1840, the first inner portion 1808 may include one or more coupling elements for detachably securing the first inner portion 1808 to the upper portion 1812 of the body 1802. Illustratively, the coupling elements are four recesses 1842 that are spaced substantially 90 degrees (that is, 90 degrees within ±5 degrees) apart from each other. Below the outlet 1840, the first inner portion 1808 includes a curved wall 1844 that tapers inwardly proceeding towards the inlet 1838. Opposite the outlet 1840, the curved wall 1844 couples to the inlet 1838. The inlet 1838 press fittingly and detachably receives the second inner portion 1810, as described in further detail below. In other embodiments, the wall 1844 is alternatively angled, while maintaining the same overall configuration.

The second inner portion 1810, which is shown individually in FIG. 18J, is also referred to herein as an "adapter". The second inner portion 1810 includes a passageway 1846 through which a second liquid may flow from the lower portion 1804 to the first inner portion 1808. The second inner portion 1810 is also reversibly connectable to the lower portion 1804 and the first inner portion 1808 such that the second inner portion 1810 can selectively occupy a first position and a second position relative to the other components of the device 1800. In the first position, the second inner portion 1810 is disposed such that a fourth attachment element, which is described in further detail below, is proximate the outlet 1818 of the lower portion 1804 (see FIG. 1818C). In the second position, the second inner portion 1810 is disposed such that a fifth attachment element, which is described in further detail below, is proximate the outlet 1818 of the lower portion 1804.

Figure 22A:
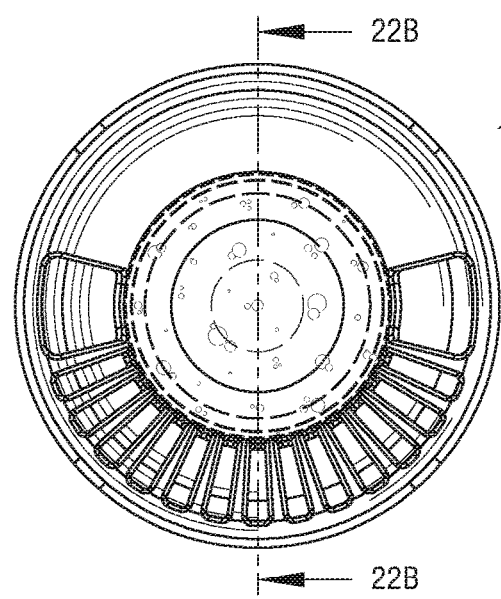
FIG. 22A is a top view of the device of FIG. 18A carrying a first liquid and coupled to a twist-off capped container carrying a second liquid.
Figure 22B:
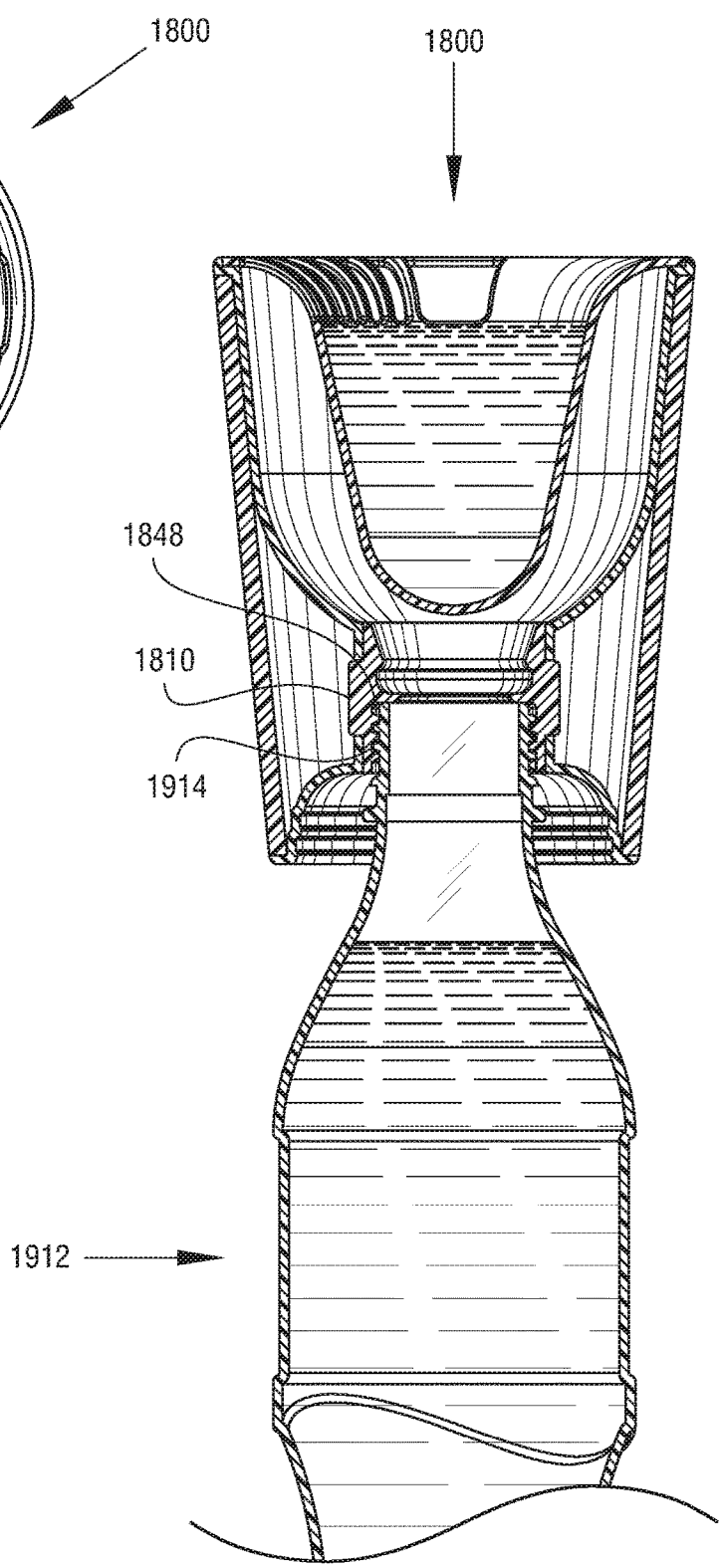
FIG. 22B is a longitudinal sectional view of the device and the twist-off capped container along line 22B-22B of FIG. 22A.

In the first position, the fourth attachment element is adapted to detachably couple the device 1800 to a specific type of liquid container and facilitate delivering a second liquid carried by the liquid container to the device 1800 via the inlet 1816 of the lower portion 1804. Illustratively and referring briefly to FIGS. 19 and 22A-22B, the fourth attachment element is an inner threaded surface 1848 that is adapted to detachably engage the outer threaded surface 1914 of a twist-off capped container, such as a twist-off capped bottle 1912 (as a specific example, a 20 fl. oz. (591 ml) bottle). Illustratively, the inner threaded surface 1848 includes interrupted threads. In other embodiments, the inner threaded surface includes continuous threads. In some embodiments, an outer surface 1852 of the second inner portion 1810 proximate the fourth attachment element includes indicia that indicates the specific type(s) of liquid containers to which the fourth attachment element may be detachably coupled (for example, "plastic bottle").

Figure 21A:
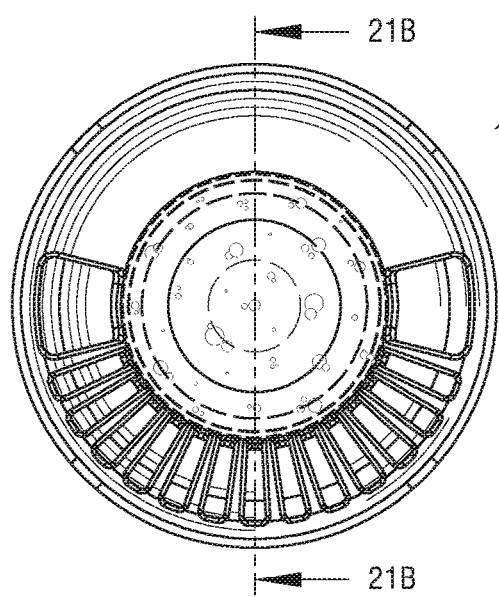
FIG. 21A is a top view of the device of FIG. 18A carrying a first liquid and coupled to a pry-off capped container carrying a second liquid.
Figure 21B:
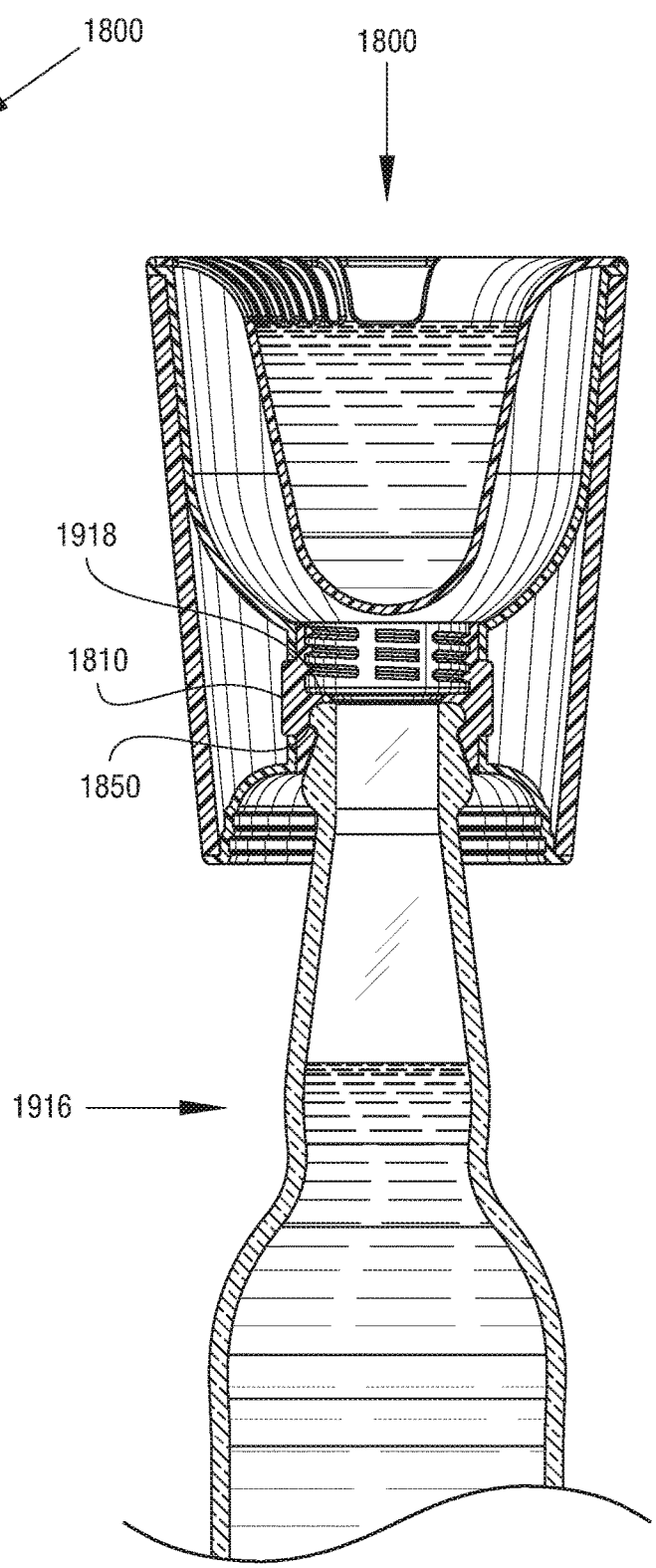
FIG. 21B is a longitudinal sectional view of the device and the pry-off capped container along line 21B-21B of FIG. 21A.

In the second position, the fifth attachment element is adapted to detachably couple the device 1800 to a specific type of liquid container and facilitate delivering a second liquid carried by the liquid container to the device 1800 via the inlet 1816 of the lower portion 1804. Illustratively and referring briefly to FIGS. 19 and 21A-21B, the fifth attachment element is a third shoulder 1850 that is adapted to detachably engage the lip 1918 at the outlet of a pry-off capped container, such as a pry-off capped bottle 1916 (as a specific example, a 16 fl. oz. (473 ml) bottle). In some embodiments, the outer surface 1852 of the second inner portion 1810 proximate the fifth attachment element includes indicia that indicates the specific type(s) of liquid containers to which the fifth attachment element may be detachably coupled (for example, "glass bottle").

Figure 18D:
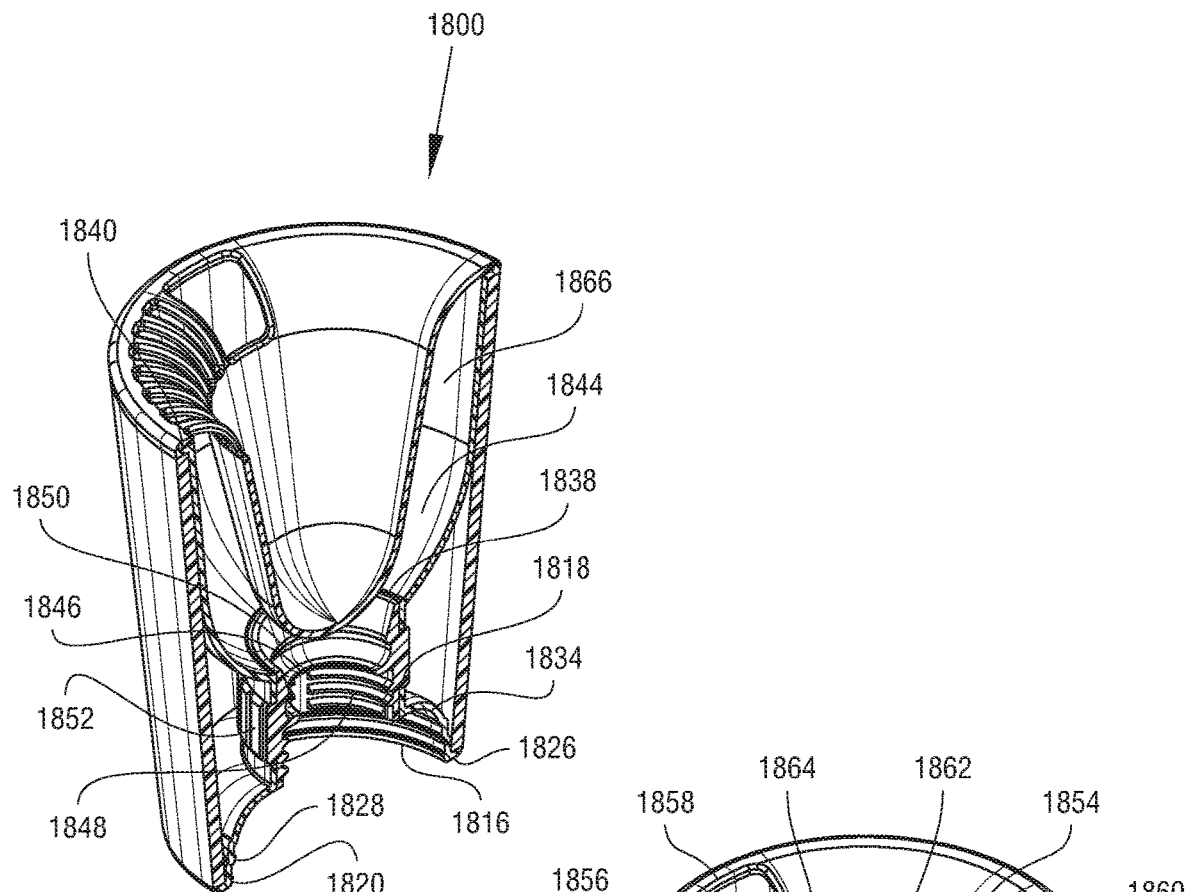
FIG. 18D is a perspective longitudinal sectional view of the device along line 18C-18C of FIG. 18B.
Figure 18E:
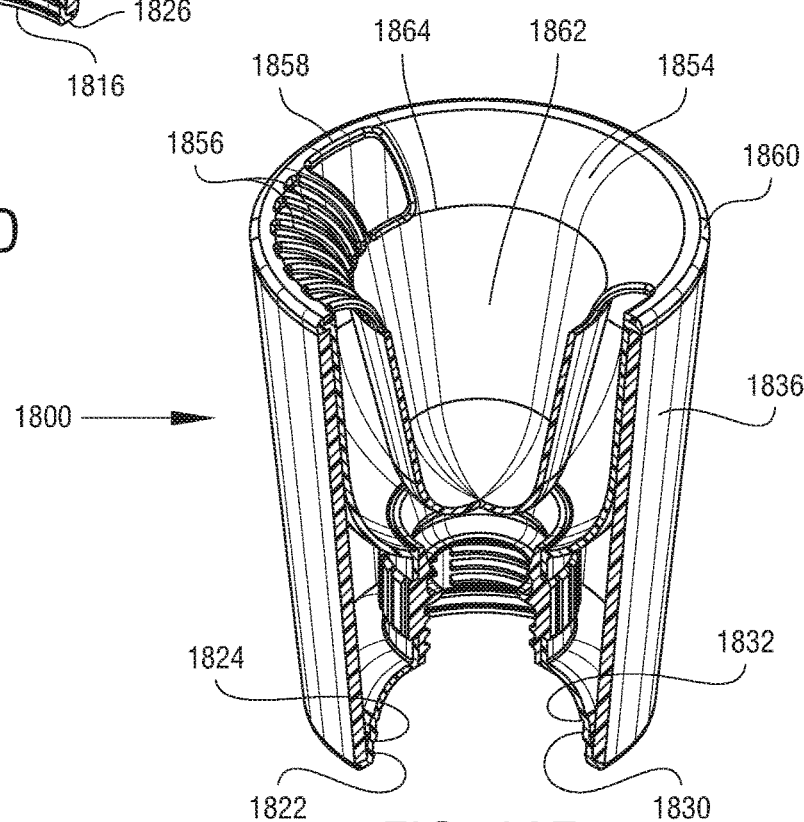
FIG. 18E is a perspective sectional view of the device along line 18E-18E of FIG. 18B.
Figure 18F:
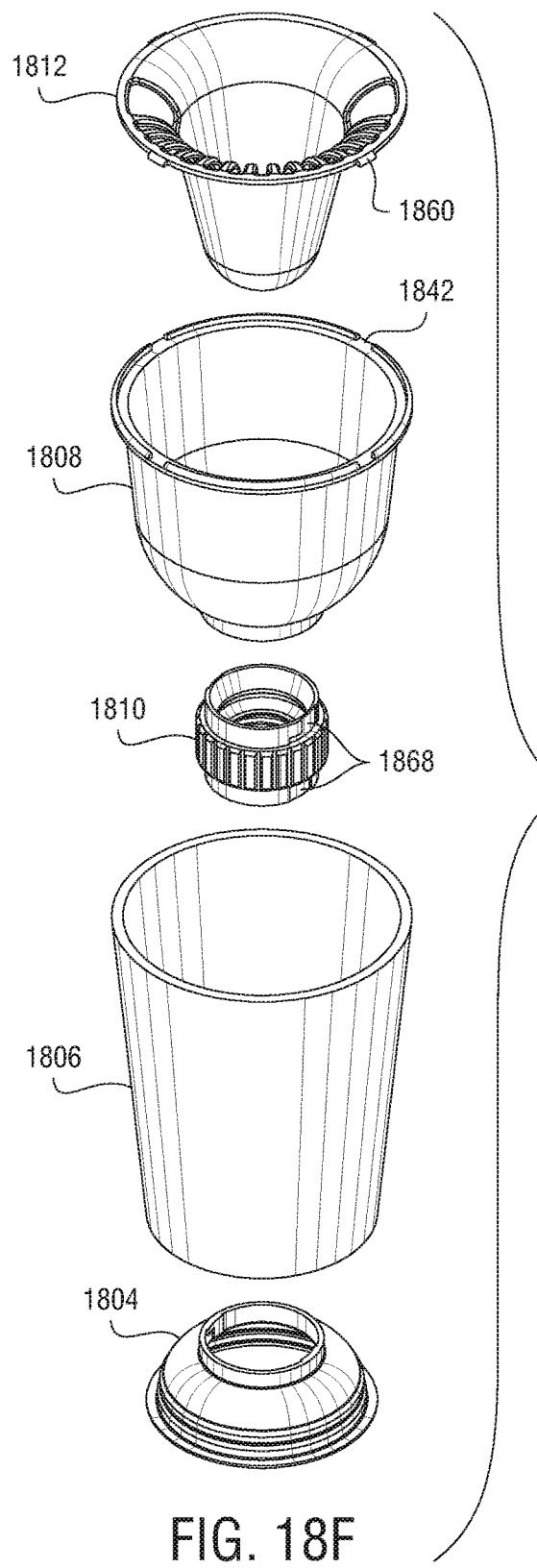
FIG. 18F is an exploded perspective view of the device of FIG. 18A.
Figure 18G:
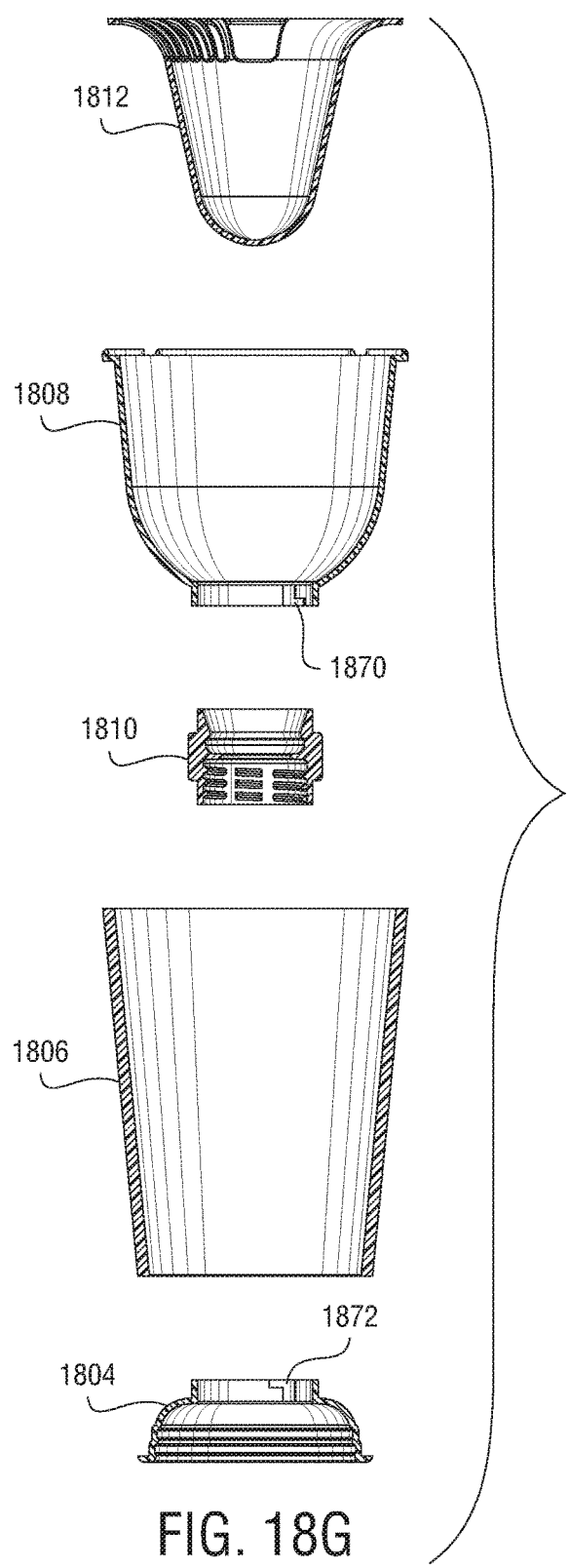
FIG. 18G is an exploded longitudinal sectional view of the device along line 18C-18C of FIG. 18B.
Figure 19:
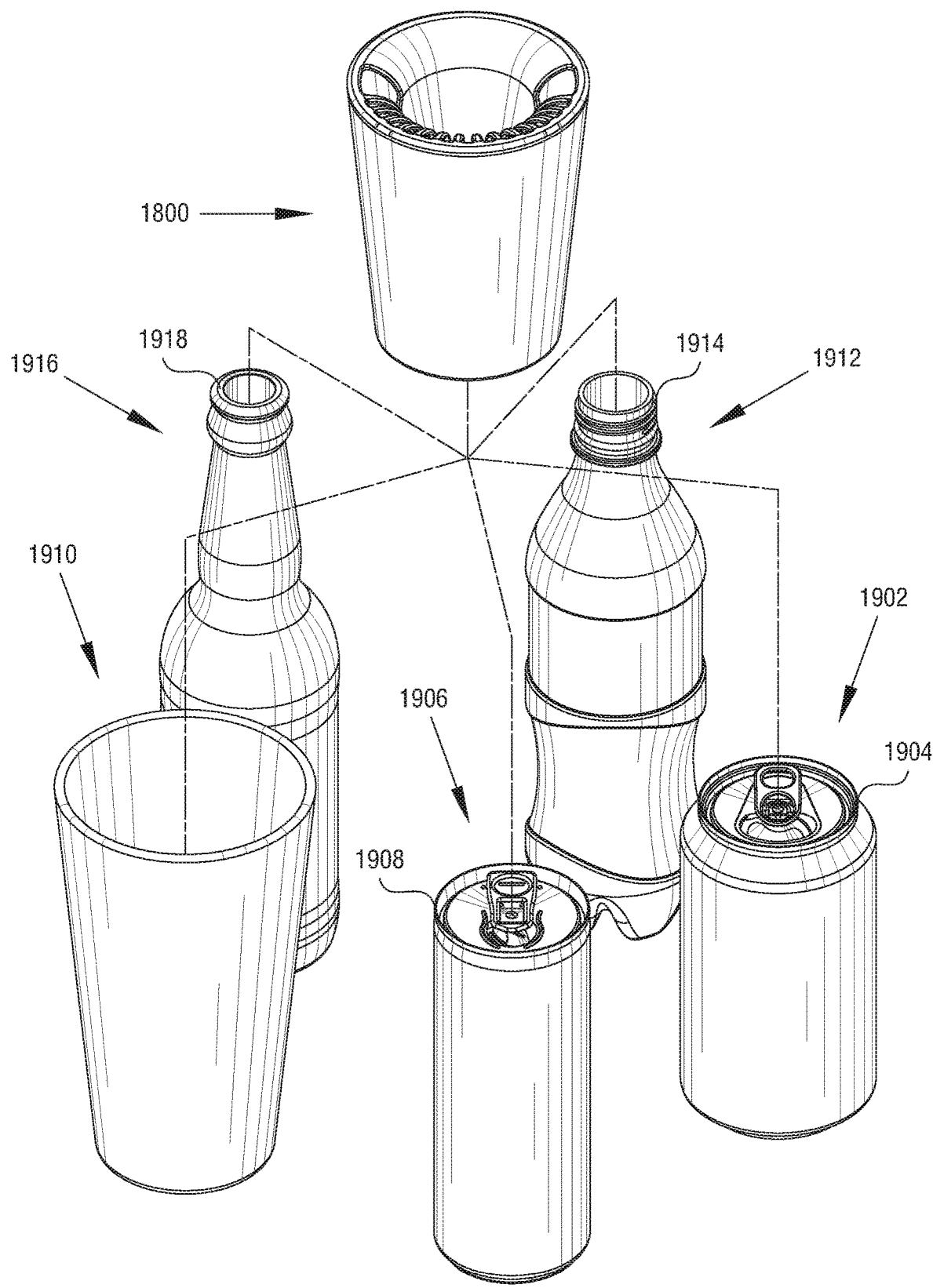
FIG. 19 is a perspective view of the device of FIG. 18A and various types of liquid containers that may be coupled to the device.

In some embodiments, the second inner portion 1810 may include one or more selectively engageable "locking" elements that, when engaged, inhibit the second inner portion 1810 from being detached from the first inner portion 1808 and/or the lower portion 1804 (for example, "twist locking" elements). As shown in FIG. 18F, the second inner portion 1810 includes four reversed "L-shaped" recesses 1868, two laterally disposed above a central top plane (not shown) and two inversely disposed below the central top plane (not shown). Further, each recess 1868 is shown diametrically opposed to another (in each pair) about the longitudinal axis (not shown) with the bases of the "L-shaped" recesses proximate the central top plane (not shown). As shown in FIG. 18G, the first inner portion 1808 includes two upright "L-shaped" projections 1870 and the lower portion 1804 includes two inverse "L-shaped" projections 1872 for engaging the reversed "L-shaped" recesses 1868 on either side of the second inner portion 1810. In other embodiments, the selectively engageable "locking" elements may be of any appropriate shape and/or connection type.

The upper portion 1812, which is shown individually in FIG. 18H, includes a brim 1854 that illustratively includes a curved shape. In other embodiments, the brim may have a planar shape. The brim 1854 includes one or more apertures 1856 that extend through the brim 1854 to define an outlet for delivering a second liquid from the device 1800. Illustratively, the brim 1854 includes 13 apertures 1856 that each have an angular width of substantially 6 degrees (that is, 6 degrees within ±0.5 degrees) and are each offset by an angle of substantially 11.5 degrees (that is, 11.5 degrees within ±0.5 degrees), although various other configurations may be used. The brim 1854 also includes one or more removal elements. The removal element(s) may be grasped to decouple the device 1800 from a liquid container after performing any of the methods described herein or to detach the different components of the device 1800 from each other. As shown in the figures, the device 1800 may illustratively include two removal elements, and the removal elements may be apertures 1858 that extend through the brim 1854. Illustratively, the brim 1854 includes 2 apertures 1858 that each have an angular width of substantially 28 degrees (that is, 28 degrees within ±1 degrees) and are each offset by an angle of substantially 180 degrees (that is, 180 degrees within ±5 degrees), although various other configurations may be used.

The brim 1854 may include one or more coupling elements that facilitate securing the upper portion 1812 to the first inner portion 1808. Illustratively, the brim 1854 includes four transversely extending projections 1860 that are each received in one of the recesses 1842 of the first inner portion 1808.

The brim 1854 partially extends about and is coupled to a first liquid chamber 1862. The first liquid chamber 1862 is adapted to carry a first liquid, which may be, for example, any of the relatively harsh liquids described herein. The first liquid chamber 1862 includes an open end 1864 that facilitates (1) receiving the first liquid in the first liquid chamber 1862 (for example, filling the first liquid chamber 1862 with the first liquid), and (2) delivering the first liquid from the first liquid chamber 1862 (for example, facilitating pouring of the first liquid from the first liquid chamber 1862 and consumption of the first liquid by a device user). Illustratively, the first liquid chamber 1862 may be substantially concentrically disposed relative to the brim 1854. Stated another way, the first liquid chamber 1862 and the brim 1854 may substantially share the longitudinal axis 1814. Illustratively, the first liquid chamber 1862 may be substantially concentrically disposed relative to the outer surface 1836 of the outer portion 1806 of the body 1802. Stated another way, the first liquid chamber 1862 and the outer surface 1836 may substantially share the longitudinal axis 1814. In other embodiments, the first liquid chamber 1862 may be offset from the shared longitudinal axis 1814 of the other portions of the device 1800, with the outer edge of the first liquid chamber 1862 disposed proximate the outer edge of the brim 1854. Stated another way, the outer diameter of the first liquid chamber 1862 may alternatively be disposed tangentially about the outer diameter of the brim 1854 and proximate the upper portion's 1812 most lateral edge. Such an alternative structure could provide a closer proximity of the first liquid chamber 1862 to a user's mouth (when positioned for consuming a first liquid) as well as provide a greater surface area for larger apertures 1856 to be disposed about the brim 1854 (allowing for greater ease of access to a second liquid when positioned for use thereinafter).

Illustratively, the first liquid chamber 1862 tapers inwardly proceeding away from the open end 1864. The first liquid chamber 1862 may taper at various angles relative to the longitudinal axis 1814. In other embodiments, the first liquid chamber does not taper and instead includes a cylindrical shape. Illustratively, the first liquid chamber 1862 has a domed shape opposite the open end 1864. In other embodiments, the first liquid chamber has other curved shapes or a planar shape opposite the open end.

The first liquid chamber 1862 may have any of various appropriate capacities or volumes. In some embodiments, the first liquid chamber 1862 has the capacity to receive a single or double shot, according to the independent standards set forth by any of various countries, in order to maintain consistency, simplify preparation, and/or reduce over-pouring. For example, in the United States, the standard volume of a single shot is 1.5 fl. oz. (44.4 ml) and, in Australia, the standard volume of a single shot is 1.0 fl. oz. (29.6 ml). In some embodiments, the first liquid chamber 1862 has a volume of substantially 1.5 fl. oz. (44.4 ml). In some embodiments, the first liquid chamber 1862 has a volume of substantially 1.0 fl. oz. (29.6 ml). In some embodiments, the first liquid chamber 1862 has a volume of substantially 3.0 fl. oz. (88.7 ml). In some embodiments, the first liquid chamber 1862 has the capacity to receive a less-than-standard shot volume. Such embodiments may appeal to resellers interested in increasing their per-sale profit margins while maintaining the appearance that customers are receiving a standard drink volume.

Together, the lower portion 1804, the first inner portion 1808, the second inner portion 1810, and the upper portion 1812 define a second liquid chamber 1866 that is configured to receive a second liquid from a coupled liquid container.

Figures 25A, 25B, 25C:
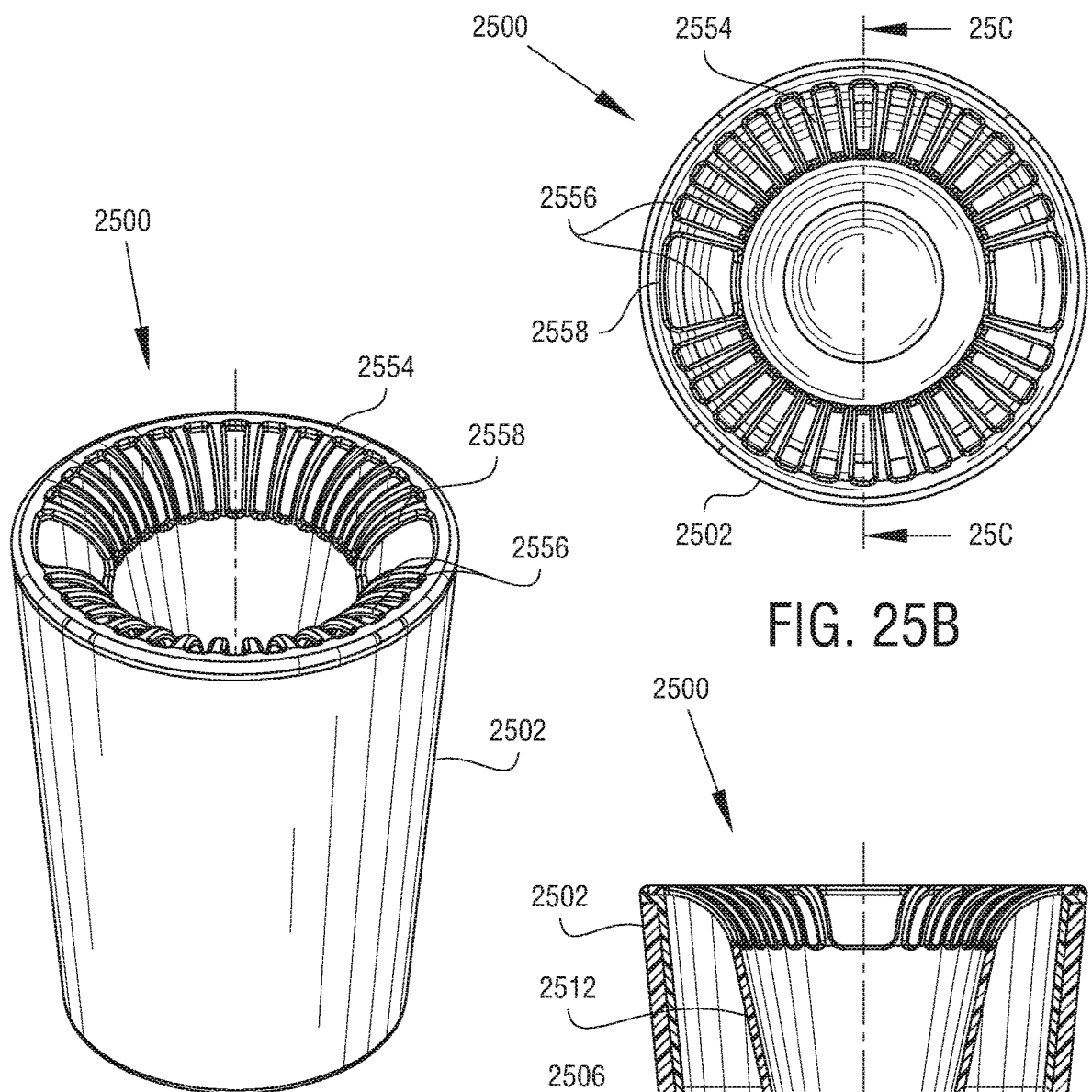
FIG. 25A is a perspective view of a device for facilitating consumption of a plurality of liquids, according to another embodiment of the present disclosure.
FIG. 25B is a top view of the device of FIG. 25A.
FIG. 25C is a longitudinal sectional view of the device along line 25C-25C of FIG. 25B.

Devices that facilitate coupling to two or more different types of liquid containers according to embodiments of the disclosure may take various other forms. For example, FIGS. 25A-25C illustrate a device 2500 that facilitates coupling to two or more different types of liquid containers. The device 2500 is similar to the device 1800 described above. That is, the device 2500 includes a body 2502 that has a lower portion 2504, an outer portion 2506, first inner portion 2508, and a second inner portion 2510 that may be as described in connection with those features of the device 1800. In addition, the body 2502 includes an upper portion 2512 that is similar to the upper portion 1812 of the device 1800. The upper portion 2512 includes a brim 2554 that defines a plurality of apertures 2556 that extend through the brim 2554 to define an outlet for delivering a second liquid from the device 2500. In contrast to the brim 1854 of the device 1800, the brim 2554 includes two sets of apertures 2556 that are disposed on opposite sides of two removal apertures 2558. Each set of apertures 2556 includes 13 apertures 2556 that each have an angular width of substantially 6 degrees (that is, 6 degrees within ±0.5 degrees) and are each offset by an angle of substantially 11.5 degrees (that is, 11.5 degrees within ±0.5 degrees).

FIGS. 26A-26C illustrate another exemplary device 2600 that facilitates coupling to two or more different types of liquid containers. The device 2600 is similar to the device 1800 described above. That is, the device 2600 includes a body 2602 that has a lower portion 2604, an outer portion 2606, first inner portion 2608, and a second inner portion 2610 that may be as described in connection with those features of the device 1800. In addition, the body 2602 includes an upper portion 2612 that is similar to the upper portion 1812 of the device 1800. In contrast to the upper portion 1812 of the device 1800, the upper portion 2612 includes a brim 2654 that defines a single aperture 2656 that extends through the brim 2654 to define an outlet for delivering a second liquid from the device 2600. The aperture 2656 is angularly disposed between two removal apertures 2658 and has an angular width of substantially 142 degrees (that is, 142 degrees within ±5 degrees).

Figure 27A:
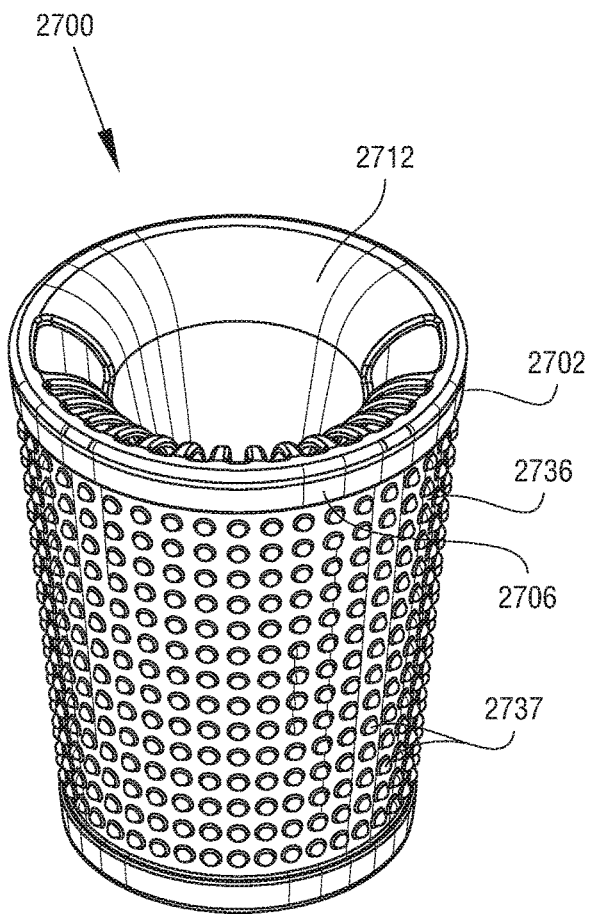
FIG. 27A is a perspective view of a device for facilitating consumption of a plurality of liquids, according to another embodiment of the present disclosure.
Figure 27B:
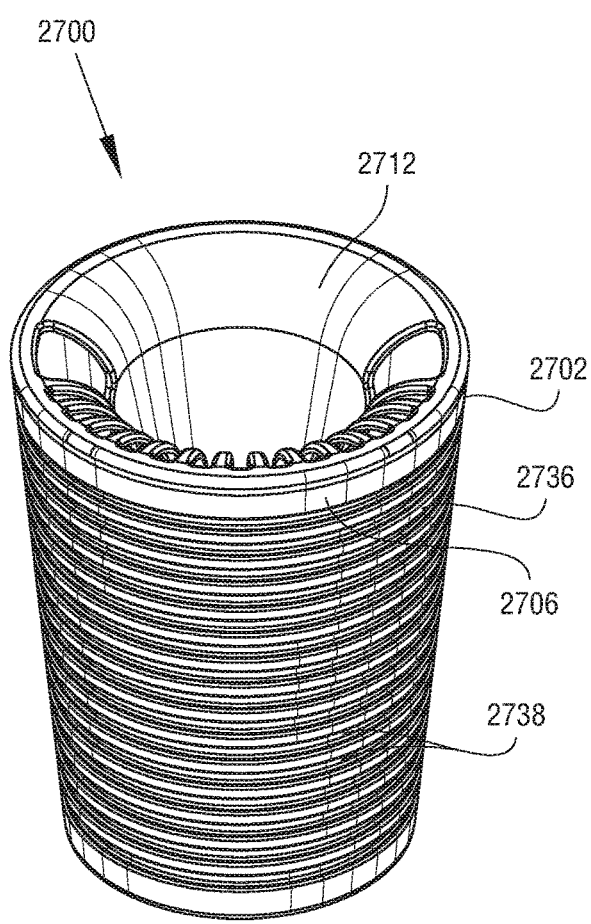
FIG. 27B is a perspective view of a device for facilitating consumption of a plurality of liquids, according to another embodiment of the present invention.
Figure 30A:
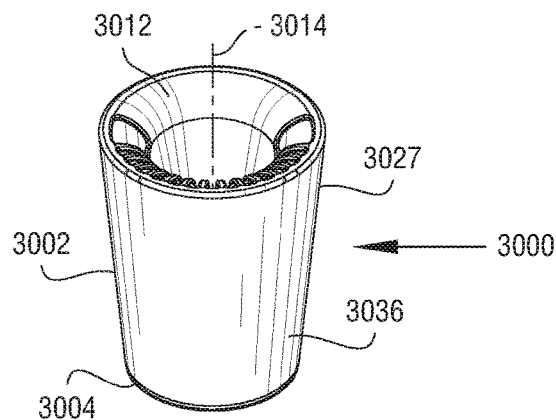
FIG. 30A is a perspective view of a device for facilitating consumption of a plurality of liquids, according to another embodiment of the present disclosure.
Figure 30B:
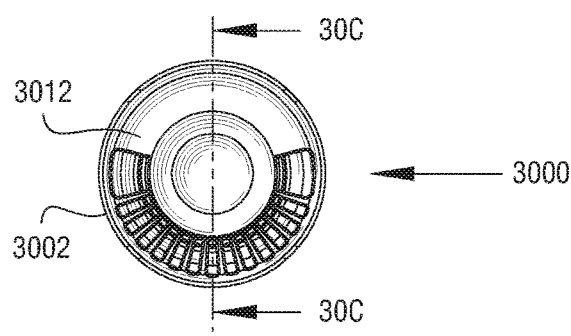
FIG. 30B is a top view of the device of FIG. 30A.
Figure 30C:
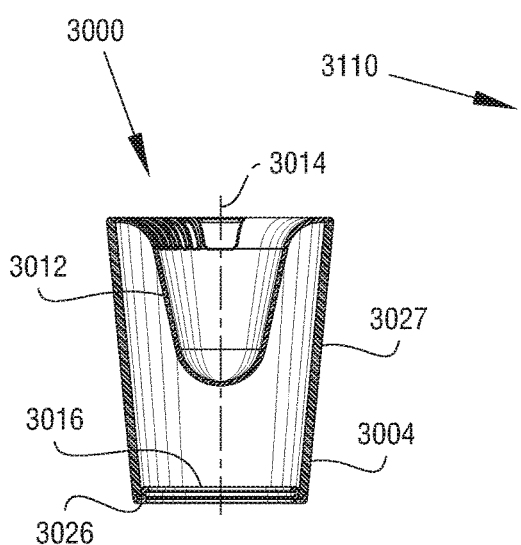
FIG. 30C is a longitudinal sectional view of the device along line 30C-30C of FIG. 30B.
Figure 31:
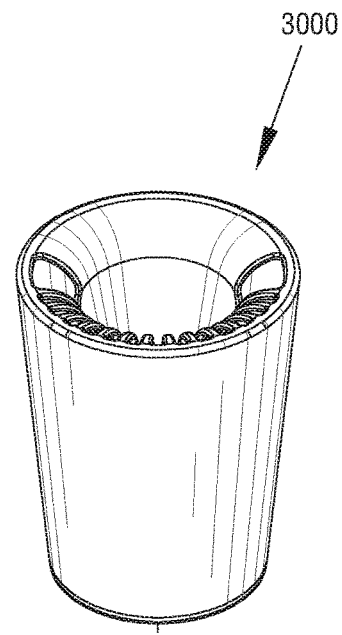
FIG. 31 is a perspective view of the device of FIG. 30A and various types of liquid containers that may be coupled to the device.
Figure 32A:
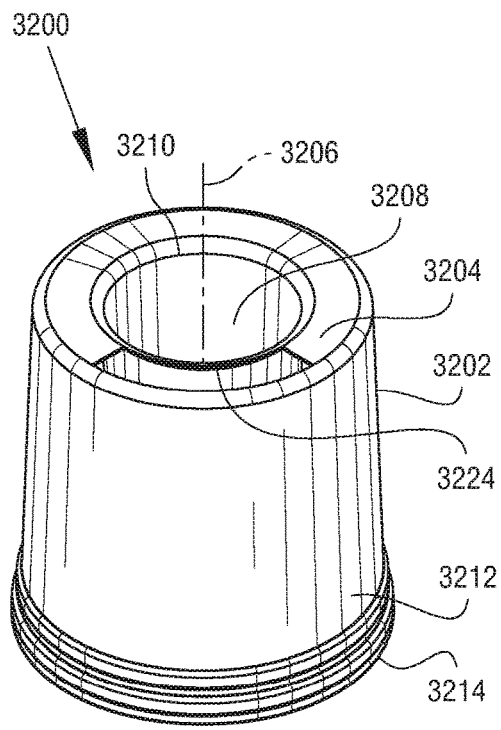
FIG. 32A is a perspective view of a device for facilitating consumption of a plurality of liquids, according to another embodiment of the present disclosure.
Figure 32B:
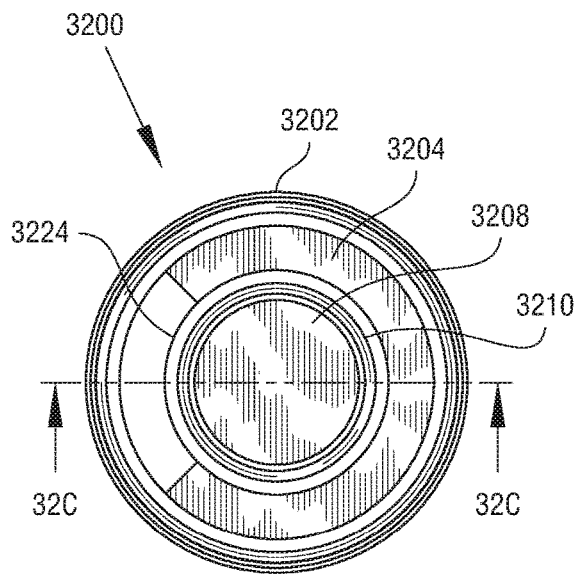
FIG. 32B is a top view of the device of FIG. 32A.
Figure 32C:
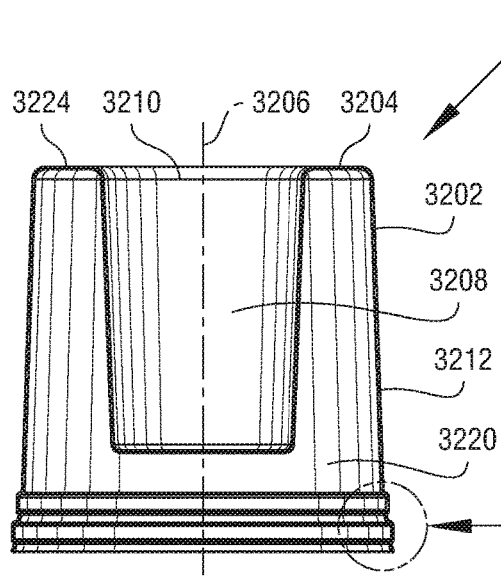
FIG. 32C is a longitudinal sectional view of the device along line 32C-32C of FIG. 32B.
Figure 32D:
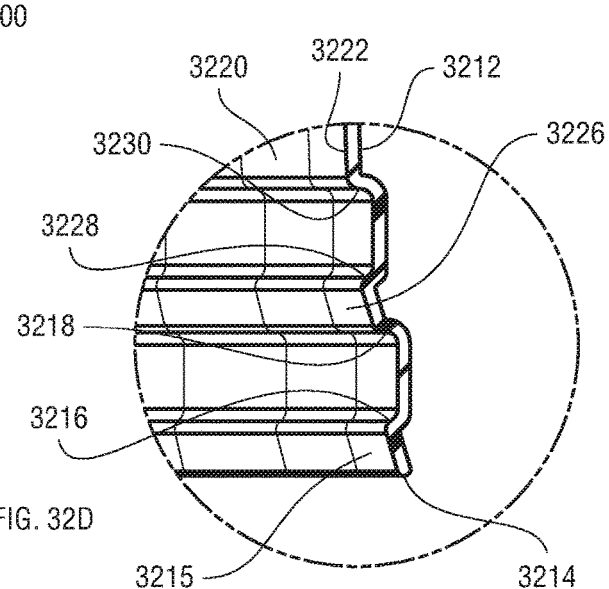
FIG. 32D is a detail view of a portion of the device enclosed by line 32D-32D of FIG. 32C.
Figure 33:
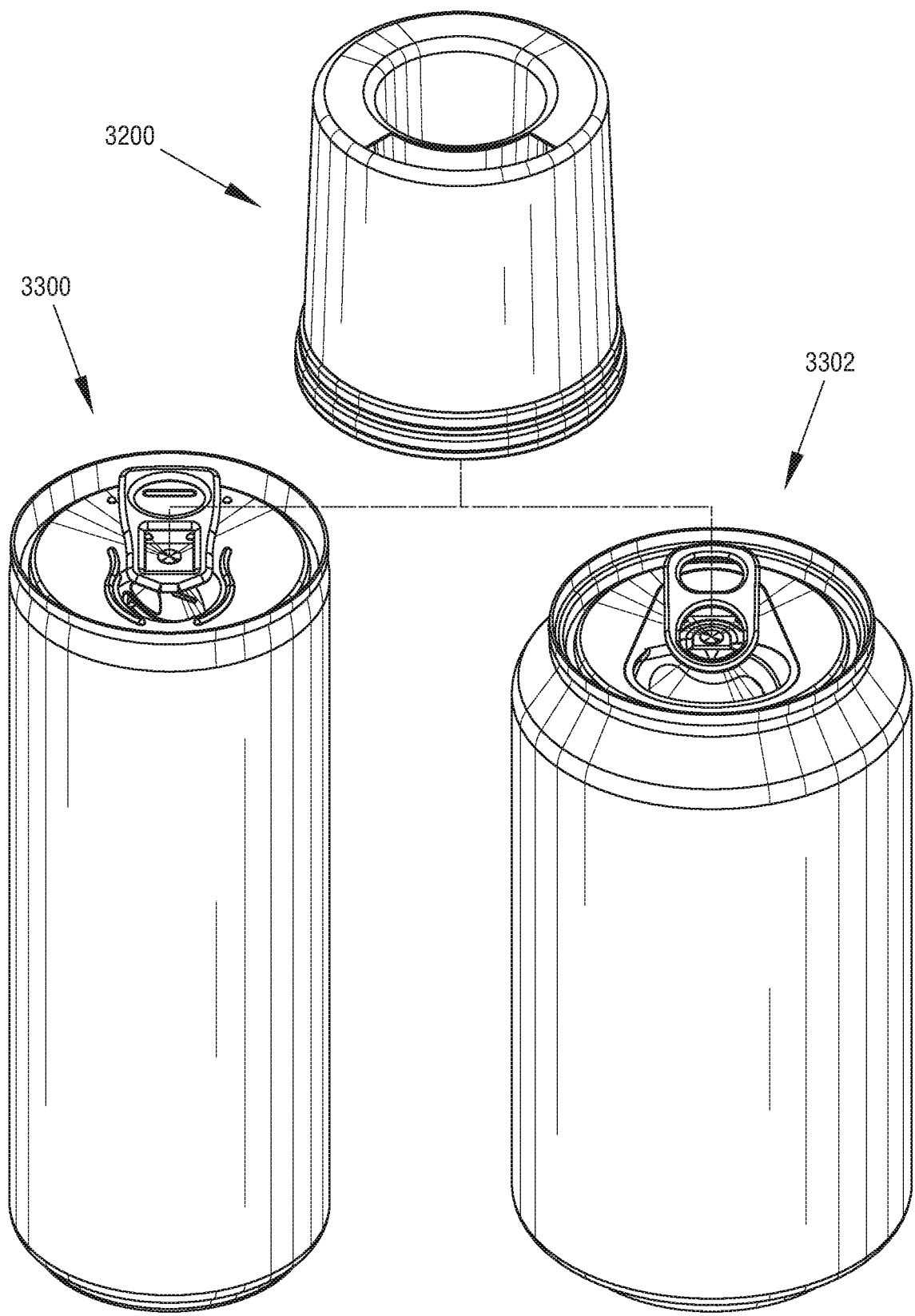
FIG. 33 is a perspective view of the device of FIG. 32A and various types of liquid containers that may be coupled to the device.

FIGS. 27A-27B illustrates another exemplary device 2700 that facilitates coupling to two or more different types of liquid containers. The device 2700 is similar to the device 2600 described above. That is, the device 2700 includes a body 2702 that has a lower portion (not shown), a first inner portion (not shown), a second inner portion (not shown), and an upper portion 2712 that may be as described in connection with those features of the device 2600. In addition, the body 2702 includes an outer portion 2706 that is similar to the outer portion 2606 of the device 2600. In contrast to the outer portion 2606 of the device 2600, the outer surface 2736 of the outer portion 2706 includes one or more discontinuities to facilitate grasping the device and/or coupling the device 2700 to a coverless container. Illustratively, the discontinuities may be a plurality of protuberances 2737. In other embodiments, the discontinuities may be a plurality of parallel channels 2738. Yet, in other embodiments, the discontinuities may have other forms, such as a plurality of intersecting channels or protrusions (not shown).

Devices that facilitate coupling to two or more different types of liquid containers according to embodiments of the disclosure may include fewer than the five attachment elements described above. Stated differently, devices according to embodiments of the disclosure may include different combinations of two or more of the attachment elements described above. For example, FIGS. 28A-28C and 29 illustrate a device 2800 that facilitates coupling to two different types of liquid containers. The device 2800 is similar to the device 1800 described above. That is, the device 2800 includes a body 2802 that has a first inner portion 2808, a second inner portion 2810, and an upper portion 2812 that may be as described in connection with those features of the device 1800. In contrast to the body 1802 of the device 1800, the body 2802 lacks a lower portion and an outer portion. As such, the device 2800 facilitates coupling to a twist-off capped container, such as a twist-off capped bottle 2912 (as a specific example, a 20 fl. oz. (591 ml) bottle) via a first attachment element (illustratively, an inner threaded surface 2848) of the second inner portion 2810. The device 2800 also facilitates coupling to a pry-off capped container, such as a pry-off capped bottle 2916 (as a specific example, a 16 fl. oz. (473 ml) bottle) via a second attachment element (illustratively, a shoulder 2850) of the second inner portion 2810.

FIGS. 30A-30C and 31 illustrate a device 3000 that facilitates coupling to two different types of liquid containers. The device 3000 is similar to the device 1800 described above. That is, the device 3000 includes a body 3002 that has an upper portion 3012 that may be as described in connection with the upper portion 1812 of the device 1800. In contrast to the body 1802 of the device 1800, the body 3002 lacks a first inner portion and a second inner portion.

Further, the body 3002 includes a lower portion 3004 that has some features that are similar to those of the lower portion 1804 and the outer portion 1806 of the device 1800. Specifically, proximate an inlet 3016 the lower portion 3004 of the body 3002 includes a first attachment element, which may take the form of the first attachment element of the device 1800. However, the lower portion 3004 of the device 3000 lacks the second attachment element like that of the device 1800.

Proximate the inlet 3016, lower portion 3004 of the body 3002 further defines a lower surface 3026. Illustratively, the lower surface 3026 has a flat shape to facilitate freely standing the device 3000. In other embodiments, the lower surface has a non-flat shape, such as a curved shape or a domed shape.

The lower surface 3026 couples to an outer wall 3027 of the lower portion 3004. In some embodiments, the outer wall 3027 is axisymmetric about the longitudinal axis 3014. The outer wall 3027 of the lower portion 3004 defines a second attachment element. The second attachment element is adapted to detachably couple the device 3000 to another specific type of liquid container and facilitate delivering a second liquid carried by the liquid container to the device 3000 via the inlet 3016. Illustratively, the second attachment element is an outer surface 3036 of the outer wall 3027 that is adapted to detachably and press-fittingly engage an inner surface of a coverless container to detachably secure the device 3000 to the coverless container. Accordingly, the outer surface 3036 may have a shape that is the inverse of the shape of the inner surface of the coverless container. Illustratively, the outer surface 3036 tapers inwardly proceeding away from the upper portion 3012 to facilitate use with "tapering-down" coverless containers, such as a pint glass 3110 (as a specific example, a 16 fl. oz. (473 ml) pint glass). In other embodiments, the outer surface may taper outwardly proceeding away from the upper portion (to facilitate use with "tapering-up" coverless containers, such as "wine" glasses), or the outer surface may have a semi-cylindrical shape (that is, a non-tapering shape, to facilitate use with non-tapering coverless containers, such as "coffee" mugs).

FIGS. 32A-32D and 33 illustrate a device 3200 that facilitates coupling to two different types of liquid containers. The device 3200 is similar to the device 1500 described above. That is, the device 3200 includes a body 3202 that has a brim 3204, a longitudinal axis 3206, a first liquid chamber 3208, an open end 3210, an outer surface 3212, a lower surface 3214, a guide surface 3215, a lower shoulder 3216 and a upper shoulder 3218 that define an attachment element, an inner cavity 3220, an inner surface 3222, and a channel 3224 that may be as described in connection with those features of the device 1500. In addition, the body 3202 also includes a second guide surface 3226 that couples to the first attachment element opposite the first guide surface 3215. Illustratively, the guide surface 3215 tapers inwardly proceeding away from the first attachment element. The second guide surface 3226 couples to a second attachment element opposite the first attachment element. The second attachment element couples the device 3200 to a different type of tab-opened container that the first attachment element. Specifically, the second attachment element includes a second lower shoulder 3228 and a second upper shoulder 3230 for engaging a rim of a tab-opened container therebetween to detachably secure the device 3200 to the tab-opened container. The second attachment element may have a size that is suitable for detachably coupling the device 3200 to a can 3300 having a relatively-small rim diameter, and the first attachment element may have a size that is suitable for detachably coupling the device 3200 to a can 3302 having a relatively-large rim diameter.

Devices according to embodiments of the present disclosure may be sold or otherwise provided to users with the first liquid chamber already carrying a first liquid. In such embodiments, the brim of the device may also carry a detachable cover that inhibits the first liquid from exiting the first liquid chamber prior to detachment of the cover and subsequent consumption of the first liquid by a user.

FIGS. 34A-34C illustrate an exemplary embodiment of a device 3400 that includes a detachable cover. The device 3400 is similar to the device 3200 described above. That is, the device 3400 includes a body 3402 that has a brim 3404, a longitudinal axis (not shown), a first liquid chamber 3408, an open end 3410, an outer surface 3412, a lower surface (not shown), a first attachment element, a second attachment element, an inner cavity (not shown), an inner surface (not shown), and a channel 3424 that may be as described in connection with those features of the device 3200. In addition, the brim 3404 of the device 3400 carries a detachable cover 3450 that inhibits the first liquid 3420 from exiting the first liquid chamber 3408 prior to detachment of the cover 3450 and subsequent consumption of the first liquid 3420 by a user. The cover 3450 may be detachably coupled to the brim 3404 in a variety of manners (for example, via one or more adhesives). In such embodiments, the device 3400 could be sold as a prefilled and sealed unit. Such embodiments may appeal to resellers who are interested in reducing the number of steps required for drink preparation. Moreover, a prefilled and sealed unit could be removably attached to the top of an associated liquid container and sold as a bundle in an effort to increase overall sales volume per customer.

Figures 35A, 35B, 35C:
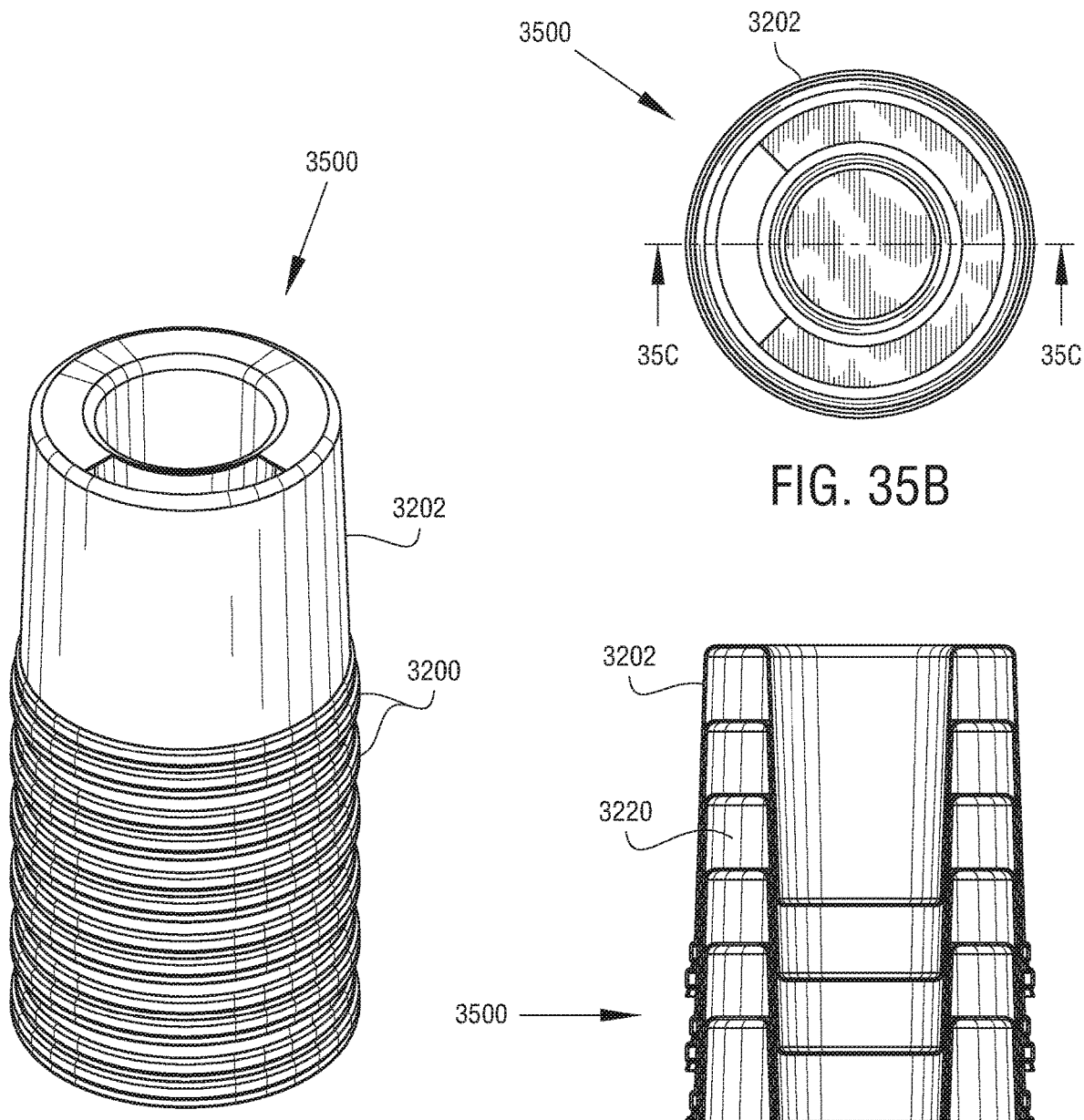
FIG. 35A is a perspective view of a stack of devices for facilitating consumption of a plurality of liquids, according to another embodiment of the present disclosure.
FIG. 35B is a top view of the stack of devices of FIG. 35A.
FIG. 35C is a longitudinal sectional view of the stack of devices along line 35C-35C of FIG. 35B.

Devices according to embodiments of the present disclosure may be stacked or stackably coupled to adjacent devices. For example, FIGS. 35A-35C illustrate a stack 3500 of the devices 3200. Illustratively, the body 3202 of each device 3200 is partially received within the inner cavity 3220 of an adjacent (typically overlying) device 3200. In such embodiments, the stack 3500 of devices 3200 could be sold as a packaged bundle. Such embodiments may appeal to manufacturers as well as resellers who are interested in reducing the costs associated with shipping, storage, and/or display.

Mold apparatuses according to embodiments of the present disclosure receive one or more uncured materials and permit the material(s) to cure therein and thereby form one or more liquid consumption devices. In some embodiments, uncured materials that are received by mold apparatuses are consumable materials. For example, the mold apparatus may receive water that is frozen to form ice devices. As another example, mold apparatuses may receive liquids with dissolved gelatin that is cooled to form gelatinous devices. As yet another example, mold apparatuses may receive batter that is heated to form cake devices. Other examples of consumable materials that mold apparatuses may receive to form liquid consumption devices are described herein. In other embodiments, uncured materials that are received by mold apparatuses are non-consumable materials.

FIGS. 36A-36C illustrate an embodiment of a mold apparatus 3600 for forming devices according to embodiments of the present disclosure. The mold apparatus 3600 is suitable for forming a device 100 described above. However, mold apparatuses according to other embodiments of the disclosure may be suitable for forming other embodiments of devices described herein, or portions thereof.

The mold apparatus 3600 includes a first die 3602 and a second die 3604, which is a distinct component and movable relative to the first die 3602. The first die 3602 and the second die 3604 include surfaces that together define the inverse shape of the device 100. Specifically, the first die 3602 includes a first base 3606 that carries a liquid chamber-forming feature 3608. As the name implies, the liquid chamber-forming feature 3608 forms a liquid chamber in the device 100 when uncured material cures in the mold apparatus 3600. Illustratively, the liquid chamber-forming feature 3608 is an inverted, semi-spherical tipped cone that forms the first liquid chamber 108 of the device 100. The liquid chamber-forming feature 3608 may be monolithically coupled to the first base 3606 or a distinct component from the first base 3606.

The second die 3604 includes a second base 3610 that defines a die chamber 3612 that receives uncured material. The die chamber 3612 also receives the liquid chamber-forming feature 3608 of the first die 3602. The second die 3604 includes an opening through which liquid may be poured when the dies are coupled together. In addition, the chamber 3612 carries a liquid channel-forming feature 3614. As the name implies, the liquid channel-forming feature 3614 forms the channel 116 of the device 100 when the uncured material cures in the die chamber 3612. Illustratively, the liquid channel-forming feature 3614 is a three-dimensional arc that forms the channel 116 in the outer surface 112 of the device 100. The liquid channel-forming feature 3614 may be monolithically coupled to the second base 3610 or a distinct component from the second base 3610.

FIGS. 37A-37C illustrate an embodiment of a mold apparatus 3700 for forming devices according to embodiments of the present disclosure. The mold apparatus 3700 is suitable for forming a plurality of the devices 100 described above (illustratively, four devices 100). However, mold apparatuses according to other embodiments of the disclosure may be suitable for forming other embodiments of devices described herein, or portions thereof.

The mold apparatus 3700 includes a first die 3702 and a second die 3704, which is a distinct component and movable relative to the first die 3702. The first die 3702 and the second die 3704 include surfaces that together define the inverse shape of a plurality of the devices 100. Specifically, the first die 3702 includes a first base 3706 that carries a plurality of liquid chamber-forming features 3708. As the name implies, the liquid chamber-forming features 3708 each form a liquid chamber in an associated device 100 when uncured material cures in the mold apparatus 3700. Illustratively, the liquid chamber-forming features 3708 are four inverted, semi-spherical tipped cones that each form the first liquid chamber 108 of an associated device 100. The liquid chamber-forming features 3708 may be monolithically coupled to the first base 3706 or distinct components from the first base 3706.

The second die 3704 includes a second base 3710 that defines a plurality of die chambers 3712 (illustratively, four die chambers 3712) that receive uncured material. Each die chamber 3712 also receives an associated liquid chamber-forming feature 3708 of the first die 3702. Each die chamber 3712 may be coupled to an opening through which liquid may be poured when the dies are coupled together. In addition, each die chamber 3712 carries a liquid channel-forming feature 3714. As the name implies, the liquid channel-forming features 3714 each form a channel of an associated device 100 when the uncured material cures in the die chamber 3712. Illustratively, the liquid channel-forming features 3714 are four three-dimensional arcs that each form the channel 116 in the outer surface 112 of an associated device 100. The liquid channel-forming features 3714 may be monolithically coupled to the second base 3710 or distinct components from the second base 3710.

Mold apparatuses according to embodiments of the present disclosure may be used together with one or more coverless containers, which each subsequently carry a second liquid, to receive one or more uncured materials and permit the material(s) to cure therein and thereby form one or more liquid consumption devices.

Figure 38A:
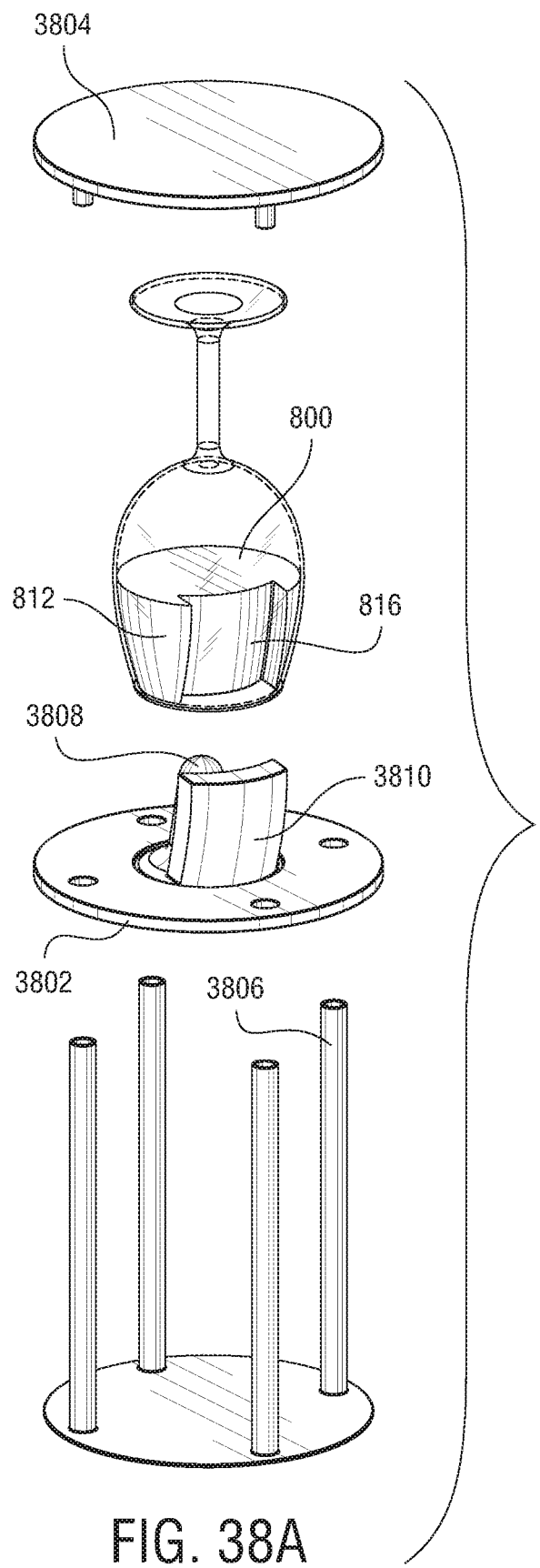
FIG. 38A is an upper exploded perspective view of a mold apparatus and a coverless container for forming a device for facilitating consumption of a plurality of liquids, according to another embodiment of the present disclosure.
Figure 38B:
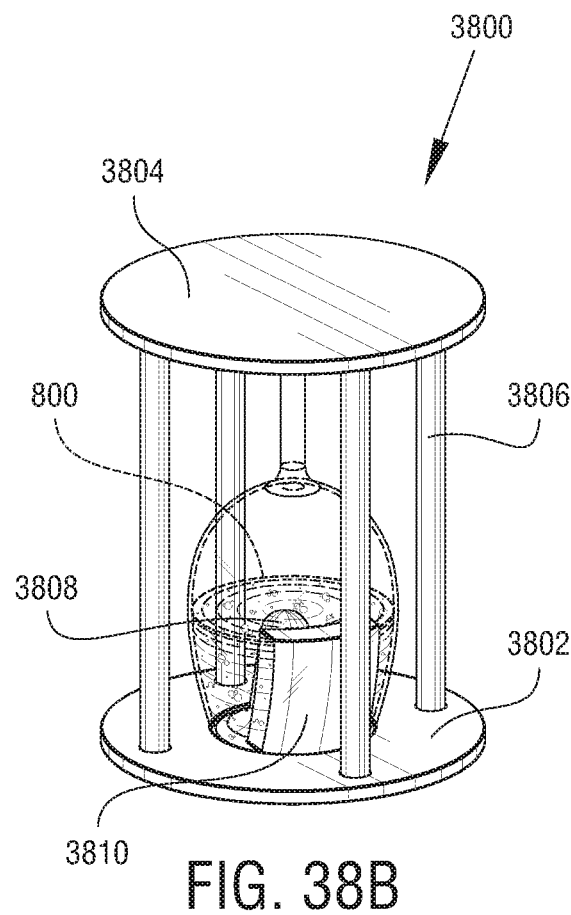
FIG. 38B is an upper perspective view of the mold apparatus and the coverless container of FIG. 38A.
Figure 38C:
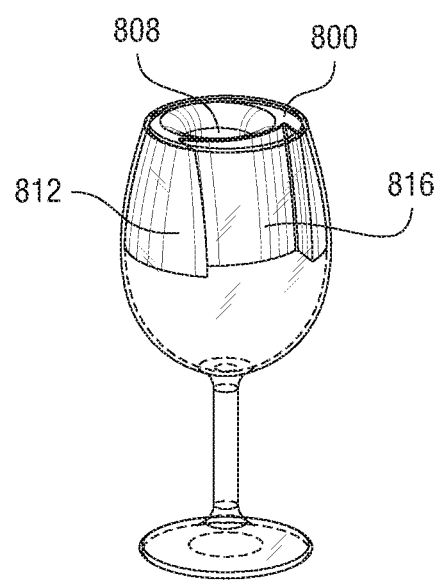
FIG. 38C is an upper perspective view of the coverless container of FIG. 38A carrying a device for facilitating consumption of a plurality of liquids.

FIGS. 38A-38C illustrate an embodiment of a mold apparatus 3800 that is used with a coverless container (illustratively, a "wine" glass) for forming devices according to embodiments of the present disclosure. Illustratively, the mold apparatus 3800 is suitable for forming the device 800 described above within the coverless container. However, mold apparatuses according to other embodiments of the disclosure may be suitable for forming other embodiments of devices described herein, or portions thereof.

The mold apparatus 3800 includes a first base 3802, a second base 3804, and a plurality of arms 3806 that detachably couple the first base 3802 and the second base 3804. The first base 3802 engages the rim of the coverless container and carries the coverless container in an inverted position while the coverless container carries an uncured material. The material cures while the first base 3802 carries the coverless container in the inverted position and thereby forms the device 800 within the coverless container. In addition, the first base 3802 carries features that form the inverse shapes in the device 800. Specifically, the first base 3802 carries a liquid chamber-forming feature 3808 that forms a liquid chamber in the device 800 when the uncured material cures in the coverless container. Illustratively, the liquid chamber-forming feature 3808 is a semi-spherical tipped cone that forms the first liquid chamber 808 of the device 800. The liquid chamber-forming feature 3808 may be monolithically coupled to the first base 3802 or a distinct component from the first base 3802. The first base 3802 also carries a liquid channel-forming feature 3810 that forms a liquid channel in an outer surface of the device 800 when the uncured material cures in the coverless container. Illustratively, the liquid channel-forming feature 3810 is a three-dimensional arc that forms the channel 816 in the outer surface 812 of the device 800. The liquid channel-forming feature 3810 may be monolithically coupled to the first base 3802 or a distinct component from the first base 3802. The second base 3804 is adapted to engage the foot of the coverless container. The arms 3806 detachably couple the first base 3802 to the second base 3804 to secure the coverless container therebetween.

Mold apparatuses according to embodiments of the present disclosure may be modified in various manners. For example, a mold apparatus according to an embodiment of the present disclosure may be similar to the mold apparatus

3800, except the mold apparatus may simultaneously carry multiple coverless containers and include a liquid chamber-forming feature and a liquid channel-forming feature for each coverless container.

Embodiments of devices according to the present disclosure may include one or more illumination devices, or light-emitting devices, to provide aesthetically pleasing visual effects. In some embodiments, such illumination devices may be selectively activated by a user. In some embodiments, such illumination devices may be activated based on input from the surrounding environment. In some embodiments, such illumination devices may be as described in U.S. Pat. No. 7,211,958 and may work in coordination with a projection system, such as those described in U.S. Pat. No. 8,740,391, which are hereby incorporated by reference.

Liquid consumption devices and mold apparatuses according to embodiments of the present disclosure may be formed of materials that facilitate multiple uses thereof (that is, provide reusable devices and mold apparatuses) or a single use thereof (that is, provide disposable devices and mold apparatuses). For example, liquid consumption devices and mold apparatuses according to embodiments of the present disclosure may be formed of one or more of polymers, composites, ceramics, pure metals, and metal alloys. Examples of polymers include acrylic, acrylonitrile butadiene styrene (ABS), nylon, polylactic acid (PLA), polybenzimidazole (PBI), polycarbonate (PC), polyether sulfone (PES), high-impact polystyrene (HIPS), polyburylene, polyethylene, polyethylene terephthalate, polystyrene, extruded polystyrene foam (XPF), polyvinylchloride (PVC), nitrile butadiene rubber (NBR), urea-formaldehyde, or the like. Examples of composites include paper, paperboard, corrugated fiberboard, paper slurry, cork, wood, carbon fiber, glass reinforced plastic (GRP), or the like. Examples of ceramics include glass, porcelain, crystal, marble, earthenware, stoneware, or the like. Examples of pure metals and metal alloys include aluminum, brass, bronze, copper, steel, silver, gold or the like. In some embodiments, disposable liquid consumption devices for use with "tapering-up" coverless containers (for example, the device 800 and stemware, such as the "wine" glass 850) may be formed of one or more materials having elastic properties. Such materials permit deformation to facilitate positioning a device in a coverless container. Thereafter, the materials also cause the device to return to its initial shape to engage the inner surface of the coverless container. Examples of materials having elastic properties include low-resilience polyurethane foam (LRPu), neoprene, sponge rubber, or the like.

In some embodiments, liquid consumption devices according to the present disclosure may be formed of one or more consumable materials to facilitate consumption of a plurality of liquids and, thereafter, the device itself. Consumable liquid consumption devices according to embodiments of the present disclosure may be formed of one or more of ice, frozen confections, gel confections, chocolate confections, sugar confections, bakers' confections, or the like. Ice may be used, for example, for receiving and delivering first liquids that are typically served at relatively low temperatures (for example, vodka, Jagermeister, peppermint schnapps, iced coffee, beer, chardonnay, orange juice, or the like). Examples of frozen confections include flavored ice, popsicles, frozen yogurt, ice cream, sorbet, gelato, Italian ice or the like. Examples of gel confections include sweetened and flavored gelatin, pre-mixed gelatin, liquor- or spirit-based gelatin, trifle, aspic, marshmallow, or the like. Examples of chocolate confections include chocolate-coated fruit, chocolate fudge, chocolate truffles, chocolate turtles, dark chocolate, milk chocolate, white chocolate, peanut butter cups, or the like. Examples of sugar confections include brittles, caramels, chewing gum, hard candies, licorice, mints, taffies, toffies, or the like. Examples of bakers' confections include brownies, cakes, cookies, doughnuts, pastries, pies, scones, or the like.

In addition to or as alternatives to the manufacturing processes described above, liquid consumption devices and mold apparatuses according to embodiments of the present disclosure may be manufactured by using one or more of casting, molding, metal forming, joining, subtractive manufacturing (for example, machining) or additive manufacturing (for example, 3D printing). Examples of casting processes include centrifugal casting, die-casting, lost-wax casting, lost-foam casting, permanent mold casting, slipcasting, resin casting, or the like. Examples of molding processes include injection molding, compression molding, extrusion molding, blow molding, rotational molding, thermoforming, vacuum forming, or the like. Examples of metal forming processes include bending, curling, forging, hydroforming, roll forming, die pressing, die stamping, indenting, or the like. Examples of joining processes include welding, sintering, adhesive bonding, fastening, press fitting or the like. Examples of subtractive manufacturing processes include milling, turning, drilling, tapping, die cutting, routing, laser cutting, plasma cutting, waterjet cutting, or the like. Examples of additive manufacturing processes include fused filament fabrication (FFF), fused deposition modeling (FDM), selective laser sintering (SLS), stereolithography (SLA), or the like.

In some embodiments, consumable liquid consumption devices according to the present disclosure may be manufactured by using one or more of casting, cooking, baking, freezing, additive manufacturing (for example, 3D printing), or the like. Additional manufacturing processes that may be used following the above processes include glazing, frosting, dipping, or the like (for example, if the device is formed as a cake, or to add a solid layer to inhibit absorption of a contained first liquid).

Materials used to form liquid consumption devices and mold apparatuses according to embodiments of the present disclosure may include, or may contain inks, dyes, or pigments that include, one or more of the following properties: thermochromism, photochromism, piezochromism, electrochromism, fluorescence, chemiluminescence, phosphorescence, dishwasher-safeness, heat resistance (to facilitate receiving liquids that are served at higher temperatures, such as espresso, warm sake, hot toddies, or the like), recyclability, compostability, and biodegradability.

Liquid consumption devices and mold apparatuses according to embodiments of the present disclosure may include one or more of alphanumeric text, symbols, patterns, images, logos, graphics, or other indicia on one or more surfaces thereof. Such features may be provided by one or more of embossing, debossing, printing, etching, engraving, or the like.

In some embodiments, the devices described above provide opportunities for adding aesthetic appeal to otherwise simple cocktails, given the greater number of manufacturing and material options available compared to a typical lid. In some embodiments, the devices described above facilitate providing unusual menu items to the bar and restaurant industries. For example, a liquid (such as wheatgrass or a cheese and crackers flavored spirit) could be provided atop a glass of wine.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

The following is claimed:

1. A device for consuming a plurality of liquids, comprising:
   a brim;
   a first liquid chamber coupled to the brim and adapted to carry a first liquid, the first liquid chamber comprising an open end adapted for receiving the first liquid in the first liquid chamber and delivering the first liquid from the first liquid chamber;
   an outer surface coupled to the brim, the outer surface being adapted to press-fittingly engage an inner surface of a coverless container to detachably secure the device to the coverless container;
   a lower surface coupled to the outer surface;
   a channel extending from the lower surface to the brim, the channel being adapted to deliver therethrough a second liquid carried by the coverless container; and
   a removal element monolithically formed with the brim and extending outwardly from the brim, the removal element being adapted to be disposed outwardly of the coverless container when the outer surface press-fittingly engages the inner surface of the coverless container, and the removal element being adapted to be grasped by a user to facilitate removal of the device from the coverless container.

2. The device of claim 1, wherein the device comprises a unitary body defining the brim, the first liquid chamber, the outer surface, the lower surface, the channel, and the removal element.

3. The device of claim 1, wherein the outer surface tapers inwardly proceeding from the brim to the lower surface.

4. The device of claim 1, wherein the first liquid chamber has a circular cross-sectional shape, the outer surface has a semi-circular cross-sectional shape, and the semi-circular cross-sectional shape is substantially concentrically disposed relative to the circular cross-sectional shape.

5. The device of claim 1, wherein the device comprises a consumable material.

6. The device of claim 1, wherein the first liquid chamber has a capacity of one of substantially 1.0 fl. oz., substantially 1.5 fl. oz., and substantially 3.0 fl. oz.

7. The device of claim 1, wherein the open end is disposed in a common plane with an outlet of the coverless container when the device is detachably secured to the coverless container.

8. The device of claim 1, wherein the lower surface has a flat shape to facilitate freely standing the device with the open end of the first liquid chamber facing in an upward direction.

9. The device of claim 1, wherein the channel interrupts the outer surface and extends from the brim to the lower surface.

10. The device of claim 1, wherein the device further comprises a longitudinal axis, the channel extending in an arc about the longitudinal axis of the device, the arc having a central angle centered on the longitudinal axis, and the central angle being substantially 90 degrees.

11. The device of claim 1, wherein the removal element is disposed radially outwardly relative to the brim and the outer surface.

12. The device of claim 1, wherein the first liquid chamber tapers inwardly proceeding away from the brim.

13. A device for consuming a plurality of liquids, comprising:
   a unitary body comprising:
      a first liquid chamber adapted to carry a first liquid, the first liquid chamber comprising an open upper end adapted for receiving the first liquid in the first liquid chamber and delivering the first liquid from the first liquid chamber, and the first liquid chamber having a capacity of one of substantially 1.0 fl. oz., substantially 1.5 fl. oz., and substantially 3.0 fl. oz.;
      an outer surface disposed outwardly of the first liquid chamber, the outer surface being adapted to press-fittingly engage an inner surface of a coverless container to detachably secure the device to the coverless container;
      a side channel interrupting the outer surface, the side channel being adapted to deliver therethrough a second liquid carried by the coverless container;
      a removal element disposed outwardly of the outer surface, the removal element being adapted to be disposed outwardly of the coverless container when the outer surface press-fittingly engages the inner surface of the coverless container, and the removal element being adapted to be grasped by a user to facilitate removal of the device from the coverless container.

14. The device of claim 13, wherein the first liquid chamber has a circular cross-sectional shape, the outer surface has a semi-circular cross-sectional shape, and the semi-circular cross-sectional shape is substantially concentrically disposed relative to the circular cross-sectional shape.

15. The device of claim 13, wherein the outer surface tapers inwardly proceeding away from the open upper end of the first liquid chamber.

16. The device of claim 13, wherein the first liquid chamber tapers inwardly proceeding away from the open upper end.

17. The device of claim 1, wherein the removal element comprises a tab extending radially outwardly relative to a longitudinal axis of the device.

18. The device of claim 13, wherein the removal element comprises a tab extending radially outwardly relative to a longitudinal axis of the device.

19. A device for consuming a plurality of liquids, comprising:
   a brim;
   a first liquid chamber coupled to the brim and adapted to carry a first liquid, the first liquid chamber comprising an open end adapted for receiving the first liquid in the first liquid chamber and delivering the first liquid from the first liquid chamber;
   an outer surface coupled to the brim, the outer surface being adapted to press-fittingly engage an inner surface of a coverless container to detachably secure the device to the coverless container;
   a lower surface coupled to the outer surface; and
   a channel extending from the lower surface to the brim, the channel extending in an arc about a longitudinal axis of the device, the arc having a central angle centered on the longitudinal axis, the central angle being substantially 90 degrees, and the channel being adapted to deliver therethrough a second liquid carried by the coverless container.

* * * * *